(12) United States Patent
Modestine et al.

(10) Patent No.: US 10,402,989 B2
(45) Date of Patent: Sep. 3, 2019

(54) NEIGHBORHOOD ALERT MODE FOR TRIGGERING MULTI-DEVICE RECORDING, MULTI-CAMERA MOTION TRACKING, AND MULTI-CAMERA EVENT STITCHING FOR AUDIO/VIDEO RECORDING AND COMMUNICATION DEVICES

(71) Applicant: A9.com, Inc., Palo Alto, CA (US)

(72) Inventors: John Modestine, Los Angeles, CA (US); Joshua Roth, Pacific Palisades, CA (US)

(73) Assignee: A9.Com, Inc., Palo Alto, CA (US)

( * ) Notice: Subject to any disclaimer, the term of this patent is extended or adjusted under 35 U.S.C. 154(b) by 0 days.

(21) Appl. No.: 15/904,399

(22) Filed: Feb. 25, 2018

(65) Prior Publication Data
US 2018/0233025 A1 Aug. 16, 2018
US 2019/0051143 A9 Feb. 14, 2019

Related U.S. Application Data

(63) Continuation-in-part of application No. 15/431,275, filed on Feb. 13, 2017, now Pat. No. 9,819,713.
(Continued)

(51) Int. Cl.
*G06F 15/16* (2006.01)
*G06T 7/292* (2017.01)
(Continued)

(52) U.S. Cl.
CPC ............ *G06T 7/292* (2017.01); *G06F 3/0482* (2013.01); *G06F 3/0488* (2013.01); *G06F 3/04842* (2013.01); *G06K 9/00221* (2013.01); *G06K 9/00288* (2013.01); *G06K 9/00771* (2013.01); *G06K 9/00979* (2013.01); *G06K 9/2018* (2013.01); *G06K 9/2027* (2013.01); *G06T 7/70* (2017.01); *G08B 3/10* (2013.01); *G08B 13/19645* (2013.01); *G08B 13/19656* (2013.01);
(Continued)

(58) Field of Classification Search
CPC ............ G06T 7/292; G08B 13/196566; G08B 13/19645; G08B 13/19671; H04N 7/186; H04N 5/23206
USPC ........................................................ 709/219
See application file for complete search history.

(56) References Cited

U.S. PATENT DOCUMENTS 4,764,953 A 8/1988 Chern et al.
5,428,388 A 6/1995 von Bauer et al.
(Continued)

FOREIGN PATENT DOCUMENTS

| CN | 2585521 | 11/2003 |
| CN | 2792061 | 6/2006 |

(Continued)

*Primary Examiner* — Krisna Lim
(74) *Attorney, Agent, or Firm* — Lee & Hayes, P.C.

(57) ABSTRACT

The present embodiments relate to improvements to audio/video (A/V) recording and communication devices, including improved approaches to using a neighborhood alert mode for triggering multi-device recording, to a multi-camera motion tracking process, and to a multi-camera event stitching process to create a series of "storyboard" images for activity taking place across the fields of view of multiple cameras, within a predetermined time period, for the A/V recording and communication devices.

20 Claims, 63 Drawing Sheets

Related U.S. Application Data

(60) Provisional application No. 62/376,826, filed on Aug. 18, 2016, provisional application No. 62/300,547, filed on Feb. 26, 2016.

(51) Int. Cl.

| | | |
|---|---|---|
| H04L 29/06 | (2006.01) | |
| G06F 3/0482 | (2013.01) | |
| G06F 3/0484 | (2013.01) | |
| G06F 3/0488 | (2013.01) | |
| G08B 13/196 | (2006.01) | |
| H04N 7/14 | (2006.01) | |
| G08B 25/08 | (2006.01) | |
| H04L 29/08 | (2006.01) | |
| G06T 7/70 | (2017.01) | |
| G06K 9/00 | (2006.01) | |
| G06K 9/20 | (2006.01) | |
| G08B 27/00 | (2006.01) | |
| H04N 5/232 | (2006.01) | |
| H04N 5/77 | (2006.01) | |
| H04N 5/91 | (2006.01) | |
| H04N 7/18 | (2006.01) | |
| G08B 3/10 | (2006.01) | |
| G08B 15/00 | (2006.01) | |
| G10L 17/00 | (2013.01) | |
| H04N 5/225 | (2006.01) | |
| G06F 17/28 | (2006.01) | |
| G10L 25/57 | (2013.01) | |

(52) U.S. Cl.
CPC .  *G08B 13/19671* (2013.01); *G08B 13/19682* (2013.01); *G08B 13/19684* (2013.01); *G08B 13/19695* (2013.01); *G08B 15/001* (2013.01); *G08B 15/004* (2013.01); *G08B 25/08* (2013.01); *G08B 27/001* (2013.01); *G08B 27/003* (2013.01); *G08B 27/005* (2013.01); *G10L 17/005* (2013.01); *H04L 65/1069* (2013.01); *H04L 65/4076* (2013.01); *H04L 65/4084* (2013.01); *H04L 67/12* (2013.01); *H04N 5/2252* (2013.01); *H04N 5/23206* (2013.01); *H04N 5/77* (2013.01); *H04N 5/91* (2013.01); *H04N 7/147* (2013.01); *H04N 7/186* (2013.01); *G06F 17/28* (2013.01); *G06K 9/00201* (2013.01); *G06K 2009/00738* (2013.01); *G06T 2207/10004* (2013.01); *G06T 2207/10016* (2013.01); *G06T 2207/10024* (2013.01); *G06T 2207/30232* (2013.01); *G10L 25/57* (2013.01); *H04L 67/10* (2013.01)

(56) References Cited

U.S. PATENT DOCUMENTS

| | | | |
|---|---|---|---|
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,970,183 | B1 | 11/2005 | Monroe |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,643,056 | B2 | 1/2010 | Silsby |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 8,139,098 | B2 | 3/2012 | Carter |
| 8,144,183 | B2 | 3/2012 | Carter |
| 8,154,581 | B2 | 4/2012 | Carter |
| 8,619,136 | B2 | 12/2013 | Howarter et al. |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,872,915 | B1 | 10/2014 | Scalisi et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Kasmir et al. |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi et al. |
| 9,179,108 | B1 | 11/2015 | Scalisi et al. |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,240,214 | B2 * | 1/2016 | Hannuksela ......... G11B 27/034 |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 2002/0094111 | A1 | 7/2002 | Puchek et al. |
| 2002/0147982 | A1 | 10/2002 | Naidoo et al. |
| 2003/0043047 | A1 | 3/2003 | Braun |
| 2004/0085205 | A1 | 5/2004 | Yeh |
| 2004/0085450 | A1 | 5/2004 | Stuart |
| 2004/0086093 | A1 | 5/2004 | Schranz |
| 2004/0095254 | A1 | 5/2004 | Maruszczak |
| 2004/0135686 | A1 | 7/2004 | Parker |
| 2005/0111660 | A1 | 5/2005 | Hosoda |
| 2006/0010199 | A1 | 1/2006 | Brailean et al. |
| 2006/0022816 | A1 | 2/2006 | Yukawa |
| 2006/0139449 | A1 | 6/2006 | Cheng et al. |
| 2006/0156361 | A1 | 7/2006 | Wang et al. |
| 2007/0008081 | A1 | 1/2007 | Tylicki et al. |
| 2010/0225455 | A1 | 9/2010 | Claiborne et al. |
| 2013/0057695 | A1 | 3/2013 | Huisking |
| 2014/0267716 | A1 | 9/2014 | Child et al. |
| 2015/0035987 | A1 | 2/2015 | Fernandez |
| 2015/0163463 | A1 | 6/2015 | Hwang et al. |
| 2015/0189243 | A1 * | 7/2015 | Cucco ................. G06T 7/20 348/157 |
| 2016/0345035 | A1 * | 11/2016 | Han ............... H04N 21/23424 |

(56) References Cited

U.S. PATENT DOCUMENTS

2018/0232895 A1 8/2018 Modestine et al.
2018/0233010 A1 8/2018 Modestine et al.

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

\* cited by examiner

NEIGHBORHOOD ALERT MODE FOR TRIGGERING MULTI-DEVICE RECORDING, MULTI-CAMERA MOTION TRACKING, AND MULTI-CAMERA EVENT STITCHING FOR AUDIO/VIDEO RECORDING AND COMMUNICATION DEVICES

CROSS-REFERENCE TO RELATED APPLICATIONS

This application is a continuation-in-part of U.S. application Ser. No. 15/431,275, filed on Feb. 13, 2017, now U.S. Pat. No. 9,819,713, issued on Nov. 14, 2017, the entire contents of which are incorporated herein by reference.

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present approaches to using a neighborhood alert mode for triggering multi-device recording, to a multi-camera motion tracking process, and to a multi-camera event stitching process to create a series of "storyboard" images for activity taking place across the fields of view of multiple cameras, within a predetermined time period, for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that a person and/or an object of interest is typically not stationary. For example, when an A/V recording and communication device records video footage of suspicious and/or criminal activity, the suspect in the video footage is likely to be moving. The sharing of such video footage may alert neighbors to the potential dangers, particularly because the suspect may still be in the vicinity (e.g., the neighborhood). It would be advantageous then to enhance the functionality of A/V recording and communication devices by using shared video footage to identify one or more cameras to power up and record additional video footage. For example, a neighborhood may include multiple camera devices such as (but not limited to) first cameras and second cameras of various A/V recording and communication devices, and one or more of the second cameras may be configured to power up and capture additional image data (and, in some embodiments, audio data) based on shared video footage from a first camera. Further, the functionality of A/V recording and communication devices may be enhanced by using any report of a crime from any source to power up one or more cameras to capture image and/or audio data. Still further, the functionality of the A/V recording and communication devices can be enhanced so that, upon receipt of a "neighborhood alert" signal, the cameras of all such devices within a neighborhood (or another determined area) are powered up to capture additional image data (and in some embodiments, audio data) that may be useful for tracking a suspect's movements, recording the actions or presence of accomplices, and/or recording other images that might warn residents or help to solve a crime being perpetrated. Moreover, the present embodiments improve upon and solve the problem of resource management by using a power-up command signal to configure the one or more cameras to switch from a low-power state to a powered-on state, thereby conserving power. The present embodiments provide these advantages, as described below.

Another aspect of the present embodiments includes the realization that, at a single property, a user may install multiple A/V recording and communication devices, and may wish to have them communicatively linked together so that, if one such device senses motion and records image data of a source of motion that is moving toward a second such device, the second device is alerted or activated to "track" the source of the motion from the field of view of the first device to the field of view of the second device. In this way, the security of the property and residents will be enhanced and a better recording of the source of motion may be available for use by the user and/or law enforcement authorities.

Yet another aspect of the present embodiments includes the realization that, when users install multiple A/V recording and communication devices at a single property, and such devices each record image data of a source of motion moving around the property, e.g., moving from the field of view of a first camera and into the field of view of a second camera, the user may desire to view such image data as a linked or unified whole, rather than as separate images or separate image files or video clips. The present embodiments provide for "camera event stitching" to create either a continuous video, or a series of "storyboard" images, for activity taking place across the fields of view of multiple cameras, within a predetermined time period. This aspect of the present embodiments provides the advantages of user convenience in viewing recorded image data, as well as coherence in understanding the timing and sequence of the recorded images.

In a first aspect, a method is provided for a neighborhood security system, the neighborhood security system comprising a plurality of camera devices located within a neighborhood, and a backend processing system in network communication with the plurality of camera devices, where the backend processing system is in network communication with at least a first client device, and where the first client device is associated with a first one of the plurality of camera devices, the method comprising receiving, at the backend system, a neighborhood alert mode signal from the first client device, transmitting, from the backend system to the plurality of camera devices, an activation signal including a command for each of the plurality of camera devices to record image data for a predetermined amount of time and receiving, at the backend system, the image data from each of the plurality of camera devices.

In an embodiment of the first aspect, the neighborhood comprises a circular area defined by a predetermined radius extending outwardly from the first camera device.

In another embodiment of the first aspect, at least some of the plurality of camera devices are owned by individual users.

In another embodiment of the first aspect, the method further comprises, prior to receiving the neighborhood alert mode signal from the first client device, receiving an opt-in signal from each of a plurality of second client devices, where each of the second client devices is associated with one of the plurality of camera devices other than the first camera device.

In another embodiment of the first aspect, at least some of the plurality of camera devices are owned by a group of users.

In another embodiment of the first aspect, at least some of the plurality of camera devices are located on public property.

In another embodiment of the first aspect, at least some of the plurality of camera devices are owned by a neighborhood organization.

In another embodiment of the first aspect, at least some of the plurality of camera devices are located on public property.

In another embodiment of the first aspect, the method further comprises transmitting a neighborhood alert warning signal to a plurality of second client devices, wherein each of the second client devices is associated with one of the plurality of camera devices other than the first camera device.

In another embodiment of the first aspect, the method further comprises analyzing the received image data to identify any threats posed to the neighborhood.

In another embodiment of the first aspect, analyzing the received image data comprises using computer vision analysis at the backend system.

In another embodiment of the first aspect, analyzing the received image data comprises determining whether any identified threats are moving within the neighborhood.

In another embodiment of the first aspect, when it is determined that an identified threat is moving within the neighborhood, determining a location and a direction of movement for the threat.

In another embodiment of the first aspect, the method further comprises transmitting to law enforcement an identification of the threat, the location of the threat, and the direction of movement of the threat.

In a second aspect, a method is provided for a video security system installed at a property, the video security system comprising a first camera installed at a first location at the property and a second camera installed at a second location at the property, where the video security system is associated with a client device, the method comprising receiving first image data from the first camera of a first source of motion that is within a field of view of the first camera, where the first image data is associated with a first time stamp indicating the time when the first image data was recorded, receiving second image data from the second camera of a second source of motion that is within a field of view of the second camera, where the second image data is associated with a second time stamp indicating the time when the second image data was recorded, determining whether the second time stamp is within a predetermined amount of time after the first time stamp, when the second time stamp is within the predetermined amount of time after the first time stamp, creating composite image data comprising the first image data followed by the second image data and transmitting the composite image data to the client device.

In an embodiment of the second aspect, the predetermined amount of time is three minutes.

In another embodiment of the second aspect the predetermined amount of time depends on a distance between the first camera and the second camera.

In another embodiment of the second aspect the predetermined amount of time increases when the distance between the first camera and the second camera increases, and wherein the predetermined amount of time decreases when the distance between the first camera and the second camera decreases.

In another embodiment of the second aspect the first image data and the second image data are received at a backend system in network communication with the first camera and the second camera.

In another embodiment of the second aspect the first image data and the second image data are received at a smart home hub located at the property and in network communication with the first camera and the second camera.

In a third aspect, a method is provided for a video security system installed at a property, the video security system comprising a first security device having a first camera installed at a first location at the property and a second security device having a second camera installed at a second location at the property, the method comprising receiving first image data from the first camera of a source of motion that is within a field of view of the first camera, analyzing the first image data to determine whether the source of motion is moving toward the second camera installed at the second location and upon determining that the source of motion is moving toward the second camera installed at the second location, sending a recording activation signal to the second camera, where, upon receiving the recording activation signal, the second camera begins recording second image data.

In an embodiment of the third aspect the video security system is associated with a client device.

In another embodiment of the third aspect, the method further comprises receiving an indication from the client device that the first security device has been installed at the first location.

In another embodiment of the third aspect, the method further comprises receiving an indication from the client device of a direction of orientation for the first camera.

In another embodiment of the third aspect, the method further comprises receiving an indication from the client device that the second security device has been installed at the second location.

In another embodiment of the third aspect, the method further comprises receiving an indication from the client device of a direction of orientation for the second camera.

In another embodiment of the third aspect, the first image data is received by, and analyzed by, a processor of the first security device.

In another embodiment of the third aspect, the first security device sends the recording activation signal to the second camera.

In another embodiment of the third aspect, the first image data is received by, and analyzed by, a processor of a smart home hub in network communication with the first security device.

In another embodiment of the third aspect, the smart home hub sends the recording activation signal to the second camera.

In another embodiment of the third aspect, the first image data is received by, and analyzed by, a processor of a backend server in network communication with the first security device.

In another embodiment of the third aspect, the backend server sends the recording activation signal to the second camera.

In a fourth aspect, a method is provided for a video security system installed at a property, the video security system comprising a video doorbell having a video doorbell camera installed adjacent an entrance to the property, a first security device having a first camera installed at a first location at the property, and a second security device having a second camera installed at a second location at the property, the method comprising receiving video doorbell image data from the video doorbell camera of a source of motion that is within a field of view of the video doorbell camera, analyzing the video doorbell image data to determine whether the source of motion is moving toward the first location or toward the second location and upon determining that the source of motion is moving toward the first location, sending a recording activation signal to the first camera, or upon determining that the source of motion is moving toward the second location, sending a recording activation signal to the second camera, where, upon receiving the recording activation signal, the respective first camera or second camera begins recording first image data or second image data, respectively.

In an embodiment of the fourth aspect, the video security system is associated with a client device.

In another embodiment of the fourth aspect, the method further comprises receiving an indication from the client device that the first security device has been installed at the first location.

In another embodiment of the fourth aspect, the method further comprises receiving an indication from the client device of a direction of orientation for the first camera.

In another embodiment of the fourth aspect, the method further comprises receiving an indication from the client device that the second security device has been installed at the second location.

In another embodiment of the fourth aspect, the method further comprises receiving an indication from the client device of a direction of orientation for the second camera.

In another embodiment of the fourth aspect, the video doorbell image data is received by, and analyzed by, a processor of the video doorbell.

In another embodiment of the fourth aspect, the video doorbell sends the recording activation signal to the first camera or the second camera.

In another embodiment of the fourth aspect, the video doorbell image data is received by, and analyzed by, a processor of a smart home hub in network communication with the video doorbell.

In another embodiment of the fourth aspect, the smart home hub sends the recording activation signal to the first camera or the second camera.

In another embodiment of the fourth aspect, the video doorbell image data is received by, and analyzed by, a processor of a backend server in network communication with the video doorbell.

In another embodiment of the fourth aspect, the backend server sends the recording activation signal to the first camera or the second camera.

In a fifth aspect, a method is provided for a backend system for monitoring a neighborhood security system, the neighborhood security system comprising a plurality of camera devices located within a neighborhood, and wherein the backend system is in operative communication with each of the plurality of camera devices, wherein the backend system is in operative communication with a plurality of client devices, and wherein each of the client devices is associated with at least one of the plurality of cameras, the method comprising receiving, at the backend system, a neighborhood alert mode signal from a first client device, transmitting, from the backend system to the plurality of camera devices, an activation signal including a command for each of the plurality of camera devices to record image data for a predetermined amount of time and receiving, at the backend system, the image data from each of the plurality of camera devices.

In an embodiment of the fifth aspect, the method further comprises, prior to receiving the neighborhood alert mode signal from the first client device, receiving an opt-in signal from each of a plurality of second client devices, wherein each of the second client devices is associated with one of the plurality of camera devices other than the first camera device.

In another embodiment of the fifth aspect, the method further comprises transmitting a neighborhood alert warning signal to a plurality of second client devices, wherein each of the second client devices is associated with one of the plurality of camera devices other than the first camera device.

In another embodiment of the fifth aspect, the method further comprises analyzing the received image data to identify any threats posed to the neighborhood.

In another embodiment of the fifth aspect, analyzing the received image data comprises using computer vision analysis at the backend system.

In another embodiment of the fifth aspect, analyzing the received image data comprises determining whether any identified threats are moving within the neighborhood.

In another embodiment of the fifth aspect, when it is determined that an identified threat is moving within the neighborhood, determining a location and a direction of movement for the threat.

In another embodiment of the fifth aspect, the method further comprises transmitting to law enforcement an identification of the threat, the location of the threat, and the direction of movement of the threat.

BRIEF DESCRIPTION OF THE DRAWINGS

The various embodiments of the present approaches to using a neighborhood alert mode for triggering multi-device recording, to a multi-camera motion tracking process, and to a multi-camera event stitching process to create a continuous video or a series of "storyboard" images for activity taking place across the fields of view of multiple cameras, within a predetermined time period for audio/video (A/V) recording and communication devices now will be discussed in detail with an emphasis on highlighting the advantageous features. These embodiments depict the novel and non-obvious neighborhood alert mode, motion tracking and camera event stitching for audio/video (A/V) recording and communication devices shown in the accompanying drawings, which are for illustrative purposes only. These drawings include the following figures, in which like numerals indicate like parts.

DETAILED DESCRIPTION

Figure 1:
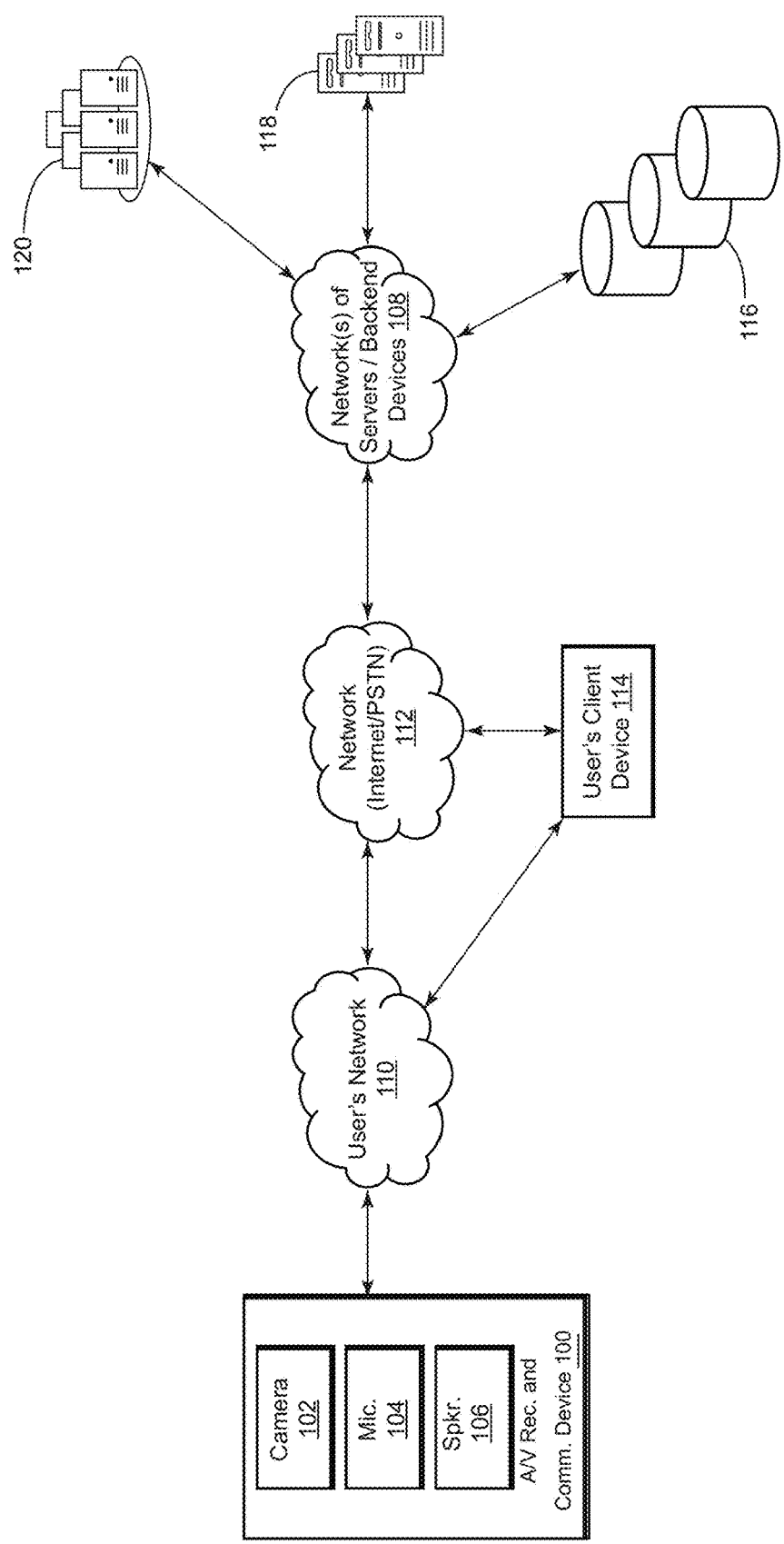
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments include an audio/video (A/V) recording and communication device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. In another example, the present embodiments may include one or more A/V recording and communication floodlight controllers instead of, or in addition to, one or more A/V recording and communication doorbells.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or any other image display resolution. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The A/V recording and communication device 100 may also communicate, via the user's network 110 and the network (Internet/PSTN) 112, with a network(s) 108 of servers and/or backend devices, such as (but not limited to) one or more remote storage devices 116 (may be referred to interchangeably as "cloud storage device(s)"), one or more backend servers 118, and one or more backend APIs 120. While FIG. 1 illustrates the storage device 116, the server 118, and the backend API 120 as components separate from the network (Internet/PSTN) 112, it is to be understood that the storage device 116, the server 118, and/or the backend API 120 may be considered to be components of the network (Internet/PSTN) 112.

The network (Internet/PSTN) 112 may be any wireless network or any wired network, or a combination thereof, configured to operatively couple the above-mentioned modules, devices, and systems as shown in FIG. 1. For example, the network (Internet/PSTN) 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network (Internet/PSTN) 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
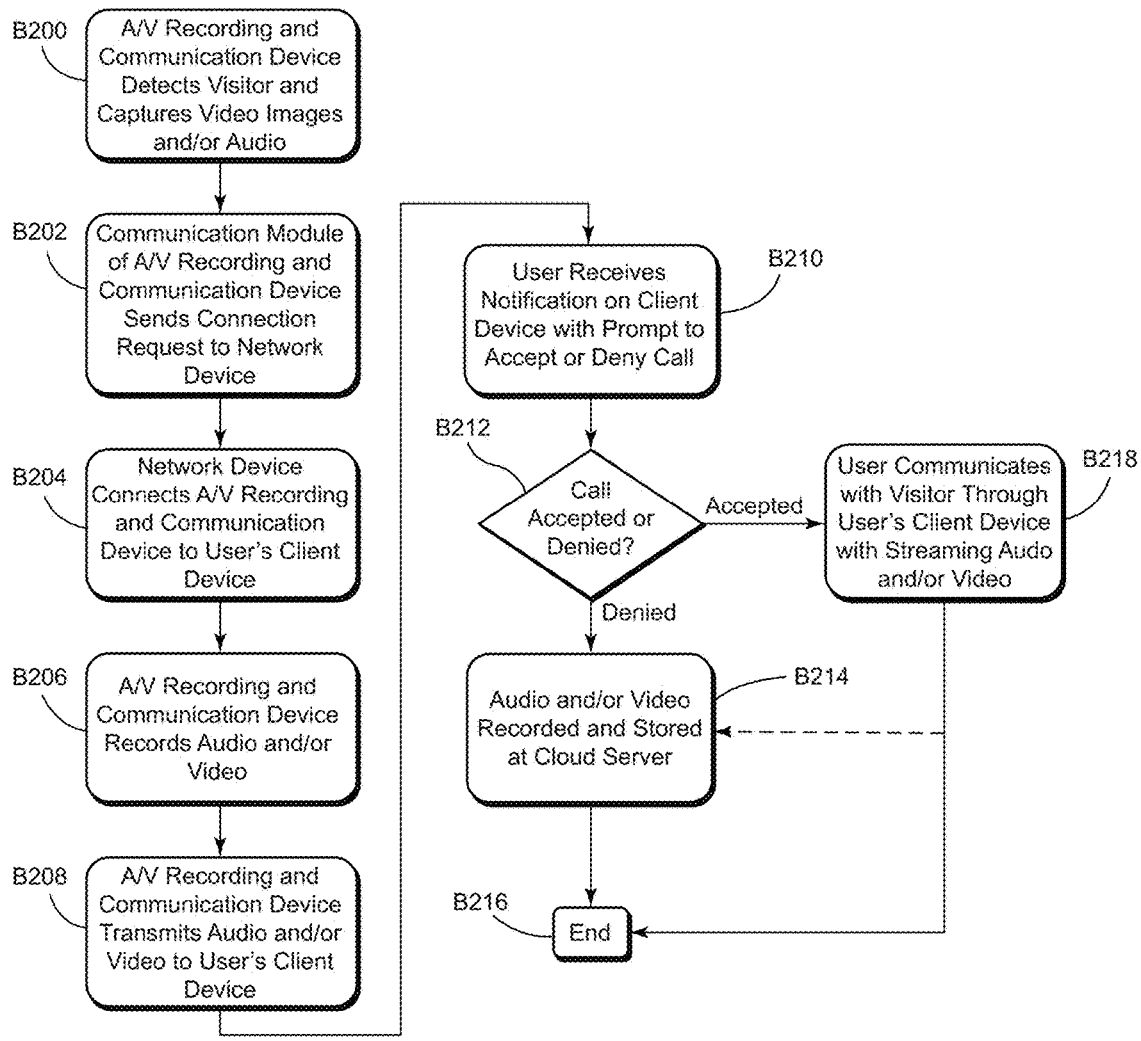
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network (Internet/PSTN) 112, to a device in the network (Internet/PSTN) 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network (Internet/PSTN) 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
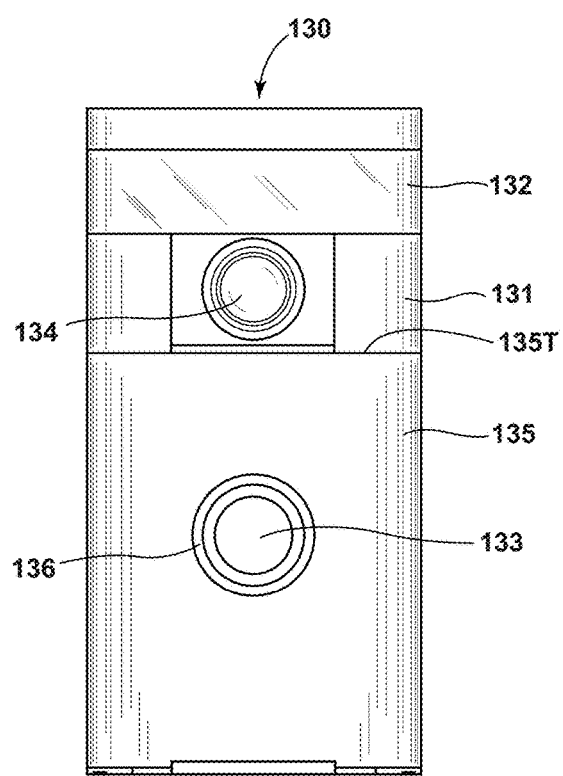
FIG. 3 is a front view of an A/V recording and communication doorbell according to various aspects of the present disclosure.
Figure 4:
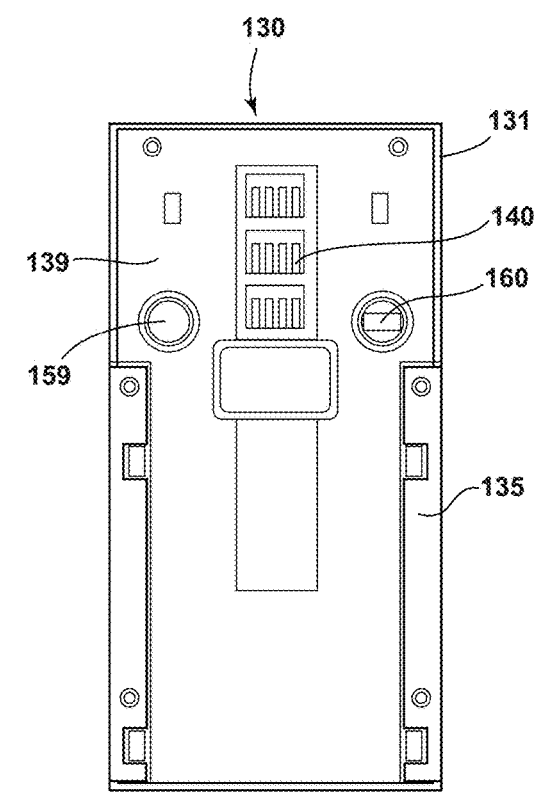
FIG. 4 is a rear view of the A/V recording and communication doorbell of FIG. 3.
Figure 5:
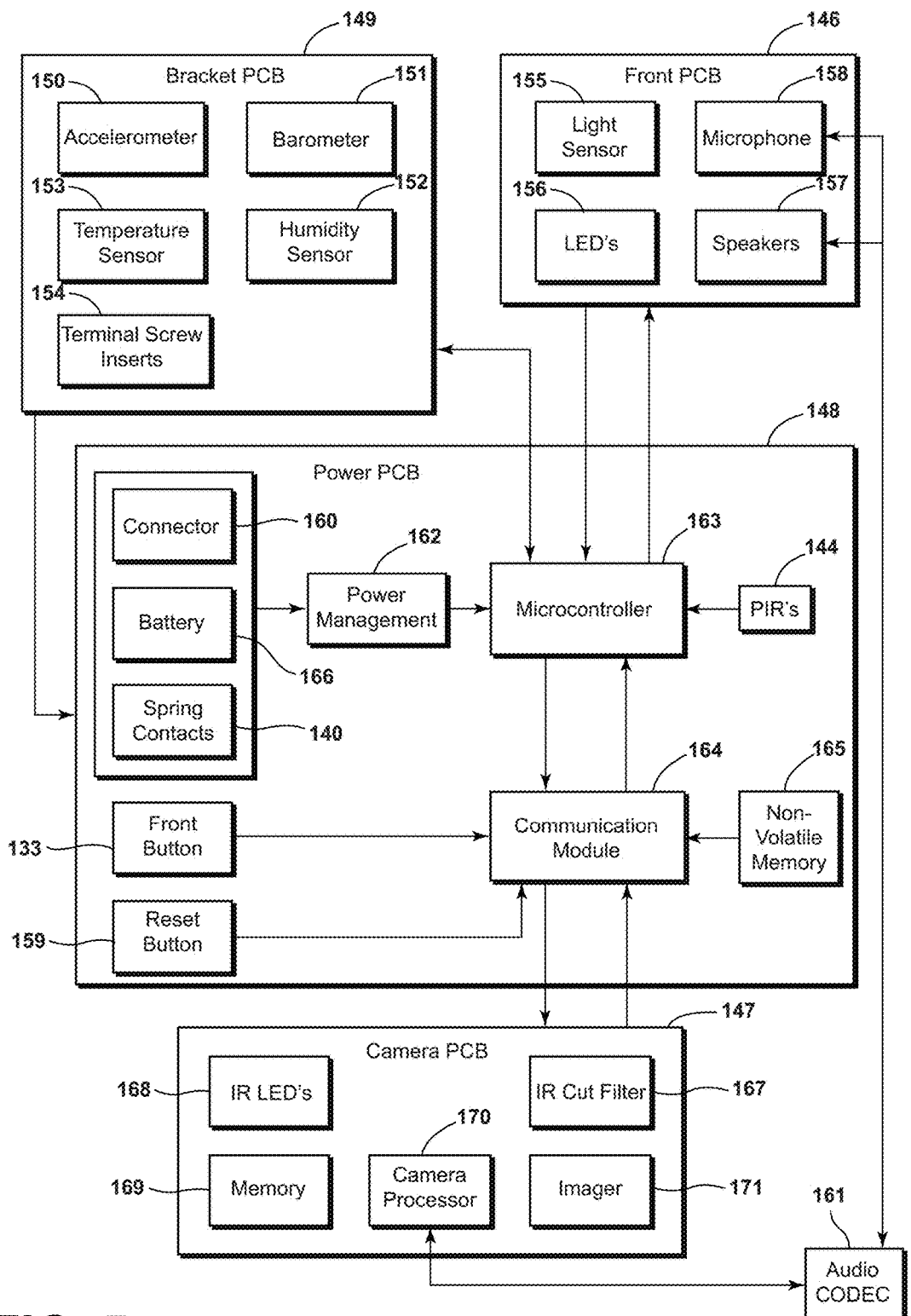
FIG. 5 is a functional block diagram of the components of the A/V recording and communication doorbell of FIGS. 3 and 4.

FIGS. 3-5 illustrate an audio/video (A/V) communication doorbell 130 according to an aspect of present embodiments. FIG. 3 is a front view, FIG. 4 is a rear view, and FIG. 5 is a functional block diagram of the components within or in communication with the doorbell 130. With reference to FIG. 3, the doorbell 130 includes a faceplate 135 mounted to a back plate 139 (FIG. 4). The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With further reference to FIG. 3, the doorbell 130 further includes an enclosure 131 that engages the faceplate 135. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a functional block diagram of the components within or in communication with the doorbell 130, according to an aspect of the present embodiments. A bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. The bracket PCB 149 may be located outside the housing of the doorbell 130 so as to reduce interference from heat, pressure, moisture, and/or other stimuli generated by the internal components of the doorbell 130.

With further reference to FIG. 5, the bracket PCB 149 may further comprise terminal screw inserts 154, which may be configured to receive terminal screws (not shown) for transmitting power to electrical contacts on a mounting bracket (not shown). The bracket PCB 149 may be electrically and/or mechanically coupled to the power PCB 148 through the terminal screws, the terminal screw inserts 154, the spring contacts 140, and the electrical contacts. The terminal screws may receive electrical wires located at the surface to which the doorbell 130 is mounted, such as the wall of a building, so that the doorbell can receive electrical power from the building's electrical system. Upon the terminal screws being secured within the terminal screw inserts 154, power may be transferred to the bracket PCB 149, and to all of the components associated therewith, including the electrical contacts. The electrical contacts may transfer electrical power to the power PCB 148 by mating with the spring contacts 140.

With further reference to FIG. 5, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by the one or more servers 118, and delivered to the user's client device 114. When the user speaks, after being transferred through the network 112, digital audio data is decompressed by audio CODEC 161 and emitted to the visitor via the speakers 157.

With further reference to FIG. 5, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 5, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 5, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 5, the camera PCB 147 may comprise components that facilitate the operation of the camera 134 (FIG. 3). For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p, 1080p, etc.) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133 and its associated components. An example A/V recording and communication security camera may further omit other components, such as, for example, the bracket PCB 149 and its associated components.

Figure 6:
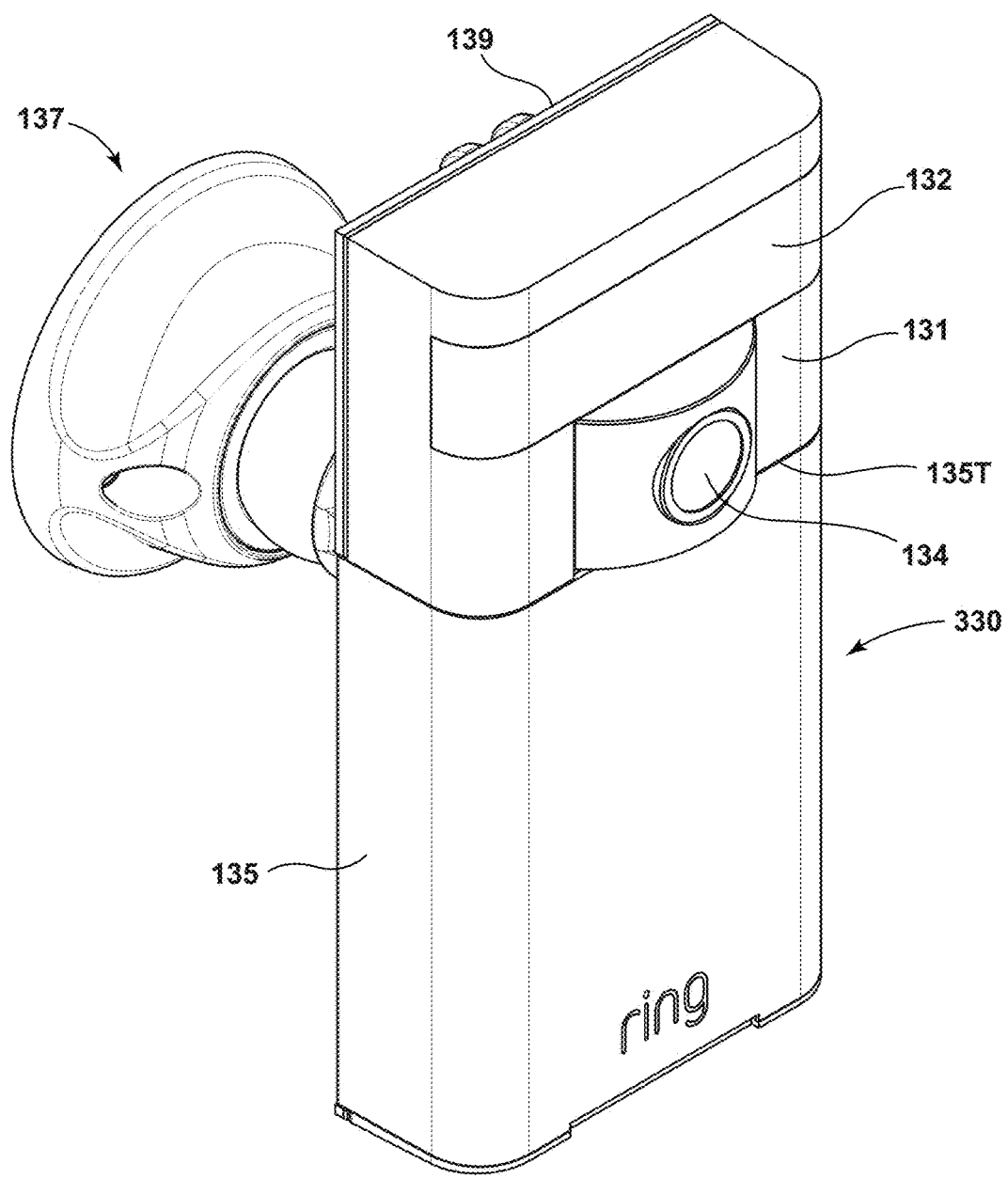
FIG. 6 is an upper front perspective view of an A/V recording and communication security camera according to various aspects of the present disclosure.
Figure 7:
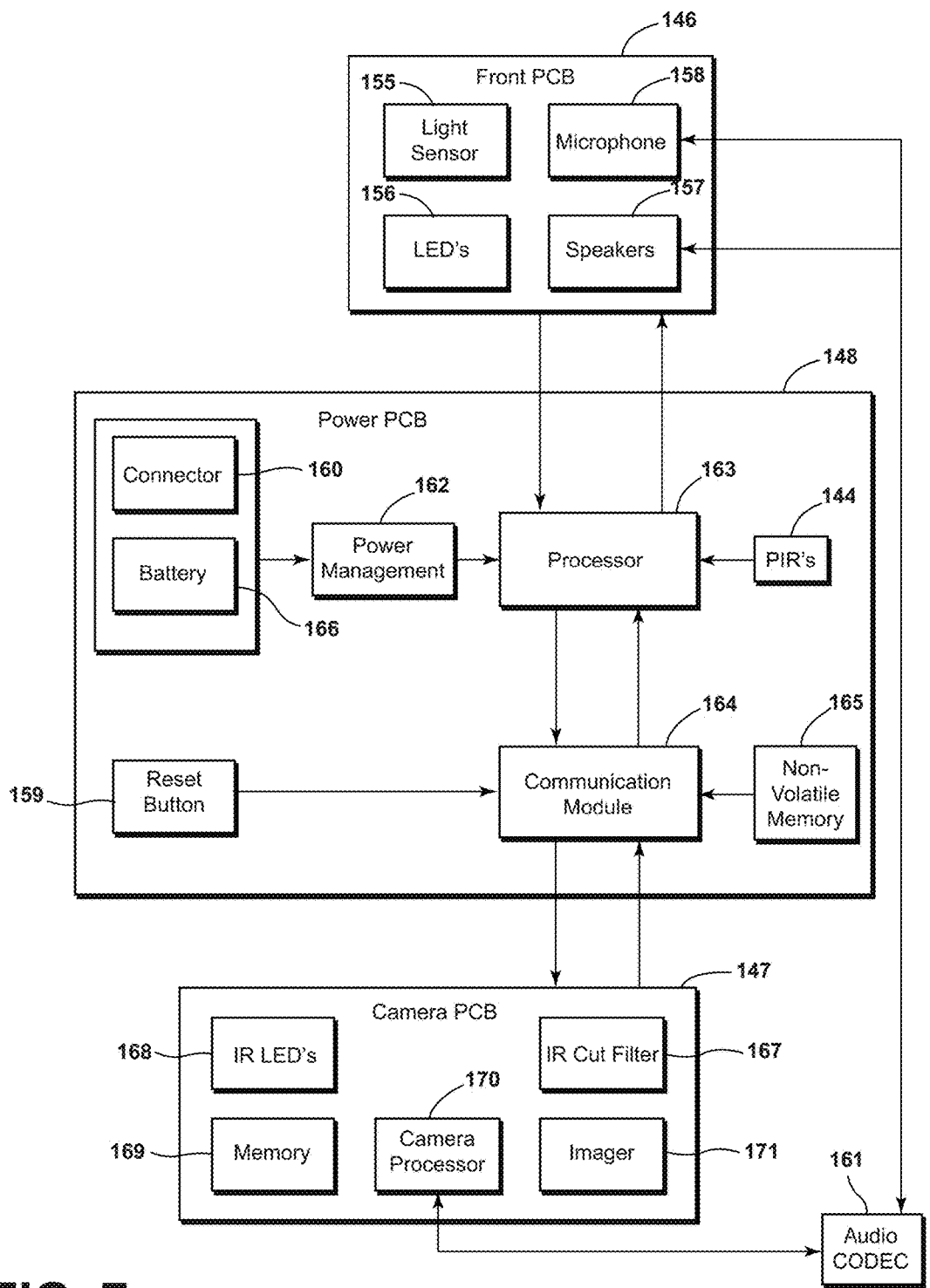
FIG. 7 is a functional block diagram of the components of the A/V recording and communication security camera of FIG. 6.

FIGS. 6 and 7 illustrate an example A/V recording and communication security camera according to various aspects of the present embodiments. With reference to FIG. 6, the security camera 330, similar to the video doorbell 130, includes a faceplate 135 that is mounted to a back plate 139 and an enclosure 131 that engages the faceplate 135. Collectively, the faceplate 135, the back plate 139, and the enclosure 131 form a housing that contains and protects the inner components of the security camera 330. However, unlike the video doorbell 130, the security camera 330 does not include any front button 133 for activating the doorbell. The faceplate 135 may comprise any suitable material, including, without limitation, metals, such as brushed aluminum or stainless steel, metal alloys, or plastics. The faceplate 135 protects the internal contents of the security camera 330 and serves as an exterior front surface of the security camera 330.

With continued reference to FIG. 6, the enclosure 131 engages the faceplate 135 and abuts an upper edge 135T of the faceplate 135. As discussed above with reference to FIG. 3, in alternative embodiments, one or more gaps between the enclosure 131 and the faceplate 135 may facilitate the passage of sound and/or light through the security camera 330. The enclosure 131 may comprise any suitable material, but in some embodiments the material of the enclosure 131 preferably permits infrared light to pass through from inside the security camera 330 to the environment and vice versa. The security camera 330 further includes a lens 132. Again, similar to the video doorbell 130, in some embodiments, the lens may comprise a Fresnel lens, which may be patterned to deflect incoming light into one or more infrared sensors located within the security camera 330. The security camera 330 further includes a camera 134, which captures video data when activated, as described above and below.

With further reference to FIG. 6, the enclosure 131 may extend from the front of the security camera 330 around to the back thereof and may fit snugly around a lip (not shown) of the back plate 139. The back plate 139 may comprise any suitable material, including, without limitation, metals, such as brushed aluminum or stainless steel, metal alloys, or plastics. The back plate 139 protects the internal contents of the security camera 330 and serves as an exterior rear surface of the security camera 330. The faceplate 135 may extend from the front of the security camera 330 and at least partially wrap around the back plate 139, thereby allowing a coupled connection between the faceplate 135 and the back plate 139. The back plate 139 may have indentations (not shown) in its structure to facilitate the coupling.

With continued reference to FIG. 6, the security camera 330 further comprises a mounting apparatus 137. The mounting apparatus 137 facilitates mounting the security camera 330 to a surface, such as an interior or exterior wall of a building, such as a home or office. The faceplate 135 may extend from the bottom of the security camera 330 up to just below the camera 134, and connect to the back plate 139 as described above. The lens 132 may extend and curl partially around the side of the security camera 330. The enclosure 131 may extend and curl around the side and top of the security camera 330, and may be coupled to the back plate 139 as described above. The camera 134 may protrude from the enclosure 131, thereby giving it a wider field of view. The mounting apparatus 137 may couple with the back plate 139, thereby creating an assembly including the security camera 330 and the mounting apparatus 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V recording and communication security camera of FIG. 6. With reference to FIG. 7, the interior of the wireless security camera 130 comprises a plurality of printed circuit boards, including a front PCB 146, a camera PCB 147, and a power PCB 148, each of which is described below. The camera PCB 147 comprises various components that enable the functionality of the camera 134 of the security camera 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the security camera 130 can clearly capture images at night (may be referred to as "night vision").

The front PCB 146 comprises various components that enable the functionality of the audio and light components, including a light sensor 155, one or more speakers 157, and a microphone 158. The light sensor 155 may be one or more sensors capable of detecting the level of ambient light of the surrounding environment in which the security camera 130 may be located. The speakers 157 may be any electromechanical device capable of producing sound in response to an electrical signal input. The microphone 158 may be an acoustic-to-electric transducer or sensor capable of converting sound waves into an electrical signal. The front PCB 146 and all components thereof may be electrically coupled to the power PCB 148, thereby allowing data and/or power to be transferred to and from the power PCB 148 and the front PCB 146.

The speakers 157 and the microphone 158 may be coupled to a camera processor 170 on the camera PCB 147 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network (Internet/PSTN) 112, routed by one or more servers 118, and delivered to the user's client device 114. When the user speaks, after being transferred through the network (Internet/PSTN) 112, digital audio data is decompressed by audio CODEC 161 and emitted to the visitor via the speakers 157.

With continued reference to FIG. 7, the power PCB 148 comprises various components that enable the functionality of the power and device-control components, including a power management module 162, a processor 163, a communication module 164, and power PCB non-volatile memory 165. In certain embodiments, the power management module 162 may comprise an integrated circuit capable of arbitrating between multiple voltage rails, thereby selecting the source of power for the security camera 130. The battery 166 and/or the connector 160 may each provide power to the power management module 162. The power management module 162 may have separate power rails dedicated to the battery 166 and the connector 160. The power management module 162 may control charging of the battery 166 when the connector 160 is connected to an external source of power, and may also serve as a conduit for data between the connector 160 and the processor 163.

With further reference to FIG. 7, in certain embodiments the processor 163 may comprise an integrated circuit including a processor core, memory, and programmable input/output peripherals. The processor 163 may receive input signals, such as data and/or power, from the PIR sensors 144, the power management module 162, the light sensor 155, the microphone 158, and/or the communication module 164, and may perform various functions as further described below. When the processor 163 is triggered by the PIR sensors 144, the processor 163 may be triggered to perform one or more functions, such as initiating recording of video images via the camera 134. When the light sensor 155 detects a low level of ambient light, the light sensor 155 may trigger the processor 163 to enable "night vision," as further described below. The processor 163 may also act as a conduit for data communicated between various components and the communication module 164.

With further reference to FIG. 7, the security camera 130 further comprises a communication module 164 coupled to the power PCB 148. The communication module 164 facilitates communication with devices in one or more remote locations, as further described below. The communication module 164 may comprise an integrated circuit including a processor core, memory, and programmable input/output peripherals. The communication module 164 may also be configured to transmit data wirelessly to a remote network device, such as the user's client device 114, the remote storage device 116, and/or the remote server 118, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the processor 163, the reset button 159, and/or the power PCB non-volatile memory 165. When the reset button 159 is pressed, the communication module 164 may be triggered to erase any data stored at the power PCB non-volatile memory 165 and/or at the camera PCB memory 169. The communication module 164 may also act as a conduit for data communicated between various components and the processor 163. The power PCB non-volatile memory 165 may comprise flash memory configured to store and/or transmit data. For example, in certain embodiments the power PCB non-volatile memory 165 may comprise serial peripheral interface (SPI) flash memory.

With continued reference to FIG. 7, the power PCB 148 further comprises the connector 160 described above and a battery 166. The connector 160 may protrude outward from the power PCB 148 and extend through a hole in the back plate 139. The battery 166, which may be a rechargeable battery, may provide power to the components of the security camera 130.

With continued reference to FIG. 7, the power PCB 148 further comprises passive infrared (PIR) sensors 144, which may be secured on or within a PIR sensor holder (not shown) that resides behind the lens 132 (FIG. 6). The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

With further reference to FIG. 7, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the security camera 130 enclosure out to the environment, and the IR cut filter 167 may enable the imager 171 to see this infrared light as it is reflected or refracted off of objects within the field of view of the doorbell. This process may provide the security camera 130 with the "night vision" function mentioned above.

Figure 8:
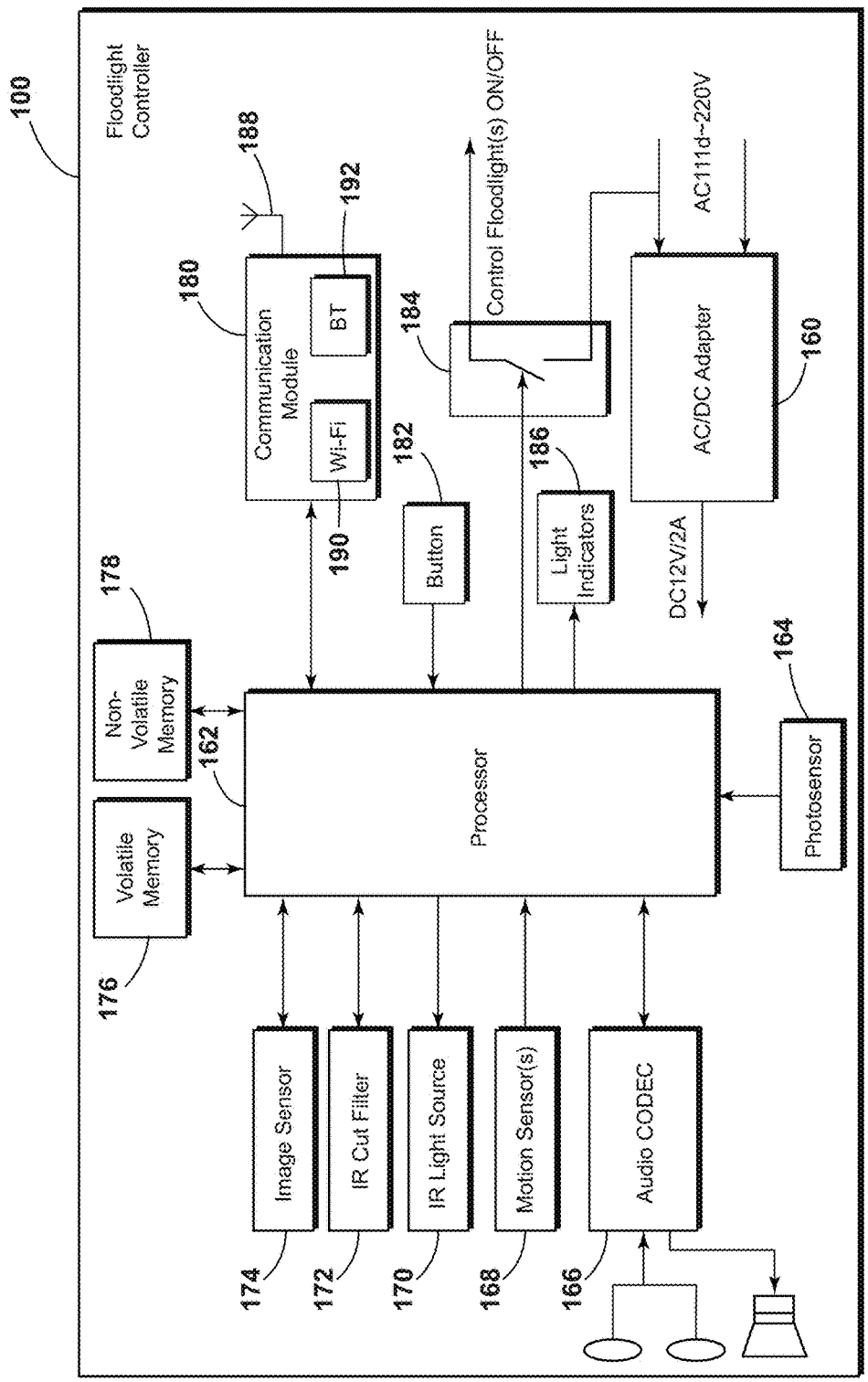
FIG. 8 is a functional block diagram of the components of a floodlight controller with A/V recording and communication features according to various aspects of the present disclosure.
Figure 9:
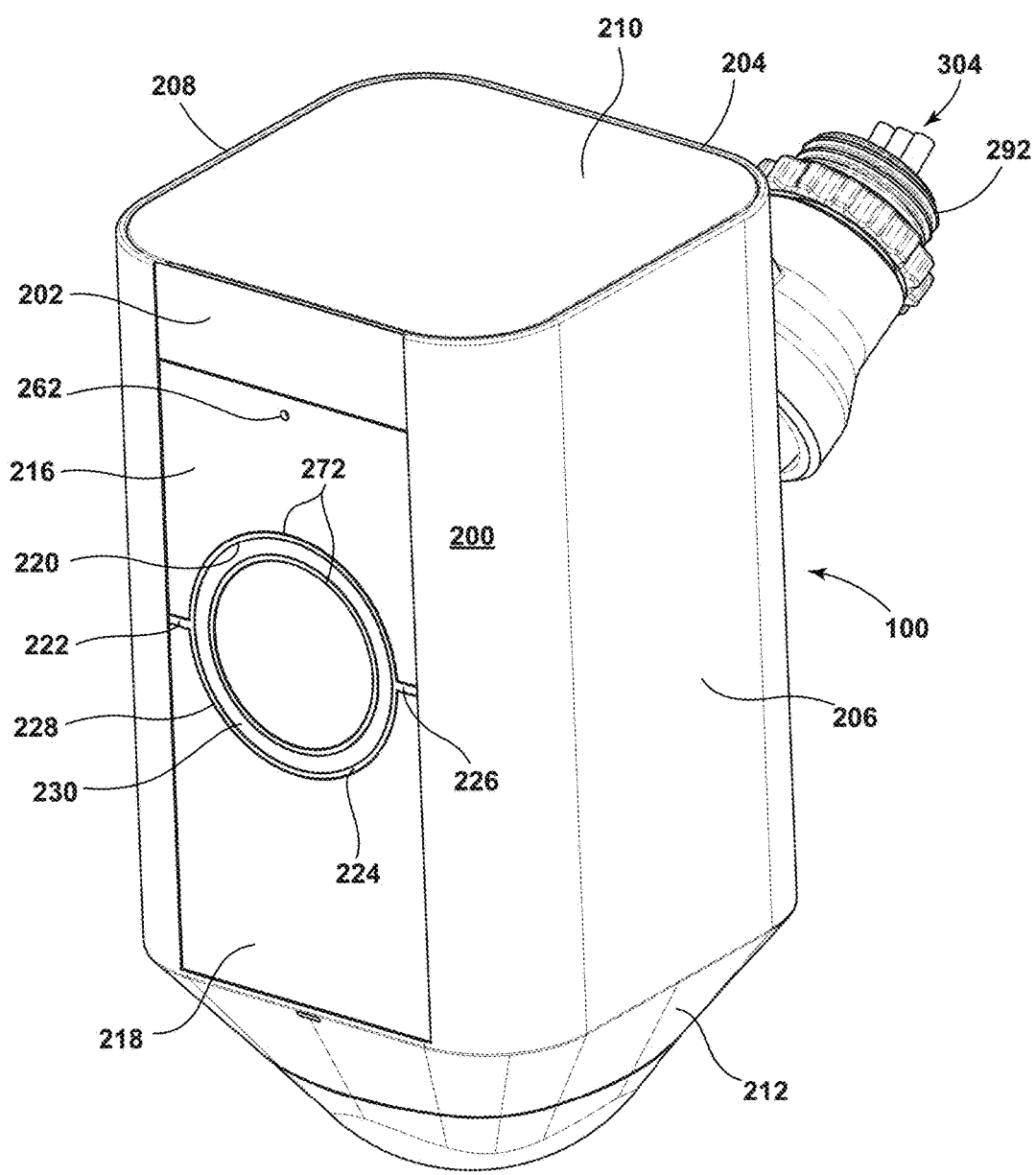
FIG. 9 is an upper front perspective view of a floodlight controller with A/V recording and communication features according to various aspects of the present disclosure.
Figure 10:
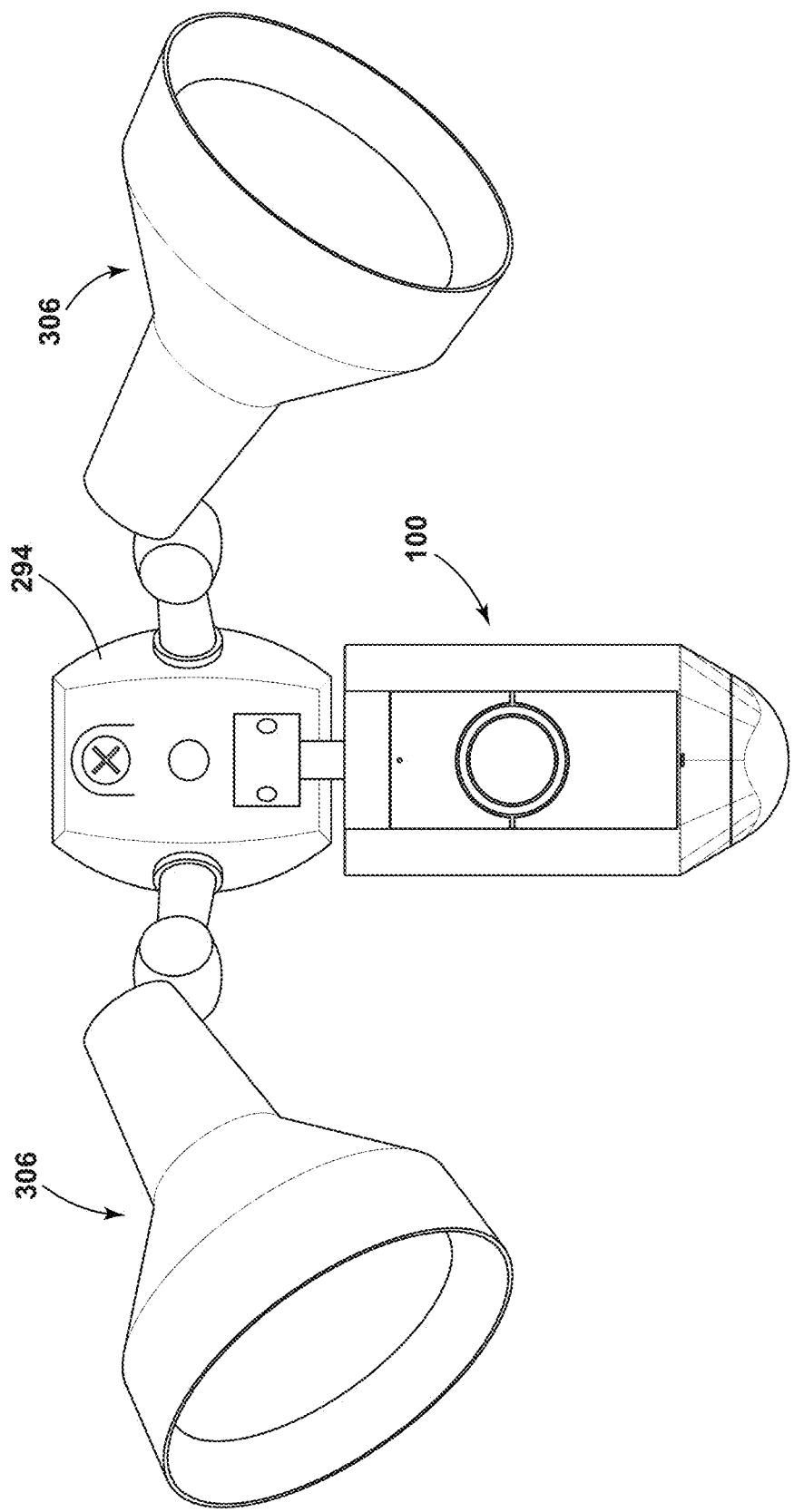
FIG. 10 is a front elevation view of the floodlight controller with A/V recording and communication features of FIG. 9 in combination with a floodlight device according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 8-10 illustrate an example A/V recording and communication floodlight controller according to various aspects of the present embodiments. FIG. 8 is a functional block diagram illustrating various components of the floodlight controller 100 and their relationships to one another. For example, the floodlight controller 100 comprises an AC/DC adapter 160. The floodlight controller 100 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 160, which may convert the incoming AC power to DC (direct-current) and may step down the voltage from 110-220 VAC to a lower output voltage of about 12 VDC and an output current of about 2 A, for example. In various embodiments, the output of the AC/DC adapter 160 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 100 further comprises other components, including a processor 162 (may also be referred to as a controller), a photosensor 164, an audio CODEC (coder-decoder) 166, the at least one speaker 108, the at least one microphone 106, at least one motion sensor 168, an infrared (IR) light source 170, an IR cut filter 172, an image sensor 174 (may be a component of the camera 104, and may be referred to interchangeably as the camera 104), volatile memory 176, non-volatile memory 178, a communication module 180, a button 182, a switch 184 for controlling one or more floodlights, and a plurality of light indicators 186. Each of these components is described in detail below.

With further reference to FIG. 8, the processor 162 may perform data processing and various other functions, as described below. The processor 162 may comprise an integrated circuit including a processor core, the volatile memory 176, the non-volatile memory 178, and/or programmable input/output peripherals (not shown). The volatile memory 176 may comprise, for example, DDR3 SDRAM (double data rate type three synchronous dynamic random-access memory). The non-volatile memory 178 may comprise, for example, NAND flash memory. In the embodiment illustrated in FIG. 8, the volatile memory 176 and the non-volatile memory 178 are illustrated outside the box representing the processor 162. The embodiment illustrated in FIG. 8 is, however, merely an example, and in some embodiments the volatile memory 176 and/or the non-volatile memory 178 may be physically incorporated with the processor 162, such as on the same chip. The volatile memory 176 and/or the non-volatile memory 178, regardless of their physical location, may be shared by one or more other components (in addition to the processor 162) of the present floodlight controller 100.

With further reference to FIG. 8, the image sensor 174 (camera 104), the IR light source 170, the IR cut filter 172, and the photosensor 164 are all operatively coupled to the processor 162. As described in detail below, the IR light source 170 and the IR cut filter 172 facilitate "night vision" functionality of the camera 104. For example, the photosensor 164 is configured to detect the level of ambient light about the floodlight controller 100. The processor 162 uses the input from the photosensor 164 to control the states of the IR light source 170 and the IR cut filter 172 to activate and deactivate night vision, as described below. In some embodiments, the image sensor 174 may comprise a video recording sensor or a camera chip. In some embodiments, the IR light source 170 may comprise one or more IR light-emitting diodes (LEDs).

With further reference to FIG. 8, the at least one speaker 108 and the at least one microphone 106 are operatively coupled to the audio CODEC 166, which is operatively coupled to the processor 162. The transfer of digital audio between the user and a visitor (or intruder) may be compressed and decompressed using the audio CODEC 166, as described below. The motion sensor(s) 168 is also operatively coupled to the processor 162. The motion sensor(s) 168 may comprise, for example, passive infrared (PIR) sensors, or any other type of sensor capable of detecting and communicating to the processor 162 the presence and/or motion of an object within its field of view. When the processor 162 is triggered by the motion sensor(s) 168, the processor 162 may perform one or more functions, as described below.

With further reference to FIG. 8, the communication module 180 is operatively coupled to the processor 162. The communication module 180, which includes at least one antenna 188, is configured to handle communication links between the floodlight controller 100 and other, external devices or receivers, and to route incoming/outgoing data appropriately. For example, inbound data from the antenna(s) 188 may be routed through the communication module 180 before being directed to the processor 162, and outbound data from the processor 162 may be routed through the communication module 180 before being directed to the antenna(s) 188. The communication module 180 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 180 includes a Wi-Fi chip 190 and a Bluetooth chip 192, but these components are merely examples and are not limiting. Further, while the Wi-Fi chip 190 and the Bluetooth chip 192 are illustrated within the box representing the communication module 180, the embodiment illustrated in FIG. 8 is merely an example, and in some embodiments the Wi-Fi chip 190 and/or the Bluetooth chip 192 are not necessarily physically incorporated with the communication module 180.

In some embodiments, the communication module 180 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 180, and may thus connect to the user's network 110 through the floodlight controller 100. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 100 speaks, audio from the visitor (or intruder) is received by the microphone(s) 106 and compressed by the audio CODEC 166. Digital audio data is then sent through the communication module 180 to the network 112 (FIG. 1) via the user's network 110, routed by the server 118 and/or the API 120, and delivered to the user's client device 114. When the user speaks, after being transferred through the network 112, the user's network 110, and the communication module 180, the digital audio data from the user is decompressed by the audio CODEC 166 and emitted to the visitor through the speaker 108, which may be driven by a speaker 108 driver (not shown).

With further reference to FIG. 8, the button 182 is operatively coupled to the processor 162. The button 182 may have one or more functions, such as changing an operating mode of the floodlight controller 100 and/or triggering a reset of the floodlight controller 100. For example, when the button 182 is pressed and released, it may cause the communication module 180 of the floodlight controller 100 to enter access point (AP) mode, which may facilitate connecting the floodlight controller 100 to the user's network 110. Alternatively, or in addition, when the button 182 is pressed and held down for at least a threshold amount of time, it may trigger the erasing of any data stored at the volatile memory 176 and/or at the non-volatile memory 178, and/or may trigger a reboot of the processor 162.

With reference to FIG. 9, the floodlight controller 100 comprises a housing 200 for containing and protecting the interior components of the floodlight controller 100. The housing 200 includes a front wall 202, a rear wall 204, opposing side walls 206, 208, an upper wall 210, and a tapered lower portion 212. The front wall 202 includes a central opening 214 that receives an upper shield 216 and a lower grill 218. In the illustrated embodiment, front surfaces of the upper shield 216 and the lower grill 218 are substantially flush with a front surface of the front wall 202, but in alternative embodiments these surfaces may not be flush with one another. The upper shield 216 is substantially rectangular, and includes a semicircular indentation 220 along its lower edge 222. The lower grill 218 is substantially rectangular, and includes a semicircular indentation 224 along its upper edge 226. Together, the semicircular indentations 220, 224 in the upper shield 216 and the lower grill 218 form a circular opening 228 that accommodates a light pipe 230. A cover 232 extends across and closes an outer open end of the light pipe 230. The upper shield 216, the lower grill 218, the light pipe 230, and the cover 232 are all described in further detail below. The camera (not shown) is located in the circular opening 228 formed by the upper shield 216 and the lower grill 218, behind the cover 232, and is surrounded by the light pipe 230.

With reference to FIG. 8, the floodlight controller 100 further comprises the microphones 106. In the illustrated embodiment, a first one 258 of the microphones 106 is located along the front of the floodlight controller 100 behind the upper shield 216 (FIG. 9) and a second one 260 of the microphones 106 is located along the left side of the floodlight controller 100 behind the left-side wall 208 (FIG. 9) of the housing 200. Including two microphones 258, 260 that are spaced from one another and located on different sides of the floodlight controller 100 provides the illustrated embodiment of the floodlight controller 100 with advantageous noise cancelling and/or echo cancelling for clearer audio. The illustrated embodiment is, however, just one example and is not limiting. Alternative embodiments may only include one microphone 104, or include two microphones 104 in different locations than as illustrated in FIG. 6.

With reference to FIG. 9, the upper shield 216 may include a first microphone opening 262 located in front of the first microphone 258 to facilitate the passage of sound through the upper shield 216 so that sounds from the area about the floodlight controller 100 can reach the first microphone 258. The left-side wall 208 of the housing 200 may include a second microphone opening (not shown) located in front of the second microphone 260 that facilitates the passage of sound through the left-side wall 208 of the housing 200 so that sounds from the area about the floodlight controller 100 can reach the second microphone 260.

With further reference to FIG. 9, the floodlight controller 100 may further comprise a light barrier 272 surrounding inner and outer surfaces of the light pipe 230. The light barrier 272 may comprise a substantially opaque material that prevents the light generated by the light indicators 186 from bleeding into the interior spaces of the floodlight controller 100 around the light pipe 230. The light barrier 272 may comprise a resilient material, such as a plastic, which may also advantageously provide moisture sealing at the junctures between the light pipe 230 and the upper shield 216 and the lower grill 218. Portions of the light barrier 272 may also extend between the junctures between the upper shield 216 and the lower grill 218.

With further reference to FIG. 9, the floodlight controller 100 further comprises connecting hardware 292 configured for connecting the floodlight controller 100 to a floodlight device 294 (FIG. 10) and a power source (not shown). The floodlight controller 100 further comprises a plurality of wires 304 for connecting the floodlight controller 100 to the power supply and to the floodlight(s) 306 (FIG. 10) of the floodlight device 294 (for enabling the floodlight controller 100 to turn the floodlight(s) 306 on and off). In the illustrated embodiment, three wires 304 are shown, but the illustrated embodiment is merely one example and is not limiting. In alternative embodiments, any number of wires 304 may be provided.

As described above, the present embodiments leverage the capabilities of audio/video (A/V) recording and communication devices, thereby providing enhanced functionality to such devices to reduce crime and increase public safety.

One aspect of the present embodiments includes the realization that a person and/or an object of interest is typically not stationary. For example, when an A/V recording and communication device records video footage of suspicious and/or criminal activity, the suspect in the video footage is likely to be moving. The sharing of such video footage may alert neighbors to the potential dangers, particularly because the suspect may still be in the vicinity (e.g., the neighborhood). It would be advantageous then to enhance the functionality of A/V recording and communication devices by using shared video footage to identify one or more cameras to power up and record additional video footage. For example, a neighborhood may include multiple camera devices such as (but not limited to) first cameras and second cameras of various A/V recording and communication devices, and one or more of the second cameras may be configured to power up and capture additional image data (and, in some embodiments, audio data) based on shared video footage from a first camera. Further, the functionality of A/V recording and communication devices may be enhanced by using any report of a crime from any source to power up one or more cameras to capture image and/or audio data. Still further, the functionality of the A/V recording and communication devices can be enhanced so that, upon receipt of a "neighborhood alert" signal, the cameras of all such devices within a neighborhood are powered up to capture additional image data (and in some embodiments, audio data) that may be useful for tracking a suspects movements, recording the actions or presence of accomplices, or recording other images that might warn residents or help to late solve a crime being perpetrated. Moreover, the present embodiments improve upon and solve the problem of resource management by using a power-up command signal to configure the one or more cameras to switch from a low-power state to a powered-on state, thereby conserving power. The present embodiments provide these advantages, as described below.

Another aspect of the present embodiments includes the realization that, at a single property, a user may install multiple A/V recording and communication devices, and may wish to have them linked together so that, if one such device senses motion and records image data of a source of motion that is moving toward a second such device, the second such device is alerted or activated to "track" the source of the motion from the field of view of first device to the field of view of the second device. In this way, the security of the property and residents will be enhanced and a better recorded of the source of motion may be available for use by the user or law enforcement authorities.

Yet another aspect of the present embodiments includes the realization that, when users install multiple A/V recording and communication devices at a single property, and such devices each record image data of a source of motion moving around the property, e.g., moving from the field of view of a first camera and into the field of view of a second camera, the user may desire to view such image data as a linked or unified whole, rather than as separate images or separate image files. The present embodiments provide for "camera event stitching" to create a series of "storyboard" images for activity taking place across the fields of view of multiple cameras, within a predetermined time period. This provides the advantages of user convenience in viewing recorded image data, as well as coherence in understanding the timing and sequence of the recorded images.

Some of the present embodiments comprise computer vision for one or more aspects, such as object recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication device 130 may include a computer vision module 163. The computer vision module 163 may include any of the components (e.g. hardware) and/or functionality described herein with respect to computer vision, including, without limitation, one or more cameras, sensors, and/or processors. In some embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

Figure 11:
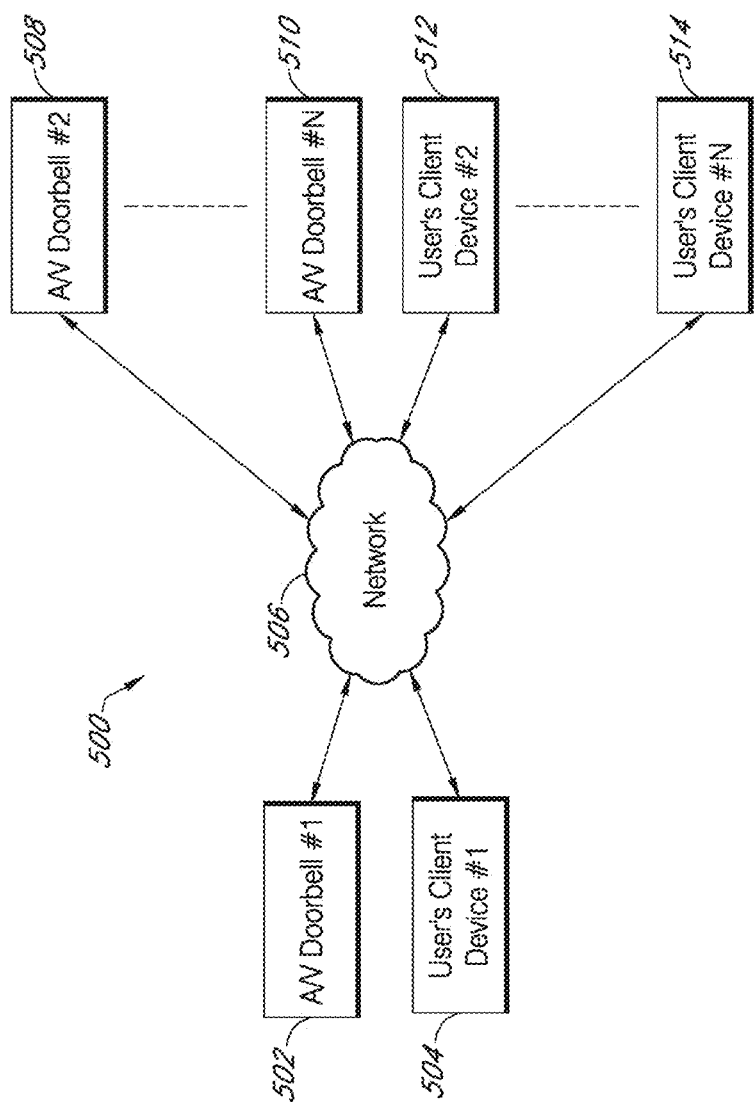
FIG. 11 is a functional block diagram illustrating a system for sharing video footage from audio/video recording and communication devices according to the present embodiments.

FIG. 11 illustrates a system 500 for sharing video footage from A/V recording and communication devices according to the present embodiments. The illustrated system 500 includes a first A/V recording and communication doorbell 502 (labeled "A/V Doorbell #1"). The first A/V doorbell 502 may have, for example, similar components and/or functionality as the doorbell 130 described herein. Alternatively, the first A/V doorbell 502 may have different components and/or functionality as the doorbell 130, but may nevertheless be capable of recording video footage and/or audio and wirelessly transmitting the recorded video footage and/or audio. In certain embodiments, the first A/V doorbell 502 may not be a doorbell at all, but may be, for example, an A/V recording and communication security camera.

With further reference to FIG. 11, the system 500 further includes a first client device 504 (labeled "Client Device #1") associated with the first A/V doorbell 502. The first client device 504 and the first A/V doorbell 502 may be owned by and/or controlled by the same user. The first client device 504 may have, for example, similar components and/or functionality as the user's client device 114 described herein, and may comprise, for example, a mobile telephone (may also be referred to as a cellular telephone), such as a smartphone, a personal digital assistant (PDA), or another communication and/or computing device. The system 500 further includes a network 506. The network 506, which may comprise, for example, the Internet and/or a public switched telephone network (PSTN) 112, includes a plurality of network devices, such as one or more servers, routers, switches, storage devices, etc. (not shown). The system 500 further includes a plurality of other A/V doorbells 508, 510 (labeled "A/V Doorbell #2" through "A/V Doorbell #N") and a plurality of other client devices 512, 514 (labeled "Client Device #2" through "Client Device #N"). The other client devices 512, 514 are each associated with a corresponding one of the other A/V doorbells 508, 510. The other A/V doorbells 508, 510 may have, for example, similar components and/or functionality as the first A/V doorbell 502, and the other client devices 512, 514 may have, for example, similar components and/or functionality as the first client device 504.

In the system 500 of FIG. 11, any of the A/V doorbells may record video footage from an area within a field of view of the respective doorbell. The owner (or a user) of the doorbell that has recorded video footage may share the video footage with one or more other owners/users of the other A/V doorbells. The determination of which users will receive a notification of the shared video footage may be based on the relative locations of the A/V doorbells associated with the different users. More particularly, a given user (USER X) may receive a notification of the shared video footage if the shared video footage was recorded by one of the A/V doorbells that is located within a predetermined distance of USER X's own A/V doorbell. Further, in certain embodiments the predetermined distance may be configurable by USER X. Example processes for such sharing of recorded video footage are described below with reference to FIGS. 12-14.

Figure 12:
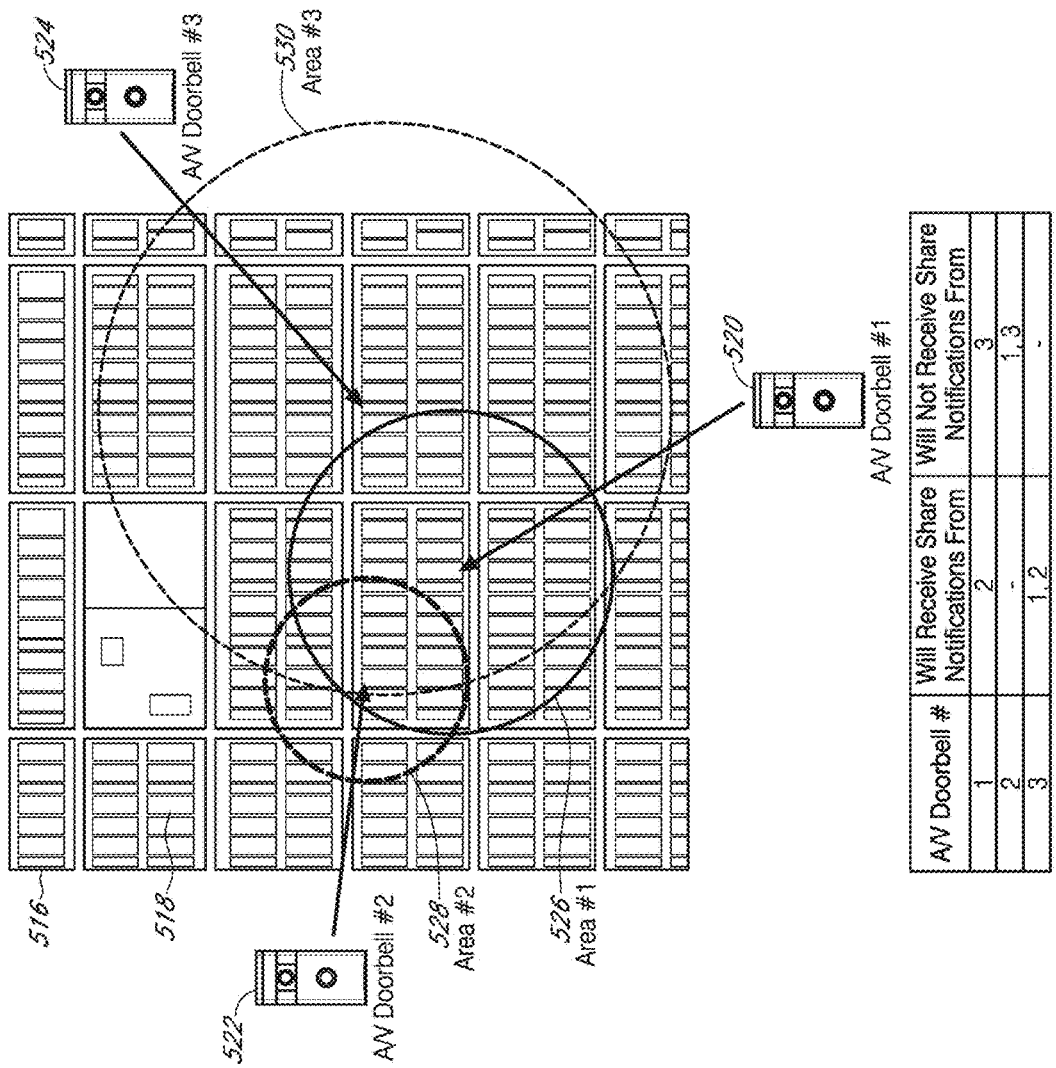
FIG. 12 is a top plan view of a neighborhood with a plurality of A/V recording and communication doorbells according to an aspect of the present disclosure.

FIG. 12 illustrates a neighborhood 516 comprising a plurality of buildings 518, such as homes, offices, retail businesses, warehouses, etc. At least some of the buildings 518 include A/V recording and communication doorbells secured to an exterior surface, such as adjacent the front door. For example, FIG. 12 illustrates three A/V doorbells (A/V Doorbell #1 520, A/V Doorbell #2 522, A/V Doorbell #3 524) associated with three different buildings. Each of the A/V doorbells 520, 522, 524 has a defined area around it represented by the three overlapping circles (Area #1 526, Area #2 528, Area #3 530). Each circle 526, 528, 530 represents the area from which the owner/user of the A/V doorbell at the center of the circle will receive notifications of shared video footage recorded by other A/V doorbells within the area.

For example, if A/V Doorbell #1 520 records video footage and the owner/user of A/V Doorbell #1 520 shares the recorded video footage, then the owner/user of A/V Doorbell #3 524 will receive a notification of the shared video footage because A/V Doorbell #1 520 is located within Area #3 530, but the owner/user of A/V Doorbell #2 522 will not receive a notification of the shared video footage because A/V Doorbell #1 520 is located outside of Area #2 528. In another example, if A/V Doorbell #2 522 records video footage and the owner/user of A/V Doorbell #2 522 shares the recorded video footage, then the owners/users of A/V Doorbells 1 and 3 will both receive a notification of the shared video footage because A/V Doorbell #2 522 is located within both Area #1 526 and Area #3 530. In another example, if A/V Doorbell #3 524 records video footage and the owner/user of A/V Doorbell #3 524 shares the recorded video footage, then neither of the owners/users of A/V Doorbells 1 and 2 will receive a notification of the shared video footage because A/V Doorbell #3 524 is located outside of both Area #1 526 and Area #2 528. The determinations of which owners/users will receive share notifications, and which owners/users will not receive share notifications, are summarized in the table at the bottom of FIG. 12.

Figure 13:
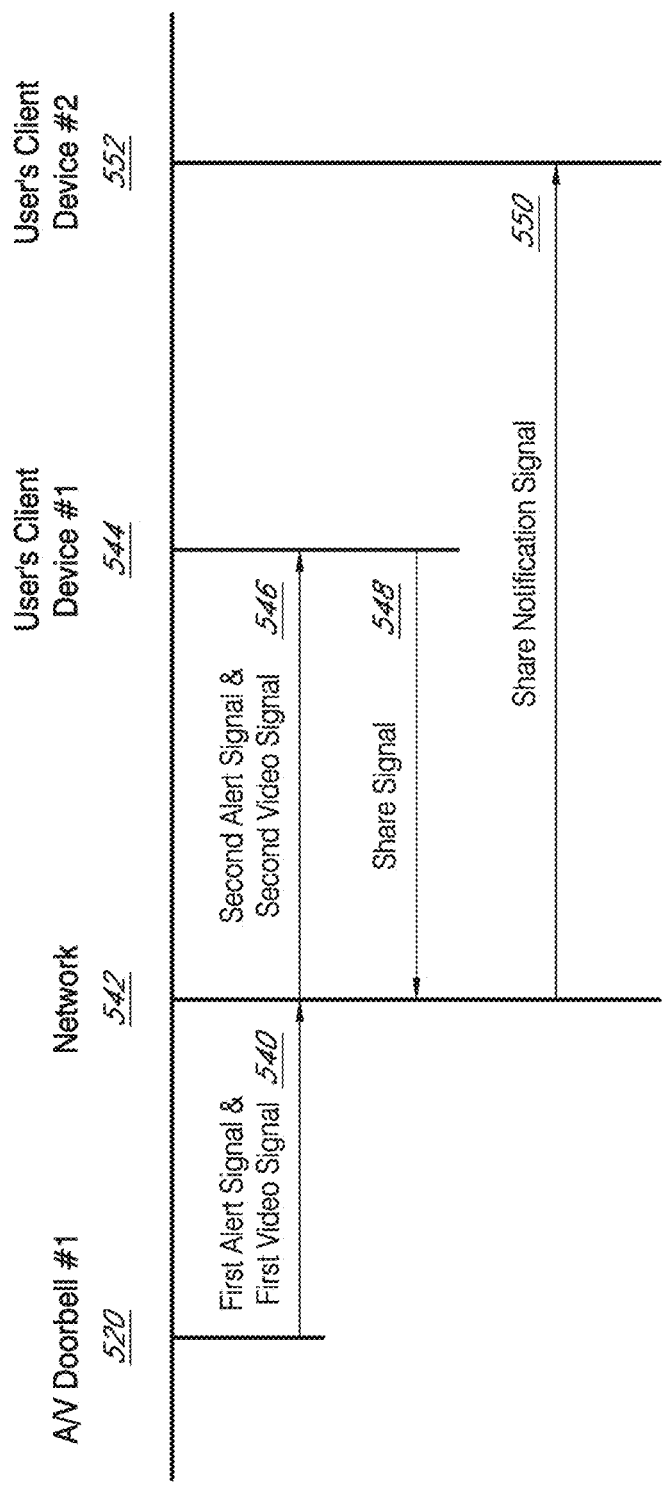
FIG. 13 is a sequence diagram illustrating a process for sharing video footage from an A/V recording and communication doorbell according to an aspect of the present disclosure.

FIG. 13 is a sequence diagram illustrating a process for sharing video footage from an A/V recording and communication doorbell (or other A/V recording and communication device) according to an aspect of the present disclosure. An A/V doorbell 520 (A/V Doorbell #1, FIGS. 12 and 13)

may record video footage, which may also include audio. For example, the doorbell 520 may begin recording the video footage when a visitor is detected at the doorbell 520, which may occur, for example, when the doorbell 520 detects motion or when the visitor presses the front button on the doorbell 520. With further reference to FIG. 13, the doorbell 520 sends a first alert signal and a first video signal 540 to the network 542, and the network 542 receives the first alert signal and the first video signal 540. The network 542 includes one or more network devices, such as, for example, one or more servers, routers, switches, storage devices, etc. (not shown). At least some of the network devices include a processor and a memory. The first video signal includes images (the video footage) captured by a camera of the doorbell 520.

The network 542 transmits to a first client device 544 (User's Client Device #1), in response to receiving the first alert signal and the first video signal 540, a second alert signal and a second video signal 546. The second alert signal may be, for example, a push notification. A push notification, also called a server push notification, is the delivery of information from a software application to a computing device without a specific request from the client. The second video signal includes the images captured by the camera of the doorbell 520. The user associated with the first client device 544 may be the owner/user of the doorbell 520 (A/V Doorbell #1). The user, upon receiving the second alert signal, may choose to answer the second alert signal, which may, for example, open a live call between the user and the visitor at the doorbell 520. Alternatively, the user may ignore the second alert signal (e.g. choose not to answer the call). If the user ignores the second alert signal, he or she may still view the video footage of the second video signal at a later time.

After viewing (or while viewing) the video footage on the display of his or her client device 544, the user may decide to share the video footage with other users. For example, the user may tap a "share" button from within an application executing on his or her client device 544. The first client device 544 then sends a share signal 548 to the network 542, and the network 542 receives the share signal 548 from the first client device 544. In response to receiving the share signal 548 from the first client device 544, at least one of the network devices in the network 542 determines the other users who are to receive a notification of the shared video footage. For example, the network device(s) may determine that the doorbell 520 that recorded the shared video footage is within a predefined distance from at least one other A/V recording and communication doorbell (or other A/V recording and communication device) from among a plurality of other A/V recording and communication doorbells (or other A/V recording and communication devices). For example, with reference to FIG. 12, if the doorbell that recorded the shared video footage is A/V Doorbell #1 520, then the network device(s) may identify at least one other doorbell, such as A/V Doorbell #3 524, having a defined area (Area #3 530) around it that encompasses the location of the doorbell 520 that recorded the shared video footage. Once the other doorbell(s) has/have been identified, the network device(s) may transmit a share notification signal 550 to each client device associated with the other doorbell(s) identified (including at least User's Client Device #3 552). The share notification signal 550 may be, for example, a push notification. The other user(s), upon receiving the share notification signal 550, may choose to view the shared video footage. Alternatively, the other user(s) may ignore the share notification signal 550. If the other user(s) ignores the share notification signal 550, he or she may still view the shared video footage at a later time.

The process described above with reference to FIG. 13 advantageously enables users of A/V recording and communication devices to share video footage with one another. This feature can help reduce crime by increasing public awareness of suspicious activity. For example, a first user may view video footage that was recorded by his or her doorbell and determine that the person or persons in the video footage are, or may be, engaged in criminal activity. The first user may then share that video footage with other users who, after viewing the shared video footage, may be alerted to be on the lookout for the person or persons in the shared video footage and, if one or more such other users observe the person or persons in the shared video footage engaged in further suspicious activity, they may be more likely to report the person or persons to law enforcement.

In the process of FIG. 13, as well as in other processes described herein, a determination is made as to which other users will receive a notification of the video footage that is shared by the first user. This determination is based on the relative locations of the A/V recording and communication devices associated with each of the users. And, as described above with reference to FIG. 12, whether or not a given user (User X) will receive a share notification is dependent upon the distance (alert radius) set by User X with respect to his or her own A/V recording and communication device(s). If the device that recorded the shared video is located within the area(s) defined by User X around his or her own A/V recording and communication device(s), then User X will receive a share notification. If the device that recorded the shared video is located outside the area(s) defined by User X around his or her own A/V recording and communication device(s), then User X will not receive a share notification. Thus, the determination of which users will receive a share notification is not dependent upon an alert radius set by the owner/user of the A/V recording and communication device that recorded the shared video. Rather, that determination is based on the alert radii set by the owners/users of the A/V recording and communication devices other than the device that recorded the shared video, and many of these alert radii may differ from one another. That is, User X1 may set an alert radius of one-half mile around his or her doorbell while User X2 may set an alert radius of three miles around his or her doorbell. If the device that recorded the shared video is within one-half mile of User X1's doorbell, then User X1 will receive a share notification, and if the device that recorded the shared video is within three miles of User X2's doorbell, then User X2 will receive a share notification.

Further, in some instances a first user may not receive a share notification while a second user may receive a share notification, even though the first user's doorbell is located closer to the doorbell that recorded the shared video than the second user's doorbell is. For example, again assume that User X1 has set an alert radius of one-half mile around his or her doorbell while User X2 has set an alert radius of three miles around his or her doorbell. If User X1's doorbell is one mile away from the doorbell that recorded the shared video and User X2's doorbell is two miles away from the doorbell that recorded the shared video, then User X1 will not receive a share notification because the doorbell that recorded the shared video is outside User X1's alert radius, but User X2 will receive a share notification because the doorbell that recorded the shared video is inside User X2's alert radius.

Still further, a given user may have more than one A/V recording and communication device, and at least two of those devices may be in different locations (e.g. not on the same property or attached to the same structure). In such cases, each device may have its own alert radius, and therefore its own defined distance/area for receiving share notifications. Thus, a user may receive a share notification when the device that recorded the shared video is within the defined area around at least one of that user's devices, even if the device that recorded the shared video is outside the defined area around at least one other of that same user's devices.

In some embodiments, a user may have more than one A/V recording and communication device at the same location (e.g. attached to the same structure, or attached to separate structures that are located on the same property). In such cases, devices that are proximate one another may share an alert area. For example, a user may have an A/V recording and communication doorbell located near his or her front door and an A/V recording and communication security camera located at the rear of his or her home. These devices may share one alert radius/alert area.

Still further, users may adjust as desired the size of the defined area(s) around their A/V recording and communication device(s). Information about each A/V recording and communication device in a given set of A/V recording and communication devices may be stored in one or more data structures and accessed when needed to determine which users will receive a share notification whenever a first user shares recorded video footage. When a user adjusts the size of the defined area(s) around his or her A/V recording and communication device(s), the information stored in the data structure(s) may be updated accordingly.

Figure 14:
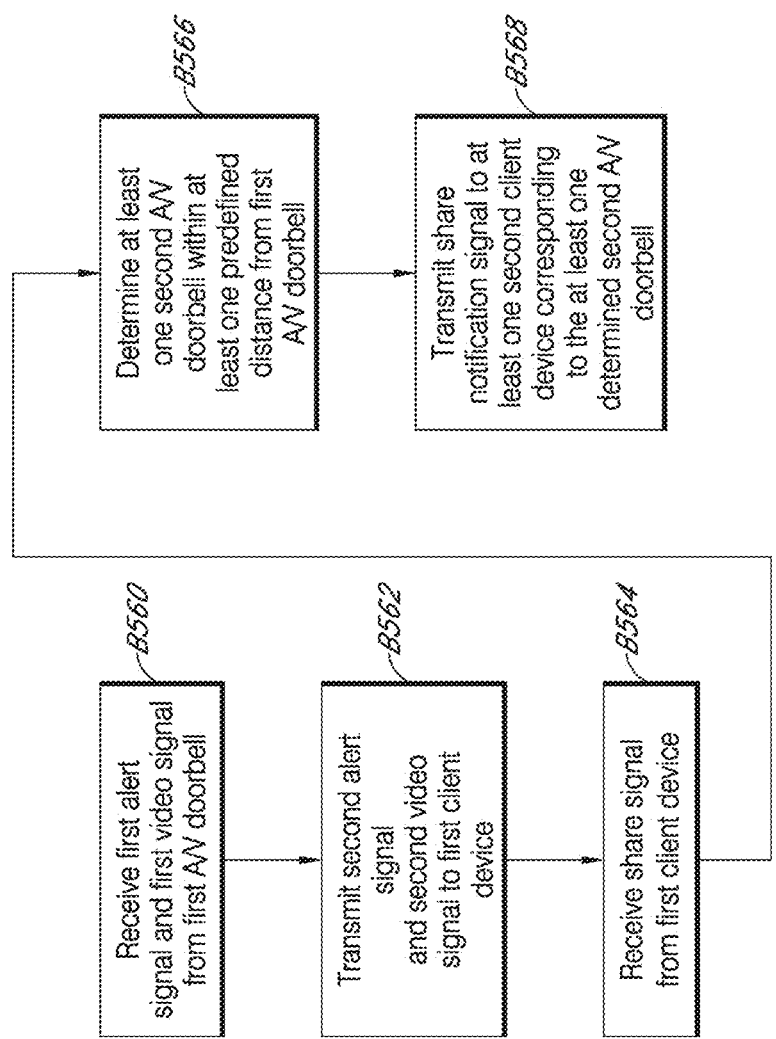
FIG. 14 is a flowchart illustrating another process for sharing video footage from an A/V recording and communication doorbell according to an aspect of the present disclosure.

FIG. 14 is a flowchart illustrating another process for sharing video footage from an A/V recording and communication doorbell (or other A/V recording and communication device) according to an aspect of the present disclosure. The process of FIG. 14 is described from the perspective of the network device(s). Thus, at block B560 the network device(s) receive a first alert signal and a first video signal from a first A/V doorbell. At block B562, the network device(s) transmit a second alert signal and a second video signal to the first client device. At block B564, the network device(s) receive a share signal from the first client device. At block B566, the network device(s) determine at least one second A/V doorbell within at least one predefined distance from the first A/V doorbell. At block B568, the network device(s) transmit a share notification signal to the at least one second client device corresponding to the at least one determined second A/V doorbell.

FIGS. 15-20 are screenshots of a graphical user interface (GUI) 570 illustrating aspects of a process for sharing video footage from an A/V recording and communication device according to an aspect of the present disclosure. The process of FIGS. 15-20 is described from the perspective of a user who receives an alert signal and a video signal on his or her client device. Thus, the GUI 570 illustrated in FIGS. 15-20 is configured to be displayed on a display of the user's client device, such as a smartphone.

Figure 15:
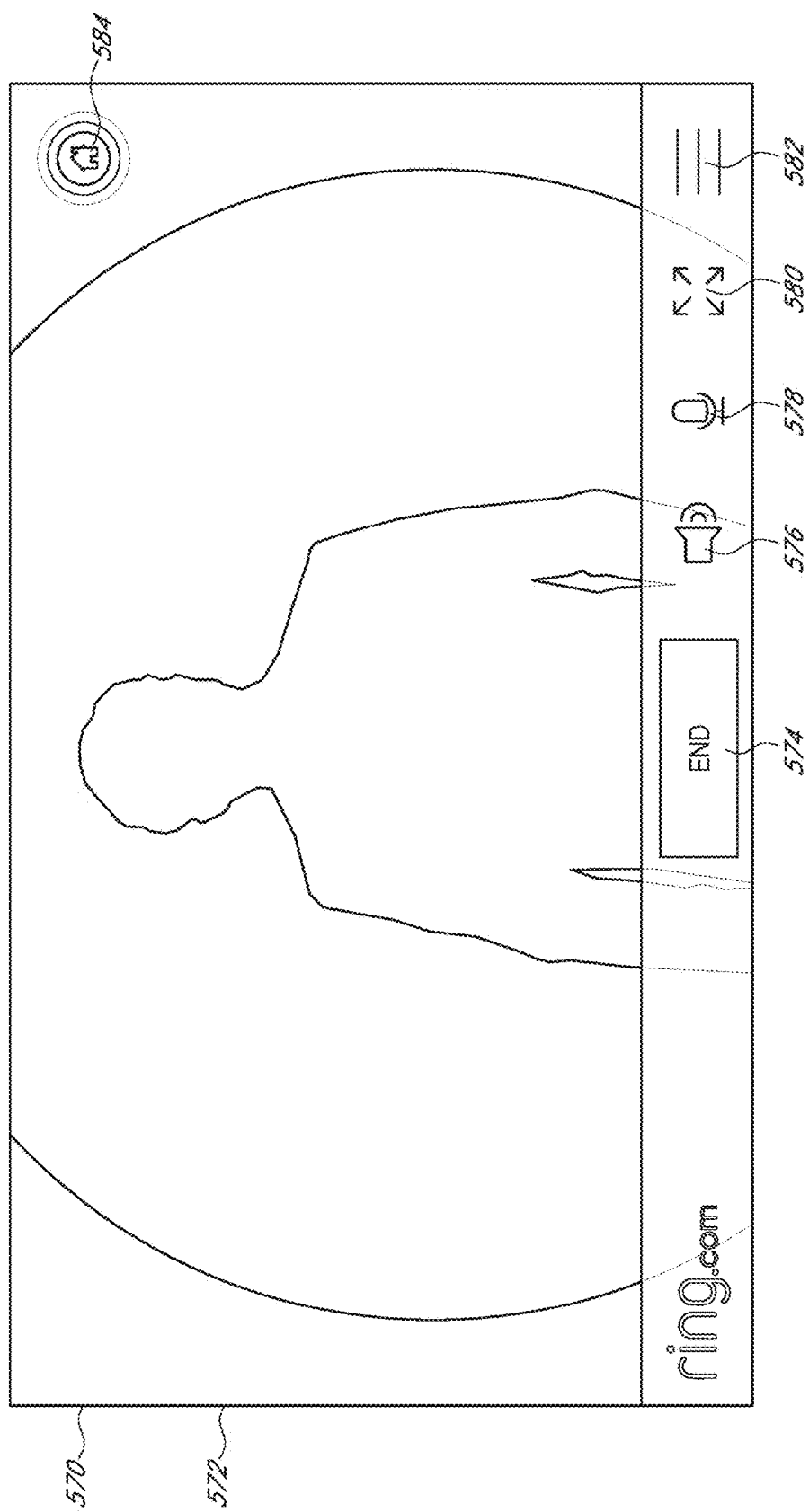
FIGS. 15-19 are screenshots of a graphical user interface (GUI) illustrating aspects of a process for sharing video footage from an A/V recording and communication device according to an aspect of the present disclosure.

With reference to FIG. 15, a live call screen 572 is illustrated. When a user's A/V recording and communication device detects motion, or, in the case of a doorbell, when a visitor presses the front button on the doorbell, the user receives an alert on his or her client device along with streaming video footage recorded by the camera of the A/V recording and communication device. If the user answers the alert, a live call screen 572 such as that shown in FIG. 15 may be displayed on the user's client device. The live call screen 572 may include one or more buttons, such as an END button 574 (to terminate or disconnect the call), a volume adjust button 576, a mute button 578, a full screen button 580 (to expand the video so that it fills the entire display screen), and/or a menu button 582.

Figure 16:
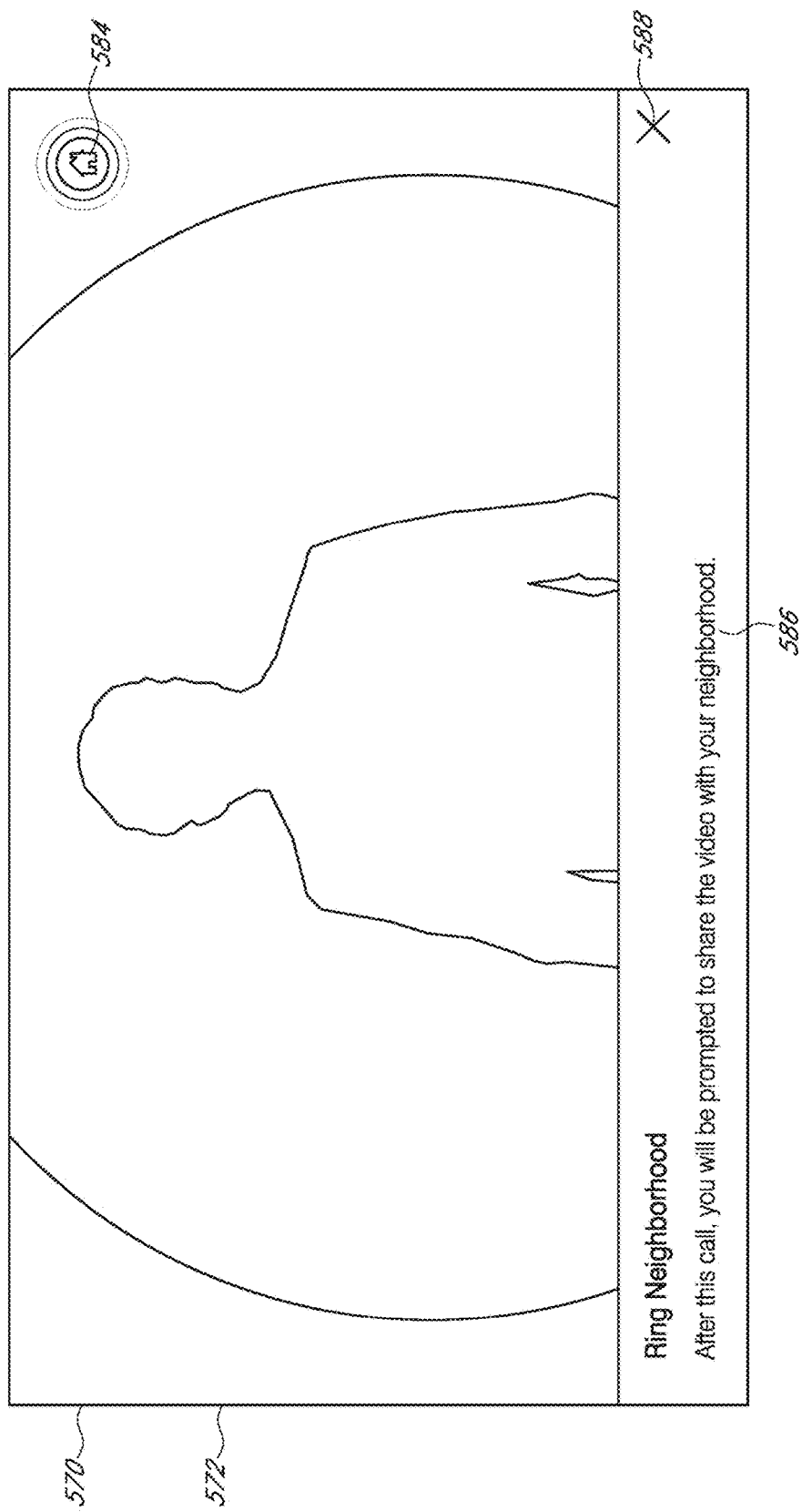

The live call screen 572 may further include a neighborhood share button 584. If the user selects the neighborhood share button 584 during the live call, the GUI 570 may display a notification 586 that the user will be prompted after the live call to share the video of the call with other users in the user's "neighborhood," e.g. those users determined according to the process described above with reference to FIGS. 13 and 14. For example, as shown in FIG. 16, the notification 586 may appear in a banner portion 588 of the live call screen 572. Advantageously, displaying the notification 586 in a banner 588 does not interrupt the live call, so that the user and the visitor can continue speaking to one another for as long as desired.

Figure 17:
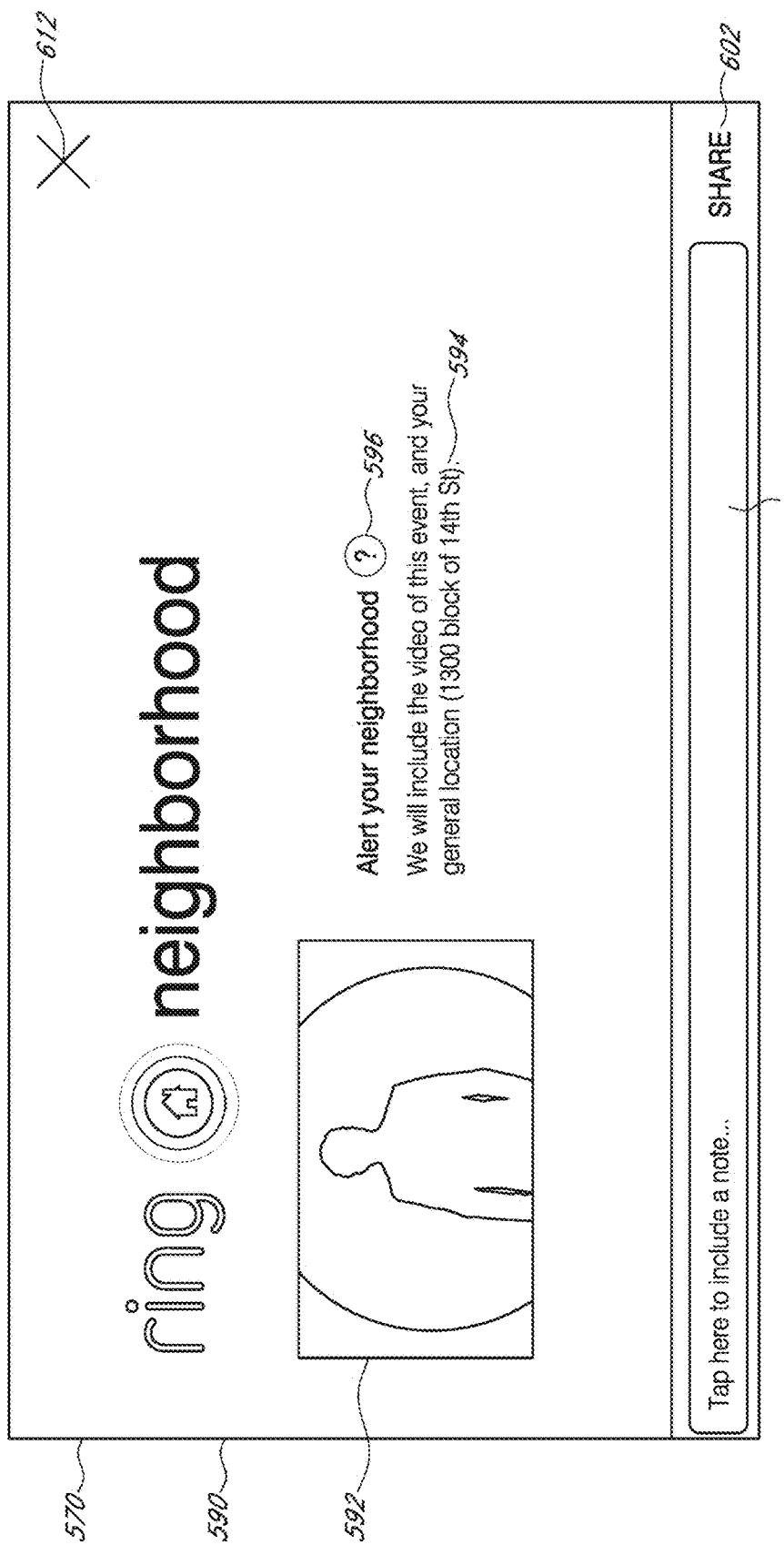

If the user selects the neighborhood share button 584 during the live call, then after the call is terminated, such as when the user selects the END button 574 on the live call screen 572 (FIG. 15), a share information screen 590 may be shown on the GUI 570, as shown in FIG. 17. In the illustrated embodiment, the share information screen 590 includes a still image 592 from the video that was recorded during the live call, and textual information 594. For example, the text 594 may include a phrase such as "Alert your neighborhood," which informs (or reminds) the user that he or she is about to share the recorded video footage with one or more other users. The text 594 may further include a notice that the video footage will be shared along with a general indication of where the video was recorded. For example, the location information may identify the street name and block number, such as "1300 block of 14th Street," and/or may identify the nearest intersection, such as "Near the intersection of 14th Street and Santa Monica Boulevard." An icon 596, such as a question mark, may also be displayed. If the user selects the question mark icon 596, further information about the share feature may be displayed, and/or a help menu may be displayed.

Figure 18:
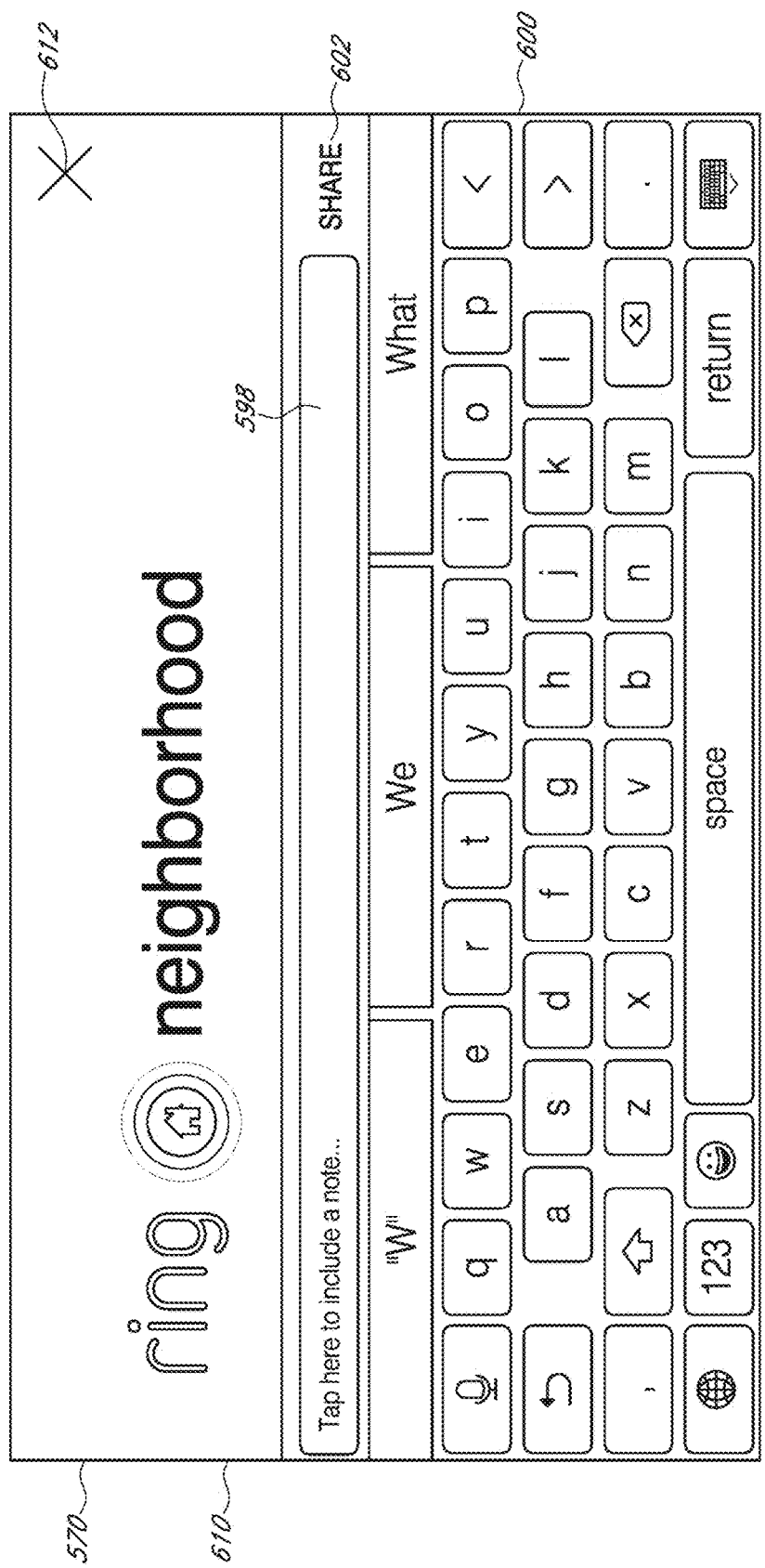

The share information screen 590 may further include a text entry box 598. If the user selects the text entry box 598, such as by tapping on it if the user's client device includes a touchscreen display, a keyboard 600 may appear on the display, as shown in FIG. 18. The user may then enter text to describe the content of the shared video. After entering text, the user may select a SHARE button 602, after which the share signal (FIG. 13) is sent to the network and the network identifies one or more other users who will be notified of the shared video and sends out notifications to the identified other users. The share signal may include, or be accompanied by, the text entered by the user in the text entry box 598 of the GUI 570 shown in FIG. 18. The user may also decline to enter any text in the text entry box 598, and may instead simply select the SHARE button 602 from the share information screen 590 of FIG. 17, after which the share signal (FIG. 13) is sent to the network and the network identifies one or more other users who will be notified of the shared video and sends out notifications to the identified other users.

Figure 19:
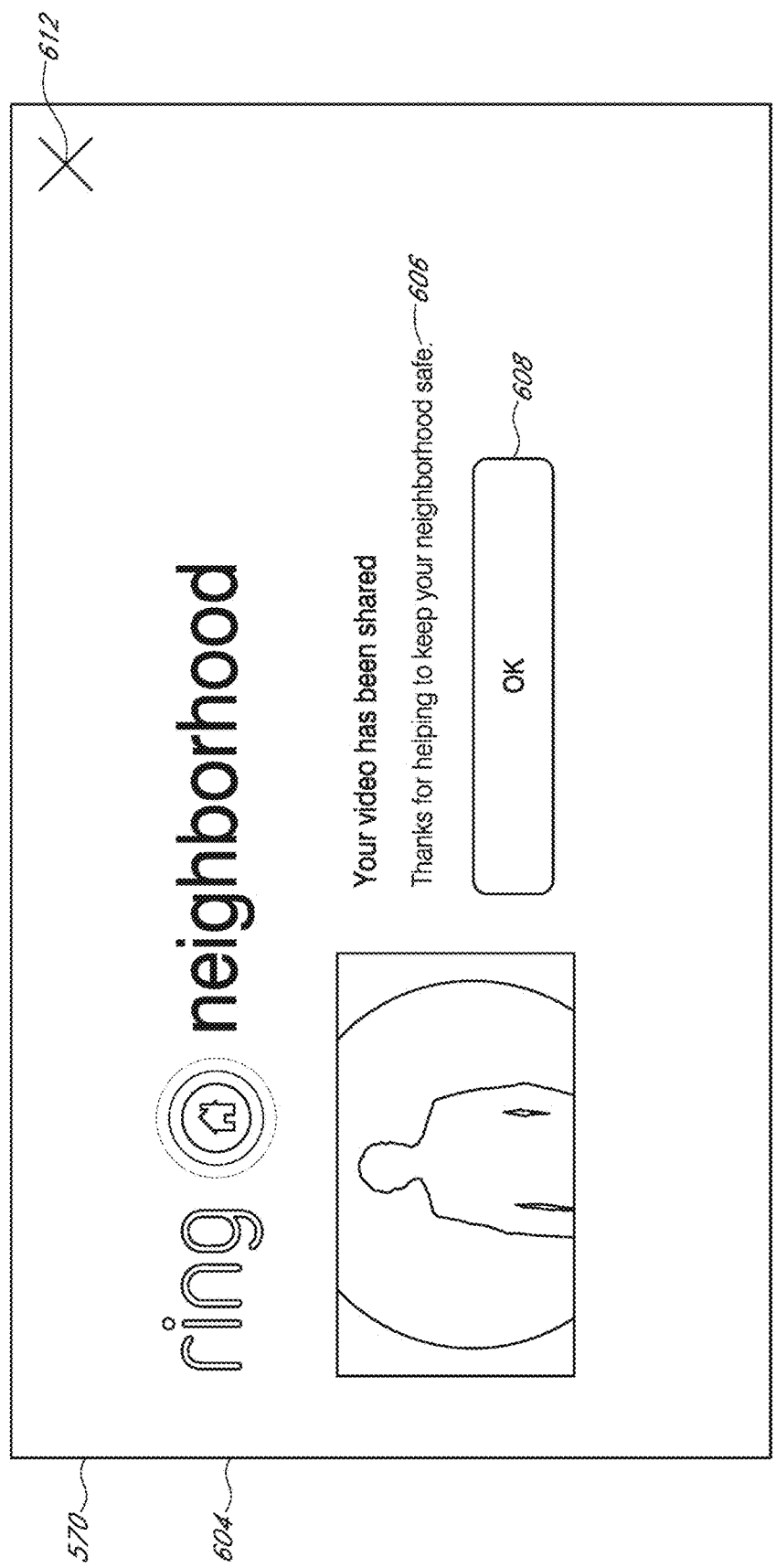

After the user selects the SHARE button 602, with or without entering text in the text entry box 598, a confirmation screen 604 may be displayed on the display of the user's client device, as shown in FIG. 19. The confirmation screen 604 may include text 606, such as a message confirming that the video has been shared ("Your video has been shared") and/or a thank you message ("Thanks for helping to keep your neighborhood safe."). The confirmation screen 604 may further include a button, such as an OK button 608, which, when selected, may return the user to another screen, such as a menu screen, of the application executing on the user's client device. With reference to FIGS. 17-19, the share information screen 590 (FIG. 17), the text entry screen 610 (FIG. 18), and/or the confirmation screen 604 (FIG. 19) may include a close button 612 (the "X" in the upper right-hand corner). If the user selects the close button 612, the share operation may be terminated without sharing the video footage from the live call. Further, if the user selects the close button 612, a popup window (not shown) may be shown on the display asking the user to confirm that the share operation is to be terminated.

In further reference to FIGS. 15-19, in some embodiments the share signal may be sent to the network, and the network may enable one or more of the identified recipient users to further comment about the shared video and/or the text regarding the shared video. In some embodiments, the further comments may be directed to the user that shared the video, or may be directed to all the users. For example, if a user shares a video depicting a person committing a crime, another user that receives the shared video may recognize the person depicted in the video (the perpetrator). The recipient user may then send identifying information about the perpetrator, which may be useful in apprehending the perpetrator. In some embodiments, the identifying information may be sent directly to the user that shared the information, or it may be posted to the network such that it is visible to all the recipients of the shared video. In another example, if a user shares a video depicting a person committing a crime, and knows (or recognizes) the perpetrator, then users that receive the shared video may request the identifying information about the person directly from the user that shared the video. In some embodiments, the user that shared the video may get a direct message such as (but not limited to) an email requesting the information. The user may then decide whether or not to provide the identifying information to the requesting user. A further example may include the network providing a comment section with the shared video so that the various users may provide comments regarding the shared video. An additional example may include allowing users to post comments and/or send messages regarding the shared video without revealing their personal identity and/or contact information, such as email addresses. In further embodiments, the share signal may include image data and/or audio data that is captured and transmitted to the network in real-time (or near real-time), which may make the share signal a live video feed. In such embodiments, a user may set his or her share features to automatically share particular events and/or types of events to the network. In some embodiments, various users may comment on the shared live video feed, as described above.

FIGS. 20-24 are screenshots of a graphical user interface (GUI) 620 illustrating aspects of another process for sharing video footage from an A/V recording and communication device according to an aspect of the present disclosure. The process of FIGS. 20-24 is described from the perspective of a user who views an earlier-recorded video on his or her client device. Thus, the GUI 620 illustrated in FIGS. 20-24 is configured to be displayed on a display of the user's client device, such as a smartphone. In this embodiment, the video displayed on the user's client device is not a live call, but rather is a recording of a visitor event that took place earlier in time. The recording may be, however, a recording of an earlier live call between the user and the visitor.

Figure 20:
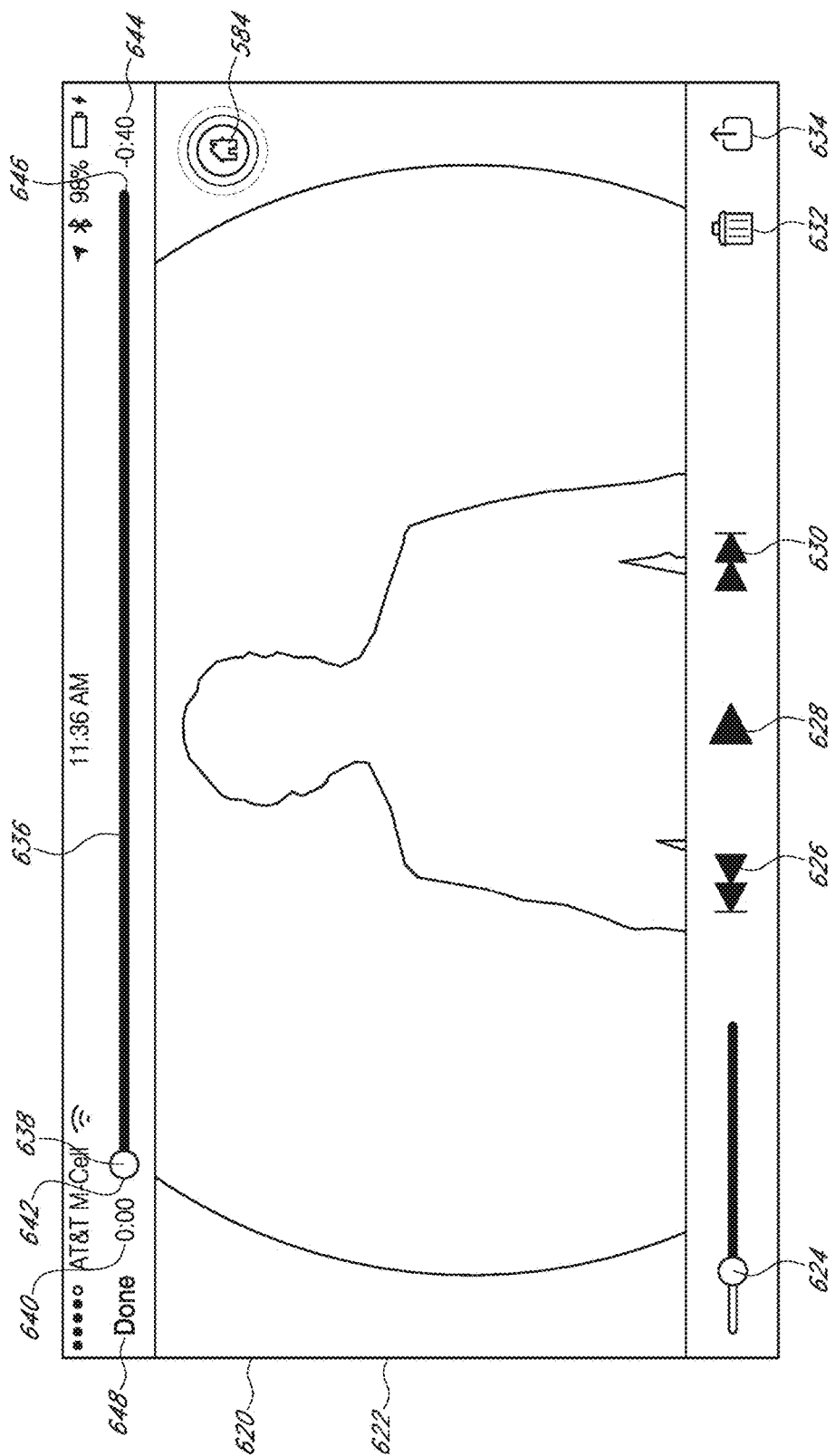
FIGS. 20-24 are screenshots of a graphical user interface (GUI) illustrating aspects of another process for sharing video footage from an A/V recording and communication device according to an aspect of the present disclosure.

With reference to FIG. 20, a video playback screen 622 is illustrated. When a user's A/V recording and communication device detects motion, or, in the case of a doorbell, when a visitor presses the front button on the doorbell, the user receives an alert on his or her client device along with streaming video footage recorded by the camera of the A/V recording and communication device. If the user ignores the alert, the motion event or button press event may nevertheless be recorded and stored at a remote network device. When the user later accesses the stored video footage, the video may be displayed on the video playback screen 622 on the user's client device, as shown in FIG. 20. Alternatively, if the user answers the alert and communicates with the visitor but does not share the video from within the live call (as described above with respect to FIGS. 15-19), the user may still view the recorded video footage by accessing it from a menu, as described below.

With further reference to FIG. 20, the video playback screen 622 may include one or more buttons or controls, such as a volume adjustment slider widget 624, a rewind button 626, a play button 628, a fast forward button 630, a delete button 632, and/or a share button 634. If the user selects the share button 634, a popup menu (not shown) may be shown on the display offering the user one or more options for sharing the video with his or her contacts and/or via social media. For example, the popup menu (or any other suitable type of interface) may include options for sharing the video via e-mail, via text message, and/or via social media, such as on NEXTDOOR®, FACEBOOK®, INSTAGRAM®, TWITTER®, etc. When the user selects one of the options, a new message (or post, etc.) may then be created including a link to the video to be shared. For example, if the user selects a social media network through which to share the video, the process may create a social media post with a link to the video to be shared. Posting the video to one or more social networks may enable the video to be seen by others, including others who live in the neighborhood where the video was recorded. Those persons may recognize a person in the video, and may be able to help identify that person. Further, the social network post may provide a warning to others who live in the neighborhood where the video was recorded, encouraging those people to be watchful for the person(s) in the video.

While the present embodiments are not limited to use with any particular social network, or type of social network, the present embodiments may nevertheless be well adapted for use with a neighborhood-oriented social network, such as NEXTDOOR®. Neighborhood-oriented social networks allow users to connect with people who live in their neighborhood, and/or in nearby neighborhoods, by limiting access to posts to the people in the same neighborhood as the poster, or those nearby. As described above, in some aspects the present embodiments enable a user to share a video to a social network. When the video is posted to a social networking service for neighborhoods, the video is more likely to be seen by people who live in the neighborhood where the video was recorded. The video is thus more likely to be relevant to the people in the neighborhood-oriented social network, because those people are more likely to have also seen the person(s) in the video. The neighborhood-oriented social network members may therefore be able to provide additional information about the person(s) in the video, such as confirming that they too have seen the person(s) in the neighborhood and/or helping to identify the person(s) in the video. If the person(s) in the video has committed criminal acts in the neighborhood, identifying the person(s) may help lead to their capture and conviction.

With further reference to FIG. 20, the video playback screen 622 may further include a progress bar 636 and a slider widget 638 that indicates what portion of the video is currently playing. For example, a timer 640 at a first end 642 of the progress bar 636 indicates how much of the video has elapsed, and a timer 644 at a second end 646 of the progress bar 636 indicates how much of the video is left to play. As the video plays, the progress slider widget 638 moves from the first end 642 to the second end 646 of the progress bar 636. If the user wants to jump to a particular portion of the video, he or she may move the slider widget 638 left or right by selecting it, sliding it along the progress bar 636, and releasing it. The video playback screen 622 may further include a Done button 648, which, when selected, closes the video and returns the user to a previous screen within the application executing on the user's client device.

Figure 21:
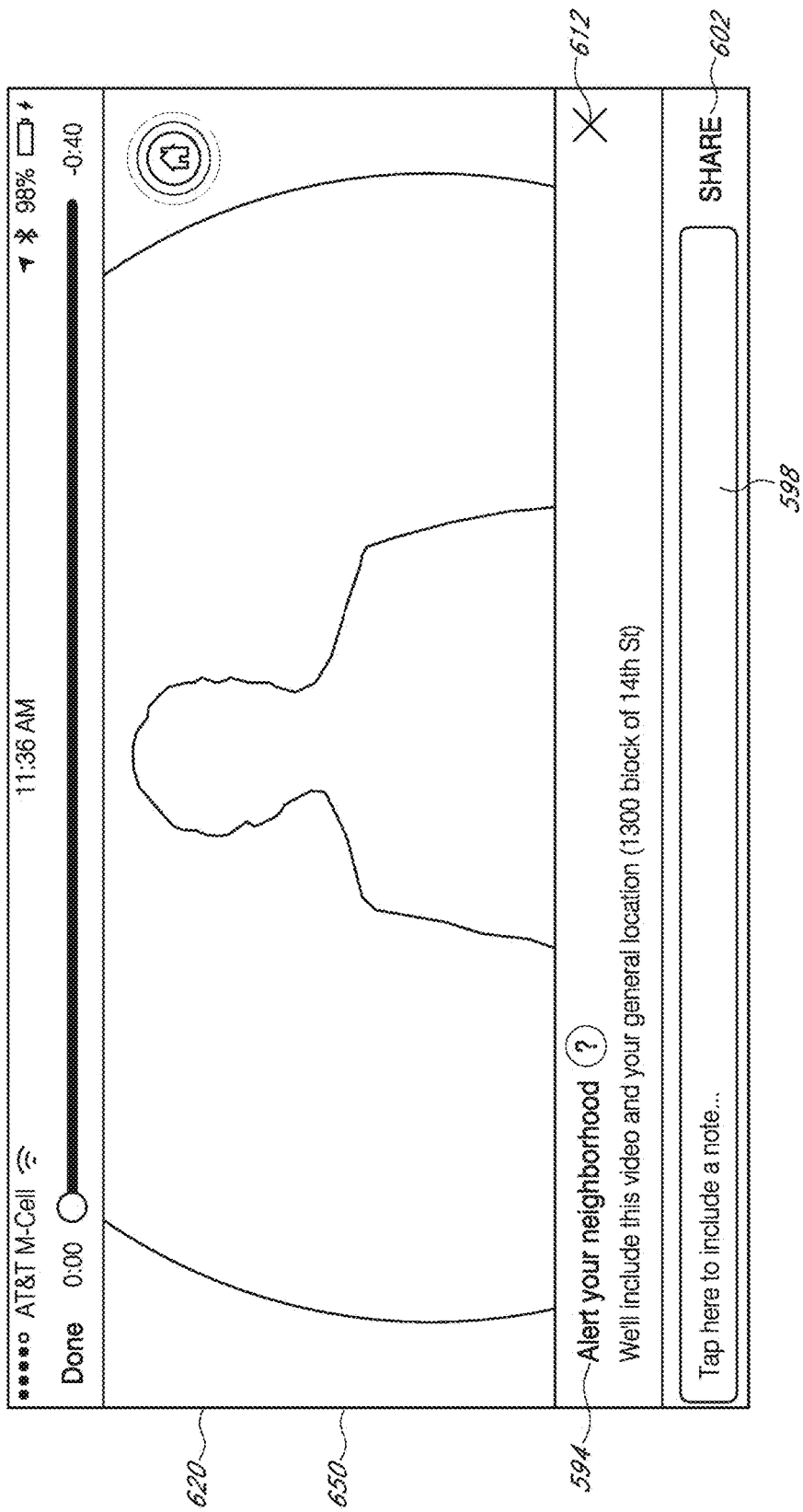

With further reference to FIG. 20, the video playback screen 622 may further include a neighborhood share button 584. If the user selects the neighborhood share button 584, the GUI 620 may display textual information 594, as shown in FIG. 21. For example, the text 594 may include a phrase such as "Alert your neighborhood," which informs (or reminds) the user that he or she is about to share the recorded video footage with one or more other users. The text 594 may further include a notice that the video footage will be shared along with a general indication of where the video was recorded. For example, the location information may identify the street name and block number, such as "1300 block of 14th Street," and/or may identify the nearest intersection, such as "Near the intersection of 14th Street and Santa Monica Boulevard." An icon 596, such as a question mark, may also be displayed. If the user selects the question mark icon 596, further information about the share feature may be displayed, and/or a help menu may be displayed.

Figure 22:
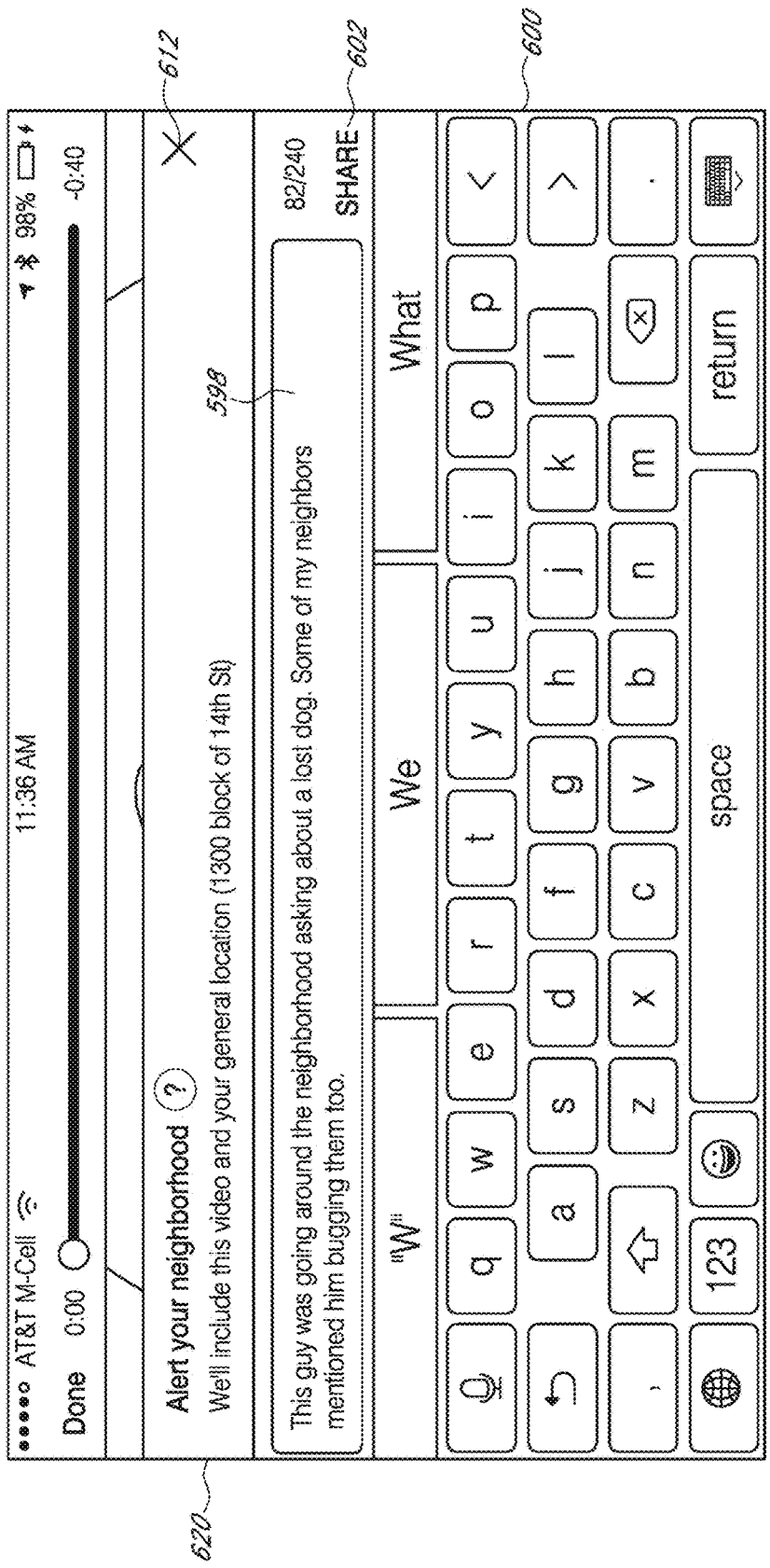
Figure 23:
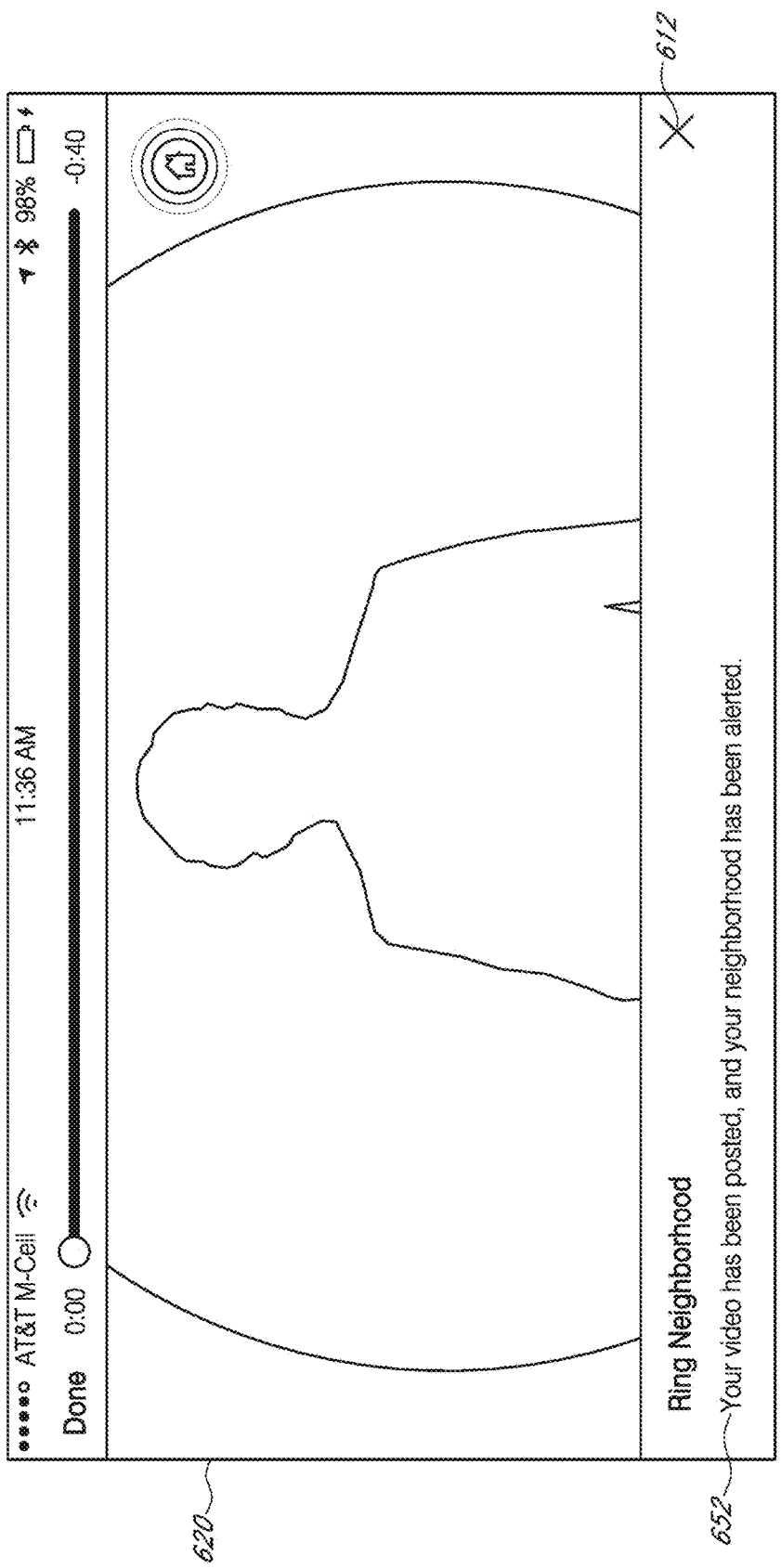

The GUI 620 of FIG. 21 may further include a text entry box 598. If the user selects the text entry box 598, such as by tapping on it if the user's client device includes a touchscreen display, a keyboard 600 may appear on the display, as shown in FIG. 22. The user may then enter text to describe the content of the shared video. After entering text, the user may select a SHARE button 602, after which the share signal (FIG. 13) is sent to the network and the network identifies one or more other users who will be notified of the shared video and sends out notifications to the identified other users. The share signal may include, or be accompanied by, the text entered by the user in the text entry box 598 of the GUI 620 shown in FIG. 22. The user may also decline to enter any text in the text entry box 598, and may instead simply select the SHARE button 602 from the share screen 650 of FIG. 21, after which the share signal (FIG. 13) is sent to the network and the network identifies one or more other users who will be notified of the shared video and sends out notifications to the identified other users.

Figure 24:
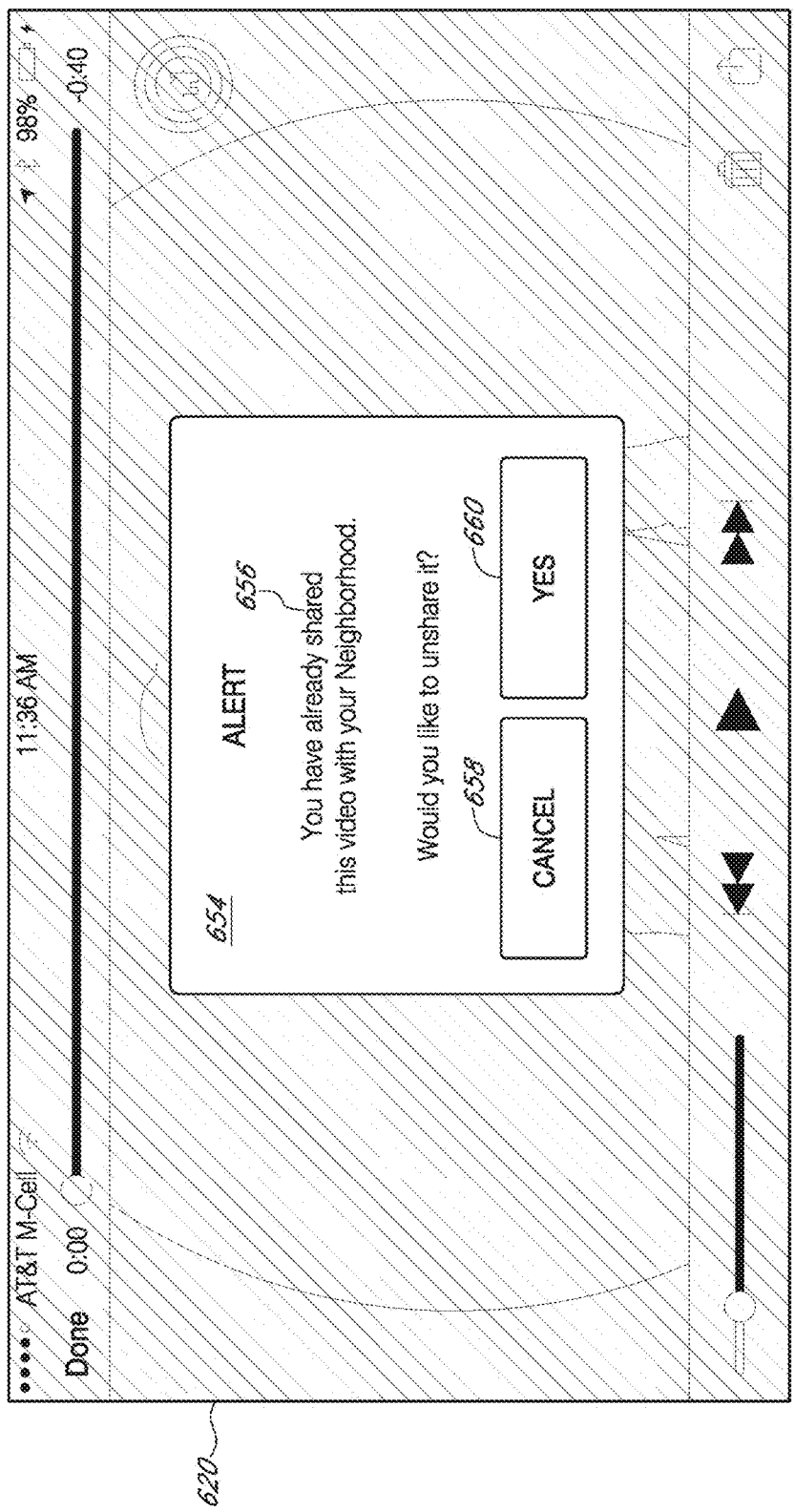
Figure 28:
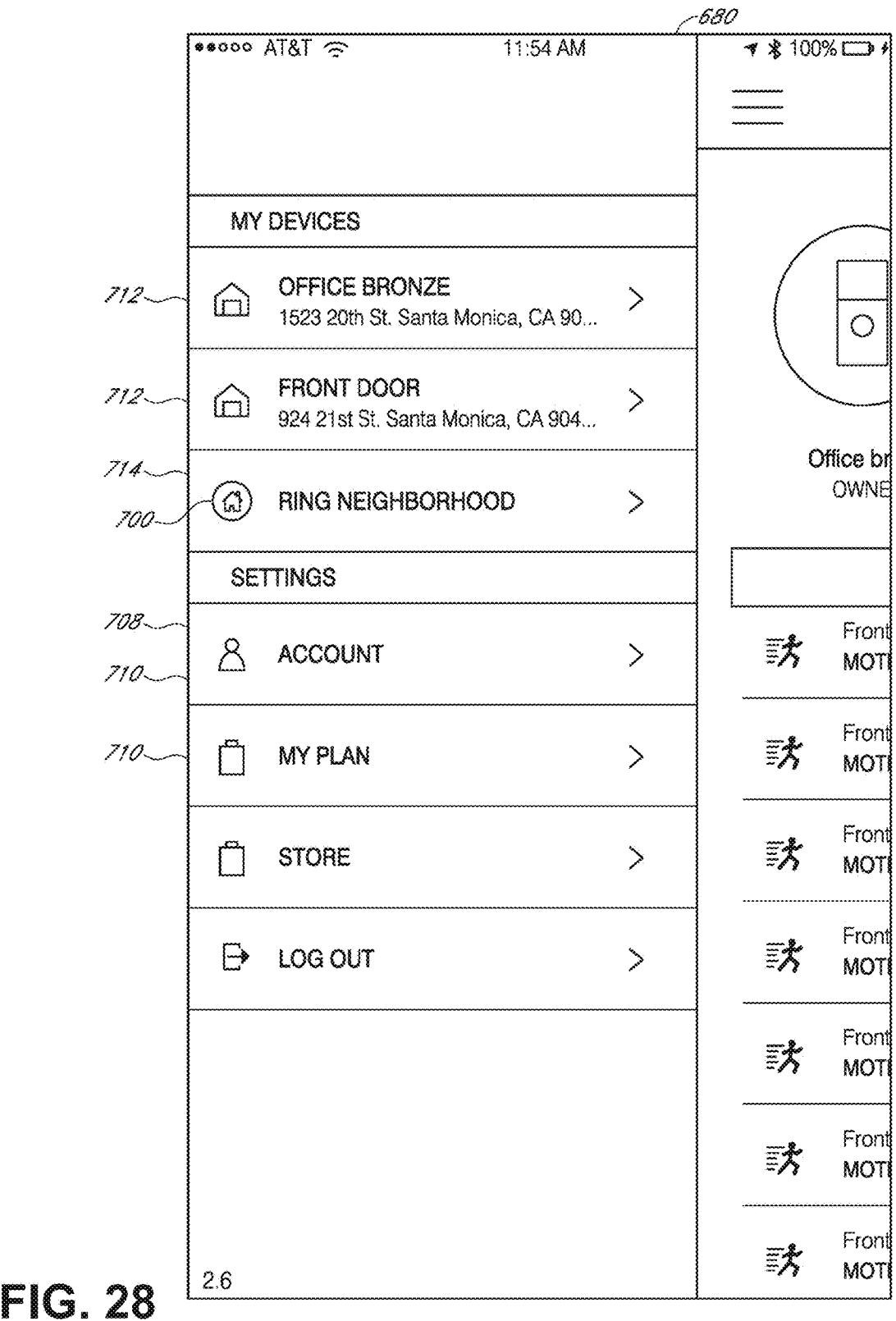

After the user selects the SHARE button 602, with or without entering text in the text entry box 598, a confirmation message 652 may be displayed on the GUI 620 of the user's client device, as shown in FIG. 28. The confirmation message 652 may include text, such as a message confirming that the video has been shared ("Your video has been posted and your neighborhood has been alerted."). With reference to FIG. 24, a popup message 654 may also be shown asking the user if he or she would like to "unshare" the video. The popup message 654 may include text 656 such as "You have already shared this video with your Neighborhood." and one or more buttons, such as a CANCEL button 658 and/or a YES (or OK) button 660. If the user selects the YES button 660, the shared video may be "unshared," whereas if the user selects the CANCEL button 658, the shared video will not be "unshared." With reference to FIGS. 21-23, the GUI 620 may include a close button 612 (the "X" in the upper right-hand corner). If the user selects the close button 612, the share operation may be terminated without sharing the video footage. Further, if the user selects the close button 612, a popup window (not shown) may be shown on the display asking the user to confirm that the share operation is to be terminated.

In some embodiments, video footage recorded by a user's A/V recording and communication device may not be stored at a remote network device on a long-term basis. In such embodiments, the user may still share video footage from his or her A/V recording and communication device with other users, but only from a live call, such as according to the process described above with reference to FIGS. 15-19 (and not from a video playback process, such as that described above with reference to FIGS. 20-24). To enable this aspect, all video recorded by the user's A/V recording and communication device may be temporarily stored at a remote network device so that it is available for sharing if the user shares the video footage from the live call. For example, the video may be temporarily stored at a remote network device as long as the live call is in progress, but if the live call terminates without the user selecting the neighborhood share button 584 (FIG. 15), the video that was temporarily stored at the remote network device may then be deleted.

In further reference to FIGS. 20-24, and as described above with respect to FIGS. 15-19, in some embodiments, the share signal may be sent to the network, and the network may enable one or more of the identified recipient users to further comment about the shared video and/or the text regarding the shared video. In some embodiments, the further comments may be directed to the user that shared the video, or may be directed to all the users. For example, if a user shares a video depicting a person committing a crime, another user that receives the shared video may recognize the person depicted in the video (the perpetrator). The recipient user may then send identifying information about the person, which may be useful in apprehending the perpetrator. In some embodiments, the identifying information may be sent directly to the user that shared the information, or it may be posted to the network such that it is visible to all the recipients of the shared video. In another example, if a user shares a video depicting a person committing a crime, and knows (or recognizes) the perpetrator, then users that receive the shared video may request the identifying information about the person directly from the user that shared the video. In some embodiments, the user that shared the video may get a direct message such as (but not limited to) an email requesting the information. The user may then decide whether or not to provide the identifying information to the requesting user. A further example may include the network providing a comment section with the shared video so that the various users may provide comments regarding the shared video. An additional example may include allowing users to post comments and/or send messages regarding the shared video without revealing their personal identity and/or contact information, such as email addresses. In further embodiments, the share signal may include image data and/or audio data that is captured and transmitted to the network in real-time (or near real-time) which may make the share signal a live video feed. In such embodiments, a user may set his or her share features to automatically share particular events and/or types of events to the network. In some embodiments, various users may comment on the shared live video feed, as described above.

Figure 25:
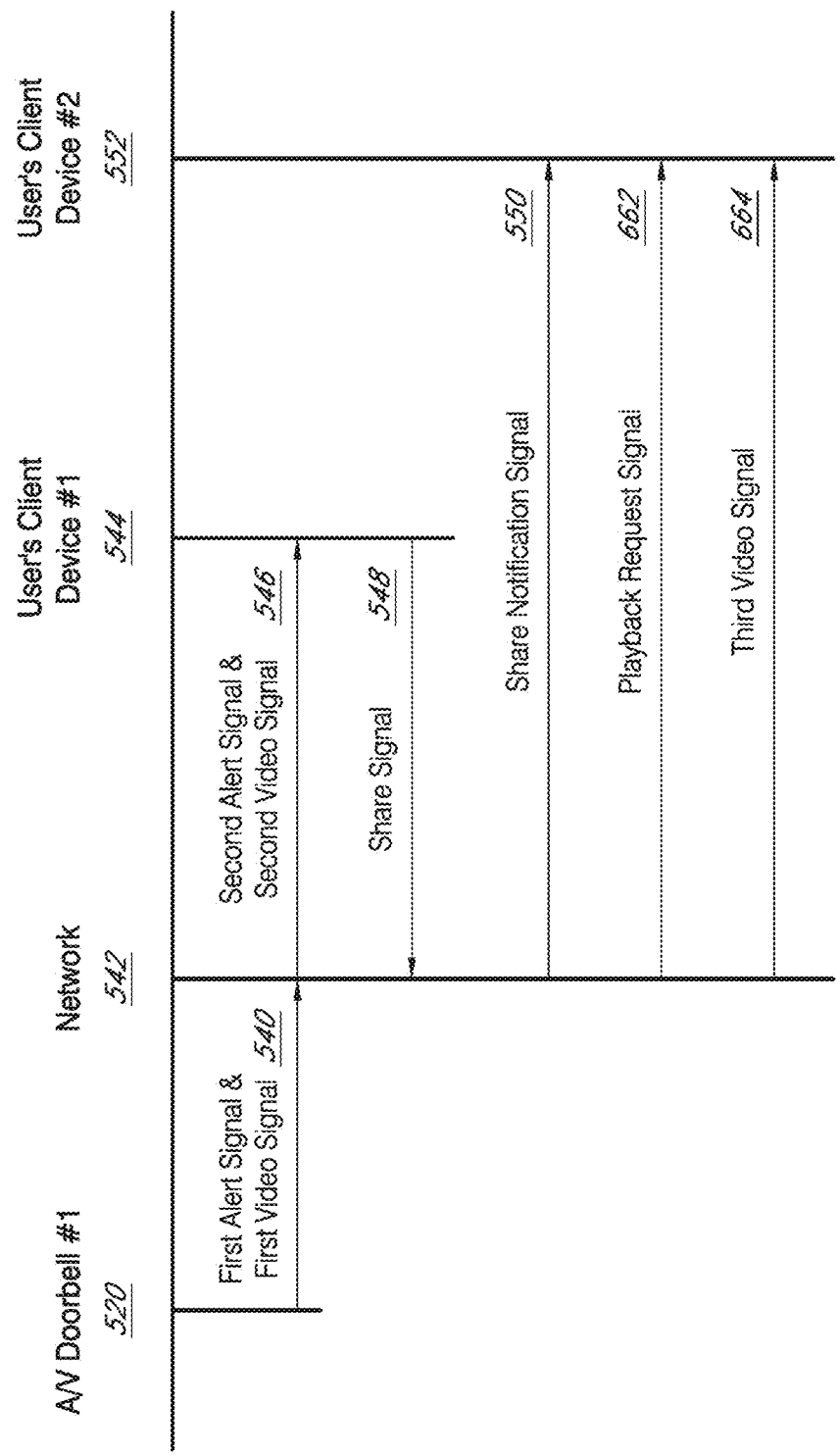
FIG. 25 is a sequence diagram illustrating another process for sharing video footage from an A/V recording and communication doorbell according to an aspect of the present disclosure.

FIG. 25 is a sequence diagram illustrating another process for sharing video footage from an A/V recording and communication doorbell according to an aspect of the present disclosure. The process of FIG. 25 includes aspects of the process of FIG. 13, including the doorbell 520 sending a first alert signal and a first video signal 540 to the network (and the network receives the first alert signal and the first video signal 540), the network 542 transmitting to a first client device (User's Client Device #1), in response to receiving the first alert signal and the first video signal, a second alert signal and a second video signal 546, the first client device 544 sending a share signal 548 to the network (and the network receiving the share signal 548 from the first client device), and the network device(s) 542 transmitting a share notification signal 550 to each client device associated with the other doorbell(s) identified (including at least User's Client Device #3 552).

The process of FIG. 25 further comprises the third client device 552 sending a playback request signal 662 to the network 542 (and the network 542 receiving the playback request signal 662 from the third client device 552), and the network device(s) 542, in response to receiving the playback request signal 662 from the third client device 552, transmitting a third video signal 664 to the third client device 552, the third video signal 664 including the shared video footage recorded by A/V Doorbell #1 520. For example, User's Client Device #3 552 may receive the share notification signal 550, which may be, for example, a push notification. The user associated with User's Client Device #3 552 may then choose to view the shared video footage, such as by selecting a "VIEW NOW" button (or an "OK" button, etc.) in the push notification. Alternatively, the user may ignore the share notification signal 550, but may subsequently request to view the shared video footage through one or more screens/menus within an application executing on User's Client Device #3 552, as described below. The playback request signal 662 is then sent to the network 542, and the shared video footage is sent to User's Client Device #3 552 in the third video signal 664.

Figure 26:
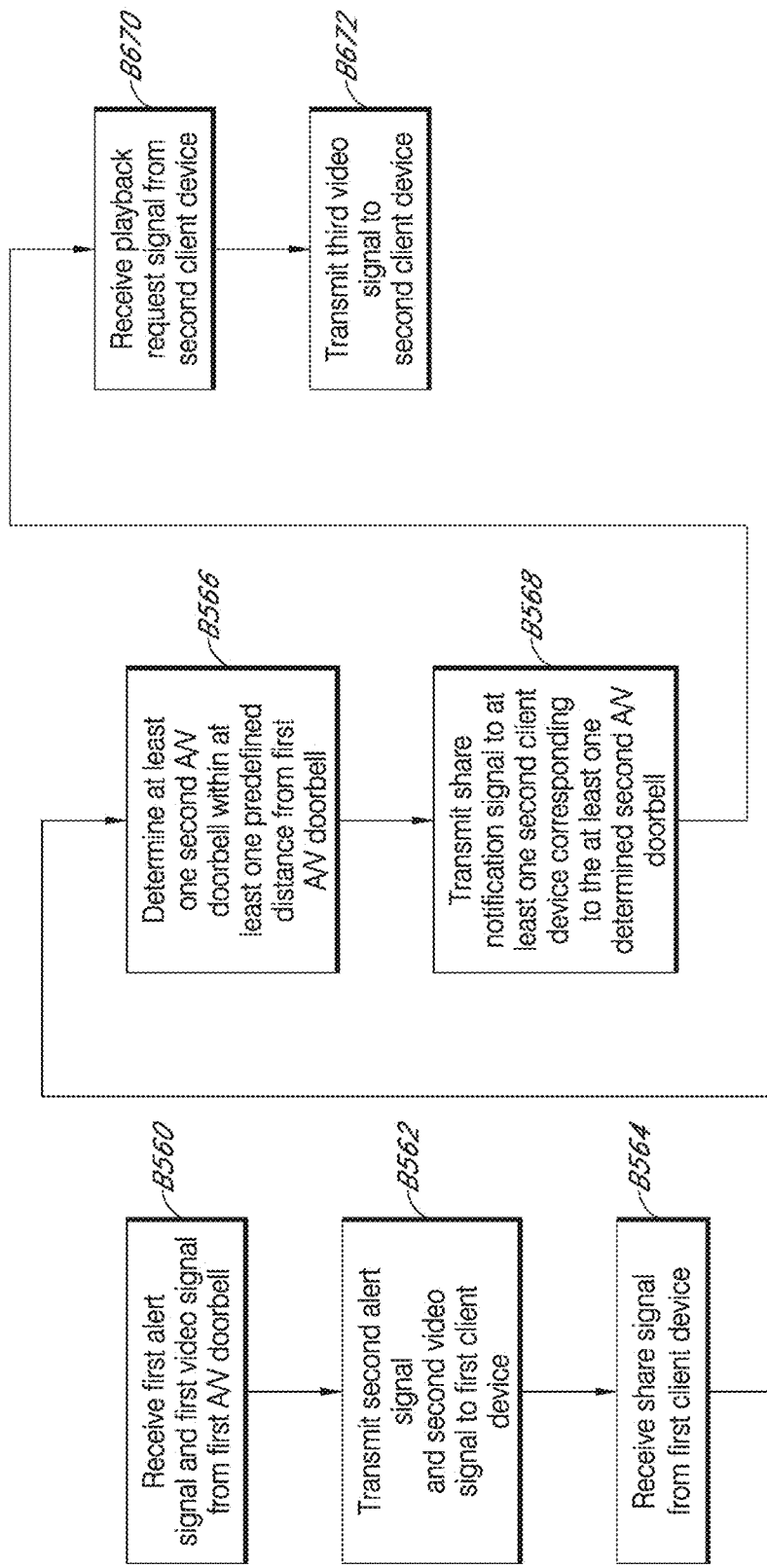
FIG. 26 is a flowchart illustrating another process for sharing video footage from an A/V recording and communication doorbell according to an aspect of the present disclosure.

FIG. 26 is a flowchart illustrating another process for sharing video footage from an A/V recording and communication doorbell according to an aspect of the present disclosure. The process of FIG. 26 is described from the perspective of the network device(s). Thus, at block B560 the network device(s) receive a first alert signal and a first video signal from a first A/V doorbell. At block B562, the network device(s) transmit a second alert signal and a second video signal to the first client device. At block B564, the network device(s) receive a share signal from the first client device. At block B566, the network device(s) determine at least one second A/V doorbell within at least one predefined distance from the first A/V doorbell. At block B568, the network device(s) transmit a share notification signal to the at least one second client device corresponding to the at least one determined second A/V doorbell. At block B670, the network device(s) receive a playback request signal from the second client device. At block B672, the network device(s) transmits a third video signal to the second client device.

FIGS. 27-30 are screenshots of graphical user interfaces (GUIs) illustrating aspects of another process for sharing video footage from an A/V recording and communication device according to an aspect of the present disclosure. FIGS. 27-30 are described below from the perspective of a user operating his or her client device. Thus, the GUIs illustrated in FIGS. 27-30 are configured to be displayed on a display of the user's client device, such as a smartphone.

Figure 27:
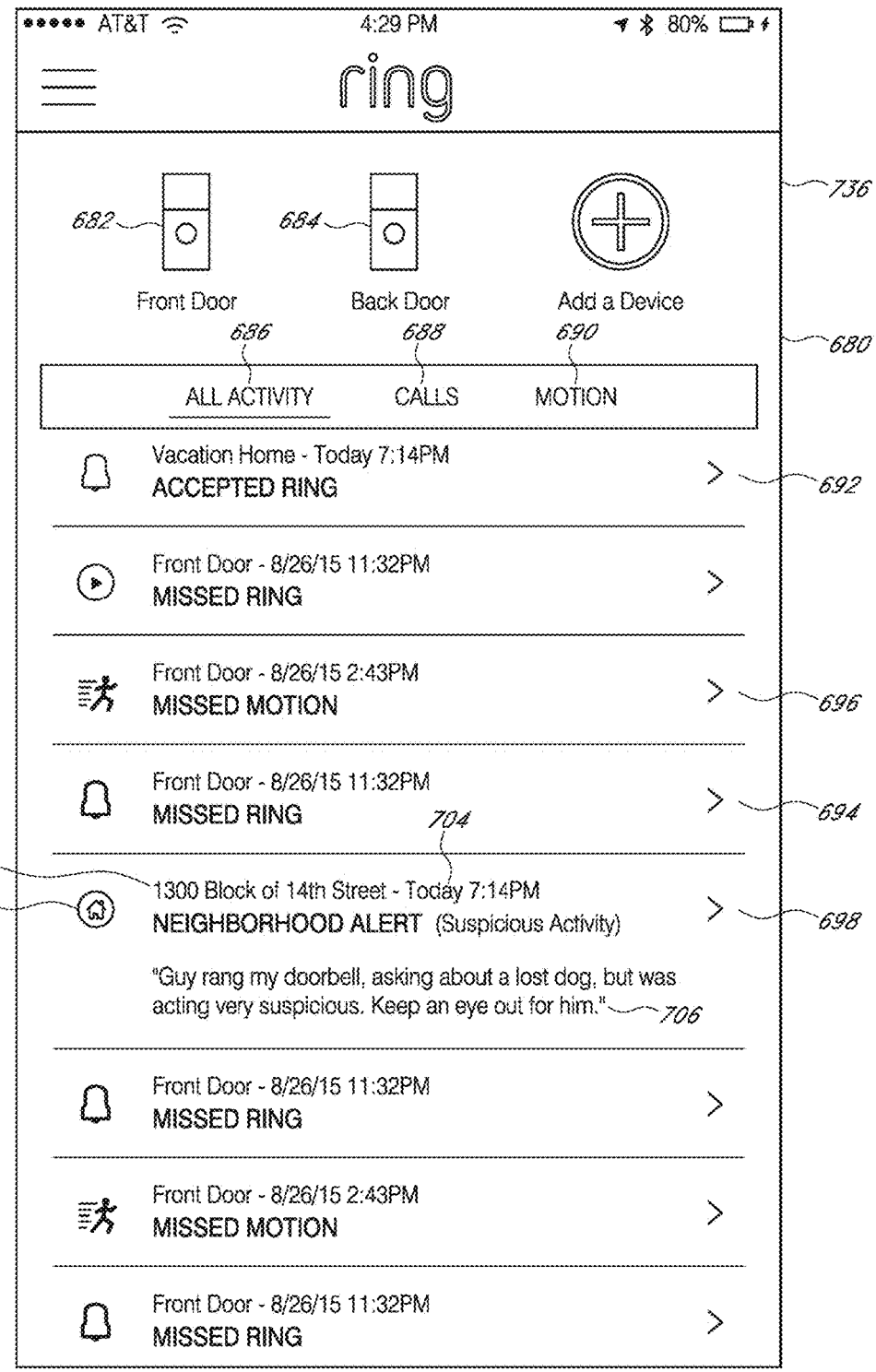
FIGS. 27-32 are screenshots of a graphical user interface (GUI) illustrating aspects of another process for sharing video footage from an A/V recording and communication device according to an aspect of the present disclosure.

With reference to FIG. 27, the GUI 680 includes buttons for each of the user's A/V recording and communication devices. For example, the GUI 680 of FIG. 27 includes a first button 682 for the doorbell located adjacent the user's front door and a second button 684 for the doorbell located adjacent the user's back door. The user may view video footage recorded by his or her devices by selecting from among the buttons 682, 684 corresponding to each device. The user may further view video footage organized by type by selecting from among a plurality of filter buttons 686, 688, 690. For example, the GUI 680 of FIG. 27 includes a first filter button 686 for ALL ACTIVITY, a second filter button 688 for CALLS (video recorded when the front button on the user's doorbell is pressed), and a third filter button 690 for MOTION (video recorded when the user's doorbell detects motion). When the user selects the ALL ACTIVITY filter button 686, a list 691 may be displayed on the GUI 680 that includes entries for all videos recorded by the user's device(s), as well as entries for all shared videos recorded by other users' devices in the user's "neighborhood," e.g. those devices determined according to the process described above with reference to FIGS. 13 and 14. For example, the list 691 of FIG. 27 includes entries labeled "ACCEPTED RING" 692 and "MISSED RING" 694, which correspond to videos recorded by the user's doorbell(s) in response to the button on the doorbell(s) being pressed. The list 691 further includes entries labeled "MISSED MOTION" 696, which correspond to videos recorded by the user's device(s) in response to motion being detected.

The list 691 of FIG. 27 further includes an entry labeled "NEIGHBORHOOD ALERT [Suspicious Activity]" 698. The neighborhood alert entry 698 may further include a neighborhood event icon 700, which identifies the entry 698 as corresponding to a shared video from another user's device in the user's "neighborhood." The neighborhood alert entry 698 may further include information about the shared video, including the approximate location 702 where it was recorded, the day and time 704 when it was recorded, and a textual description 706 of the video as provided by the user whose device recorded the video. If the user selects the neighborhood alert entry 698, a playback request signal 662 is sent from the user's client device to the network (FIG. 20), and a video signal 664 including the requested video is sent from the network to the user's client device. A GUI similar to that shown in FIG. 15 (but without the neighborhood share button) may then be shown on the display of the user's client device and the user may view the shared video.

With reference to FIG. 28, the GUI 680 may further include a side menu 708. The side menu 708 may be accessed, for example, by touching the display of the user's client device and swiping to the right (if the display of the user's client device is a touchscreen). The side menu 708 may include buttons 710 for various settings, buttons 712 for each of the user's A/V recording and communication devices, as well as a NEIGHBORHOOD button 714. The NEIGHBORHOOD button 714 may further include the neighborhood event icon 700, which is described in the foregoing paragraph. When the user selects the NEIGHBORHOOD button 714, the NEIGHBORHOOD ACTIVITY screen 716 illustrated in FIG. 34 may be displayed on the display of the user's client device.

Figure 29:
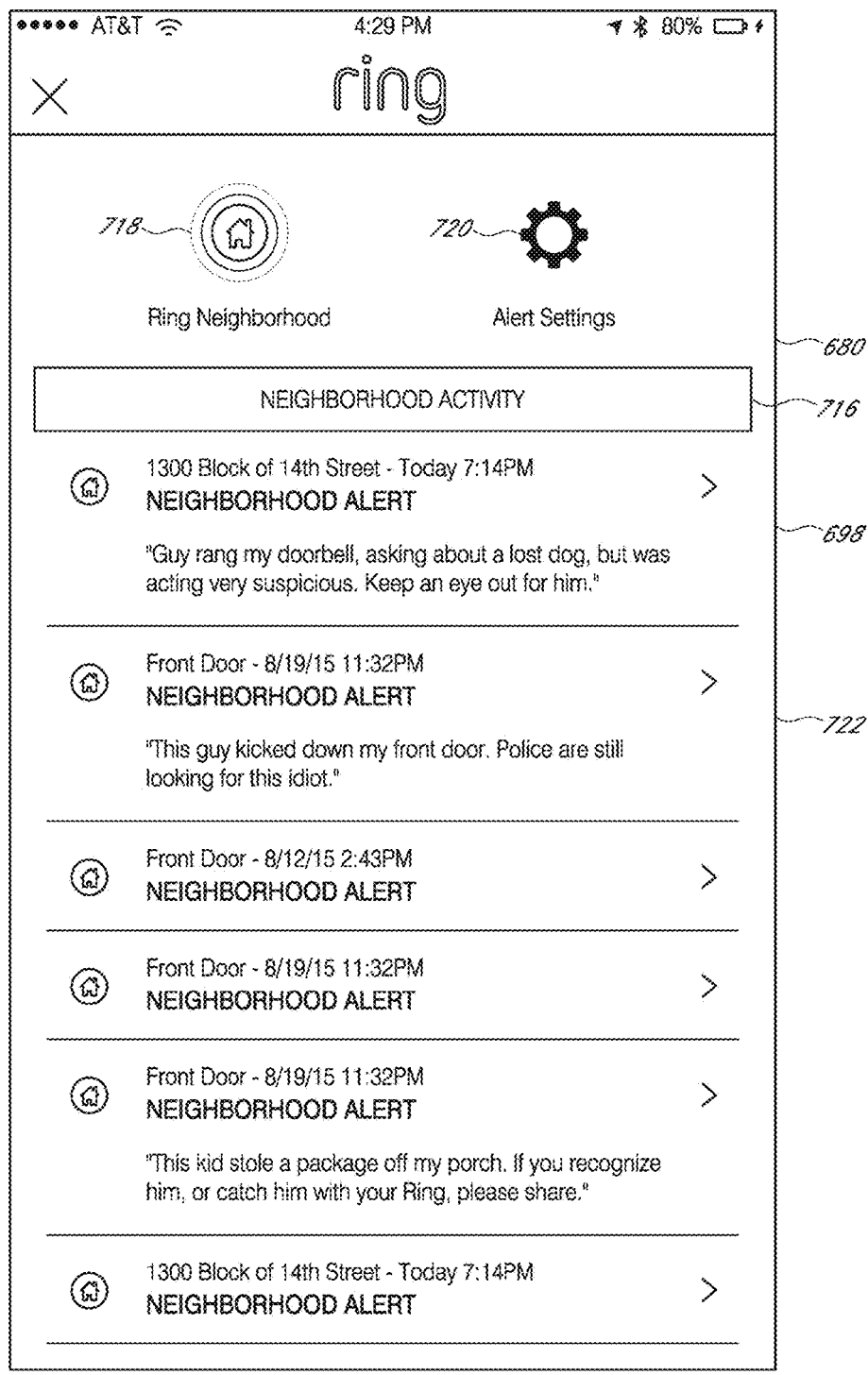
Figure 30:

With reference to FIG. 29 the NEIGHBORHOOD ACTIVITY screen 716 may include a Neighborhood button 718 and an Alert Settings button 720. When the user selects the Neighborhood button 718, a NEIGHBORHOOD ACTIVITY list 722 may be displayed on the GUI 680 that includes neighborhood alert entries 698 (the content and functionality of which is described above with respect to FIG. 27). With further reference to FIG. 29, when the user selects the Alert Settings button 720, if the user has A/V recording and communication devices at more than one location, then a Select a Neighborhood screen 724 may be displayed on the display of the user's client device, as shown in FIG. 30. The Select a Neighborhood screen 724 may include a list 726 having entries corresponding to each location (e.g. each "neighborhood") where the user has at least one A/V recording and communication device. For example, the list 726 of FIG. 30 includes a first entry 728 for the user's home "neighborhood" and a second entry 730 for the user's office "neighborhood." In certain embodiments, if the user has more than one A/V recording and communication device at a given location, only one entry may be displayed per location. For example, if the user has two doorbells and one security camera at a given address, only one entry appears in the list 726 for that location, and the entry covers all three devices at that location. If the user has one or more A/V recording and communication devices at another location, another entry appears in the list 726 for that other location. Also in certain embodiments, the entries in the list 726 may comprise addresses rather than, or in addition to, names. For example, rather than the first entry 728 being labeled "Home" and the second entry 730 being labeled "Office," the first entry 728 may be labeled "123 Main Street" and the second entry 730 may be labeled "456 First Street."

Figure 31:
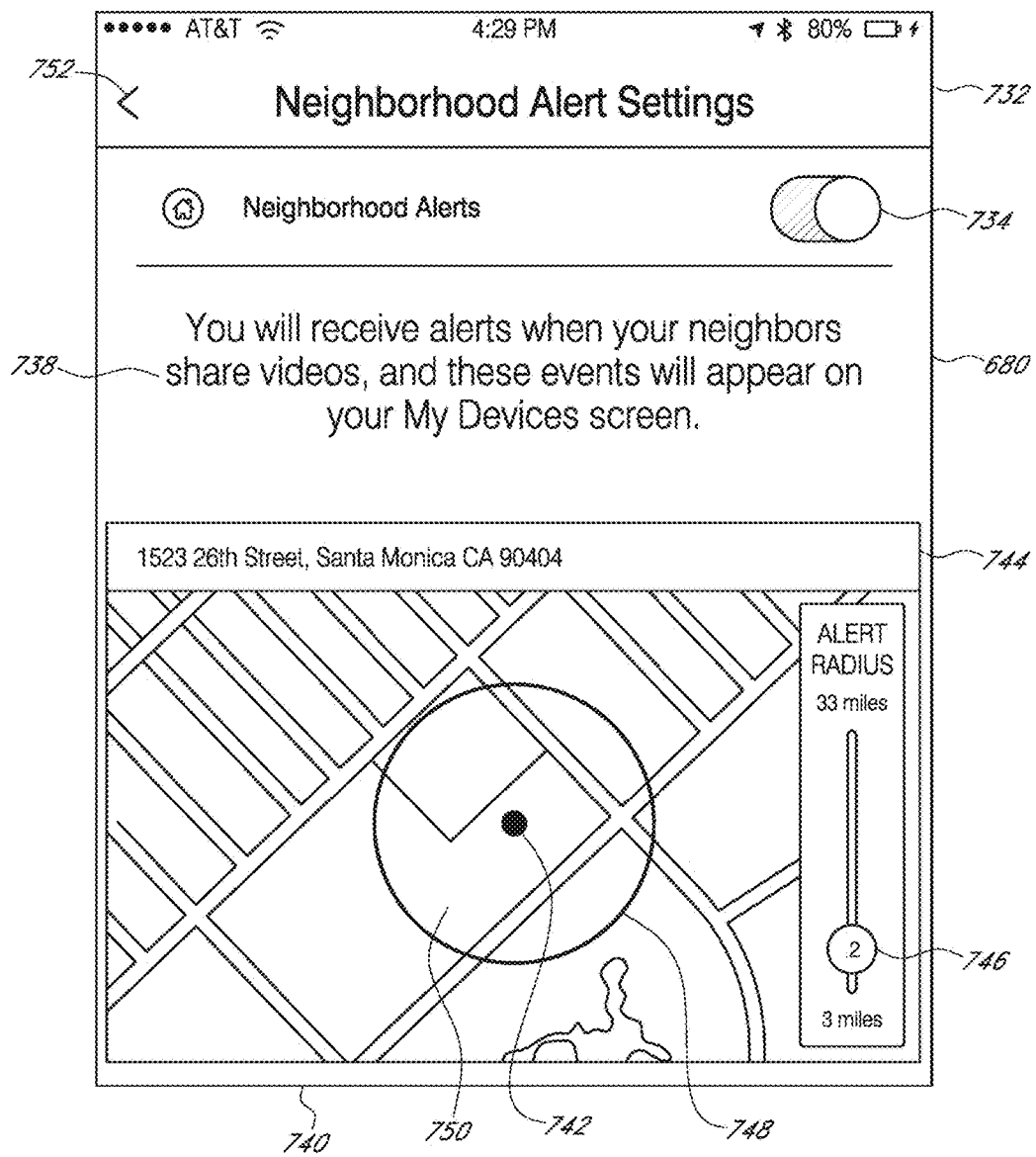
Figure 36:
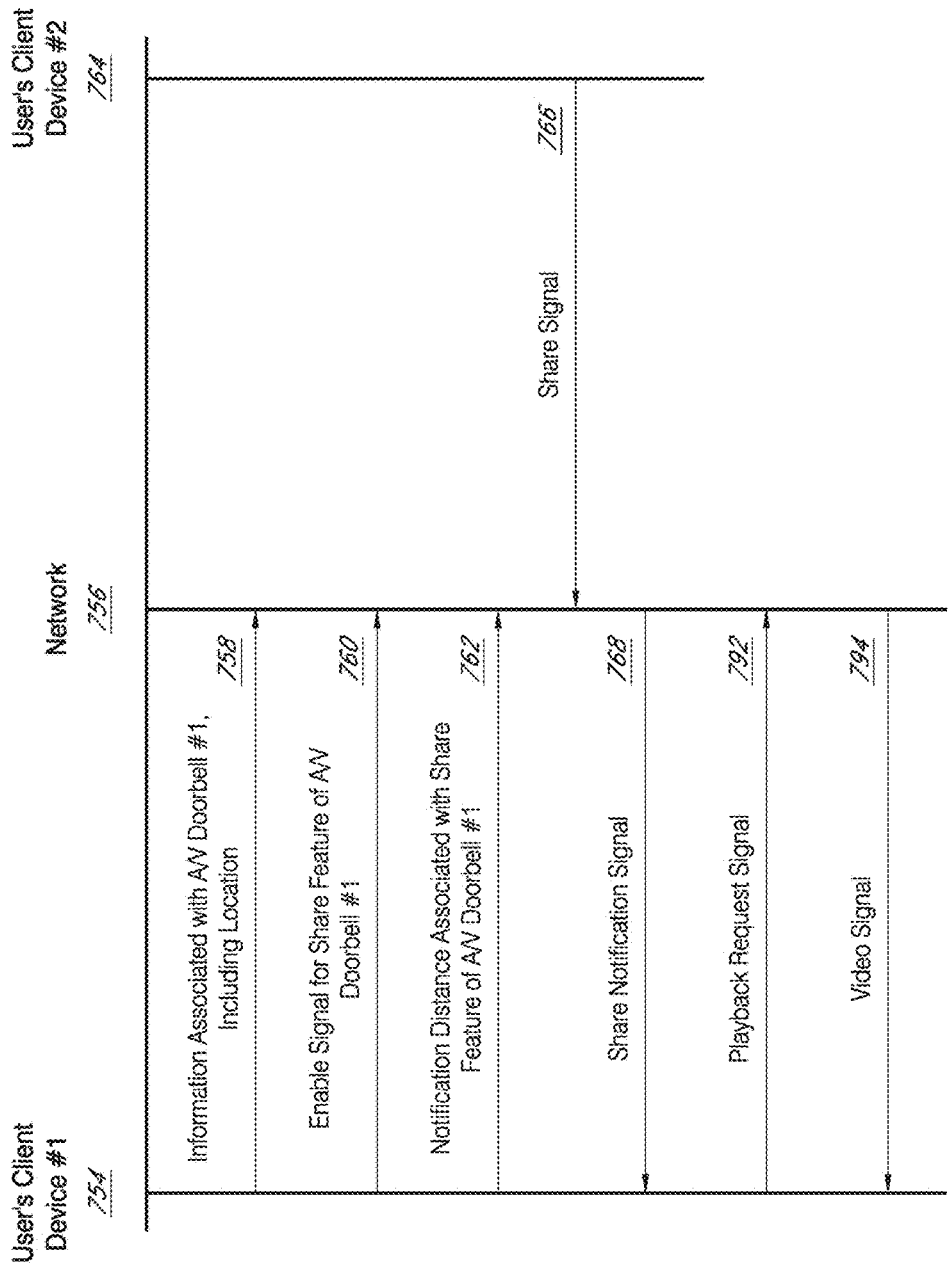
FIG. 36 is a sequence diagram illustrating another process for sharing video footage from an A/V recording and communication doorbell according to an aspect of the present disclosure.

If, however, the user does not have A/V recording and communication devices at more than one location, then when the user selects the Alert Settings button 720 (FIG. 29) a Neighborhood Alert Settings screen 732 may be displayed on the display of the user's client device, as shown in FIGS. 31 and 36. Further, if the user has A/V recording and communication devices at more than one location, then when the user selects one of the locations from the list 726 on the NEIGHBORHOOD ACTIVITY screen 716 of FIG. 31, then the Neighborhood Alert Settings screen 732 of FIGS. 31 and 32 may also be displayed on the display of the user's client device.

Figure 32:
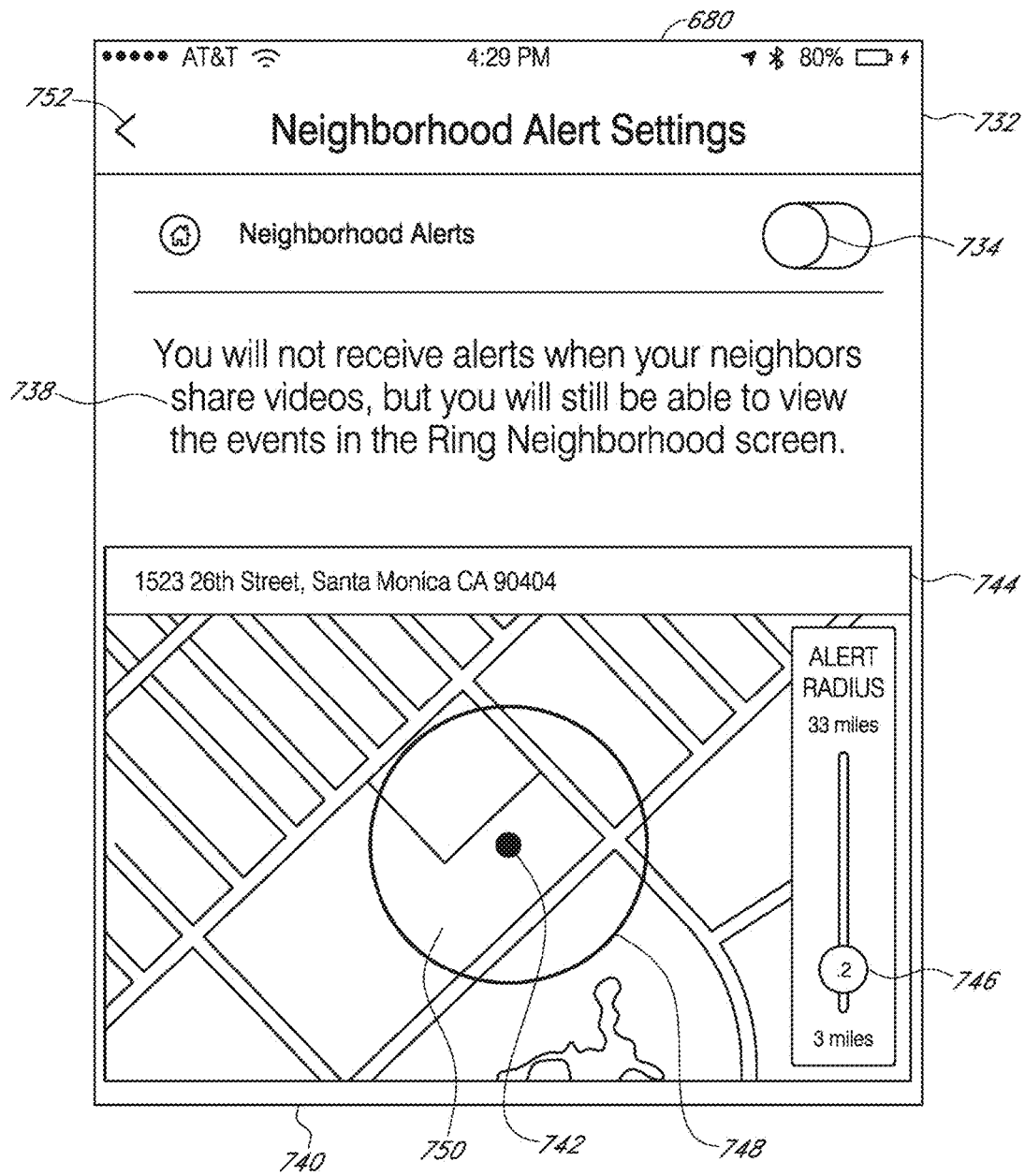

With reference to FIG. 31, the Neighborhood Alert Settings screen 732 includes an ON/OFF slider widget 734 that enables the user to toggle the video sharing feature on and off. When the ON/OFF slider widget 734 is in the ON position, as shown in FIG. 31, the user may receive sharing notifications (alerts) when other users in the user's "neighborhood" share videos, and shared videos may appear in the list 691 of events on the user's ALL ACTIVITY screen 736 (FIG. 27), as well as in the list 722 of events on the user's NEIGHBORHOOD ACTIVITY screen 716 (FIG. 29). In certain embodiments, the ON/OFF slider widget 734 may be in the ON position by default. When the ON/OFF slider widget 734 is in the OFF position, as shown in FIG. 32, the user may not receive sharing notifications (alerts) when other users in the user's "neighborhood" share videos, and shared videos may not appear in the list 691 of events on the user's ALL ACTIVITY screen 736 (FIG. 27), but shared videos may appear in the list 722 of events on the user's NEIGHBORHOOD ACTIVITY screen 716 (FIG. 29). The Neighborhood Alert Settings screen 732 further includes a text banner 738 that explains how the video sharing feature functions when the ON/OFF slider widget 734 is in the ON position (FIG. 31) and when the ON/OFF slider widget 734 is in the OFF position (FIG. 32).

With reference to FIG. 31, the Neighborhood Alert Settings screen 732 further includes a map 740. An indicator 742 on the map 740 indicates the location of the user's A/V recording and communication device(s) corresponding to the location selected from the list 724 of FIG. 30 (or corresponding to the single location at which the user has at least one A/V recording and communication device, if the user does not have A/V recording and communication devices at more than one location). In the illustrated embodiment, the indicator 742 comprises a dot, but in other embodiments the indicator 742 may comprise any other type of indicator, such as a pin, for example. The Neighborhood Alert Settings screen 732 further includes a text banner 744 that provides the street address of the location corresponding to the indicator 742 on the map 740.

With further reference to FIG. 31, the Neighborhood Alert Settings screen 732 further includes a slider widget 746 for adjusting the alert radius around the user's A/V recording and communication device(s) at the location indicated on the map 740. A circle 748 around the indicator 742 on the map 740 identifies the outer boundary of the area 750 from which the user will receive share notifications from other users. An area 750 within the circle 748 may be shaded, as indicated in FIG. 31. To adjust the size of the area 750, the user adjusts the length of the alert radius by moving the slider widget 746 up or down. In the illustrated embodiment, moving the slider widget 746 up increases the size of the area 750 (and the alert radius), while moving the slider widget 746 down decreases the size of the area 750 (and the alert radius). As the slider widget 746 is moved up and down, the size of the circle 748 around the indicator 742 may increase and decrease to provide the user with a visual representation of the area 750 covered as the length of the alert radius increases and decreases. In some embodiments, the map 740 may have a default scale. As the user moves the slider widget 746 up to increase the size of the alert radius, if the circle 748 reaches the edges of the map 740, then the map 740 may begin to scale down so that the entire alert area 750 is always visible on the map 740.

When the user adjusts the size of the alert radius, the user's client device may send an alert radius adjustment signal to the network and the network may update a data structure with the changed size of the user's alert radius. For example, with further reference to FIG. 31, the user may adjust the size of the alert radius by moving the slider widget 746 up or down. To confirm the change, the user may select a back arrow 752 on the GUI 680 to return to the previous screen within the application executing on the user's client device. When the user selects the back arrow 752, the alert radius adjustment signal is sent to the network and the network updates the data structure with the changed size of the user's alert radius. In some embodiments, if the user exits the application without selecting the back arrow 752, then the adjustment of the alert radius may be discarded (the size of the alert radius may remain unchanged).

With further reference to FIG. 31, the magnitude of the alert radius may be indicated by a number on the slider widget 746. For example, in FIG. 31 the alert radius is set at 0.2 miles, as indicated by the number 0.2 on the slider widget 746. Maximum and/or minimum magnitudes of the alert radius may be indicated by numbers at opposite ends of the slider widget 746. For example, in FIG. 31 the maximum alert radius is indicated as 10 miles at the upper end of the slider widget 746, while the minimum alert radius is indicated as 0.1 miles at the lower end of the slider widget 746. It should be appreciated that the maximum and minimum magnitudes shown in FIGS. 31 and 32 are just examples and are not limiting.

In certain embodiments, the magnitude of the alert radius may be dynamically set based on the number of other A/V recording and communication devices around the location indicated on the map 740. For example, the alert radius may be set such that the resulting defined area 750 around the user's A/V recording and communication device encompasses at least a minimum threshold number of other A/V recording and communication devices. Alternatively, the alert radius may be set such that the resulting defined area 750 around the user's A/V recording and communication device encompasses no more than a maximum threshold number of other A/V recording and communication devices. Still further, the alert radius may be set such that the resulting defined area 750 around the user's A/V recording and communication device encompasses a number of other A/V recording and communication devices that falls within a defined range. In certain embodiments, the magnitude of the alert radius may be dynamically adjusted as the number of other A/V recording and communication devices around the user's device changes. Thus, as more A/V recording and communication devices are added around the user's device, the size of the alert radius may be decreased so that the number of other A/V recording and communication devices in the defined area 750 remains about the same. Conversely, as A/V recording and communication devices are removed (or deactivated) from the area 750 around the user's device, the size of the alert radius may be increased so that the number of other A/V recording and communication devices in the defined area 750 remains about the same. In certain embodiments, the user may override the dynamic setting and/or adjustment of the magnitude of the alert radius by manually selecting the magnitude of the alert radius by moving the slider widget 746 as described above with reference to FIG. 31.

In some embodiments, the defined alert area about a user's A/V recording and communication device may not have a circular outer boundary. For example, a user may define an alert area about his or her A/V recording and communication device that has a non-circular shape, such as square, rectangular, or any other shape, including irregular polygons. The shape of the alert area may also extend a greater distance from A/V recording and communication device in one direction than in another direction. For example, if an A/V recording and communication device is located in a coastal area, or on a lakefront, or on an edge of an uninhabited area (such as a desert), or on an edge of a restricted area (such as a military base), then the user may not want the alert area to extend over the water, or desert, or military base, etc., but the user may want the alert area to extend a substantial distance in directions away from the water, or desert, or military base, etc. In such embodiments, the A/V recording and communication device would not be located at the center of the defined alert area.

Figure 33:
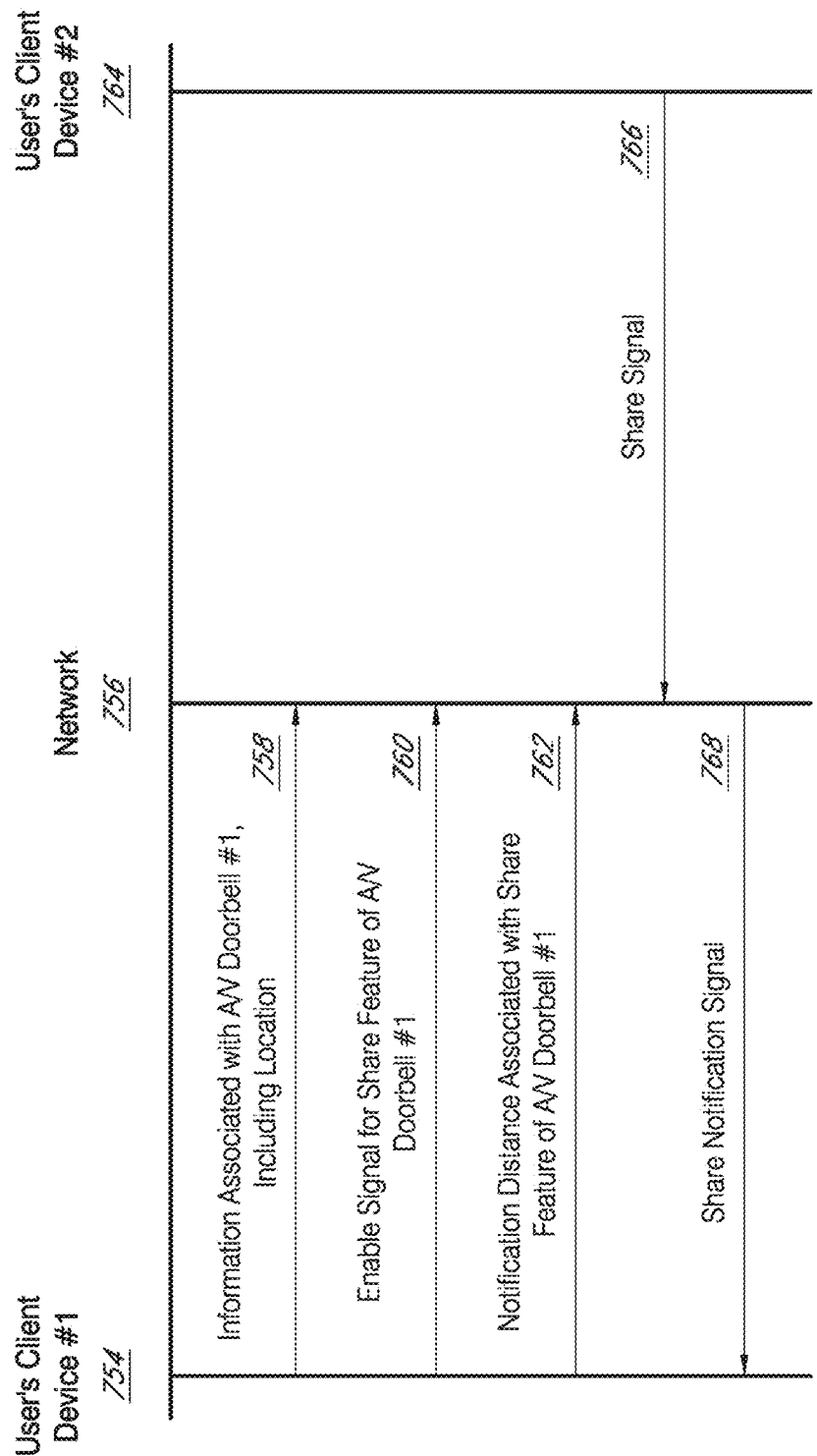
FIG. 33 is a sequence diagram illustrating another process for sharing video footage from an A/V recording and communication doorbell according to an aspect of the present disclosure.

FIG. 33 is a sequence diagram illustrating another process for sharing video footage from an A/V recording and communication doorbell according to an aspect of the present disclosure. In the process of FIG. 33, a new A/V recording and communication device is activated and connected to the network. In certain embodiments, some aspects of the activation/setup/connection process may be carried out using an application executing on the user's client device. Thus, with reference to FIG. 33, the user's client device 754 (User's Client Device #1) may send to the network 756, and the network 756 may receive from the user's client device 754, information 758 associated with the user's A/V recording and communication device (A/V Doorbell #1). The information 758 may include, for example, the location of the user's A/V recording and communication device. The location may comprise the street address of a building with which the user's A/V recording and communication device is associated, such as being secured thereto, for example. The user's client device 754 may further send to the network 756, and the network 756 may further receive from the user's client device 754, an enable signal 760 for the video sharing feature of the user's A/V recording and communication device. For example, during the setup process the user may enable (turn on) the video sharing feature using a GUI such as that illustrated in FIG. 31. In some embodiments, the video sharing feature may be enabled by default, such that the user does not have to take any affirmative steps to enable the video sharing feature.

With further reference to FIG. 33, the user's client device 754 may further send to the network 756, and the network 756 may further receive from the user's client device 754, a notification distance (alert radius) 762 associated with the video sharing feature of the user's A/V recording and communication device. For example, during the setup process the user may select an alert radius 762 using a GUI such as that illustrated in FIG. 31. In some embodiments, the alert radius 762 may be set automatically to a default value, or may be set automatically according to the criteria described above, such that the user does not have to take any affirmative steps to set the alert radius 762. The alert radius 762 defines an area around the user's A/V recording and communication device that encompasses at least one other A/V recording and communication device, which in this example will be referred to as A/V Doorbell #2. A/V Doorbell #2 may record video footage, and the user associated with A/V Doorbell #2 may share the recorded video footage according to a process described herein. Thus, with further reference to FIG. 33, the client device associated with A/V Doorbell #2 (User's Client Device #2 764) may send to the network 756, and the network 756 may receive from User's Client Device #2 764, a share signal 766. The network 756, after determining that A/V Doorbell #2 764 is within the alert area defined around A/V Doorbell #1, may then send a share notification signal 768 to the client device associated with A/V Doorbell #1 (User's Client Device #1 754).

Figure 34:
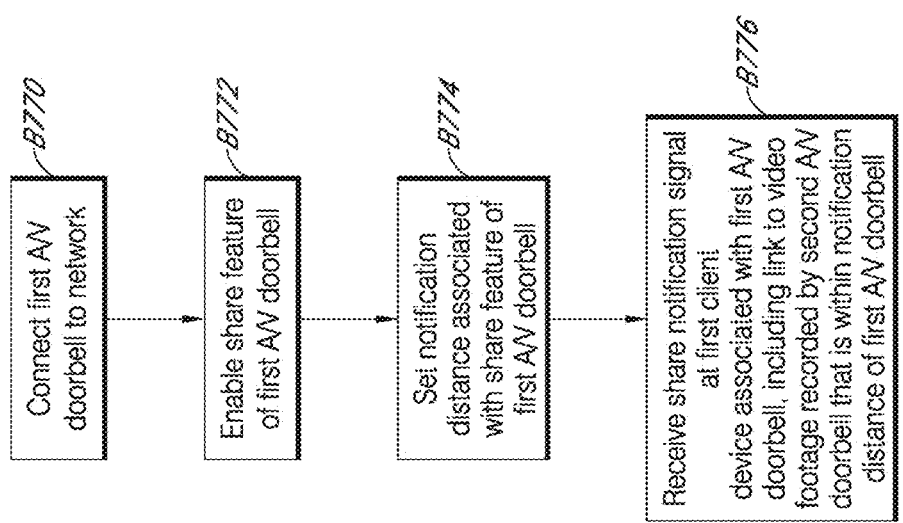
FIG. 34 is a flowchart illustrating another process for sharing video footage from an A/V recording and communication doorbell according to an aspect of the present disclosure.
Figure 35:
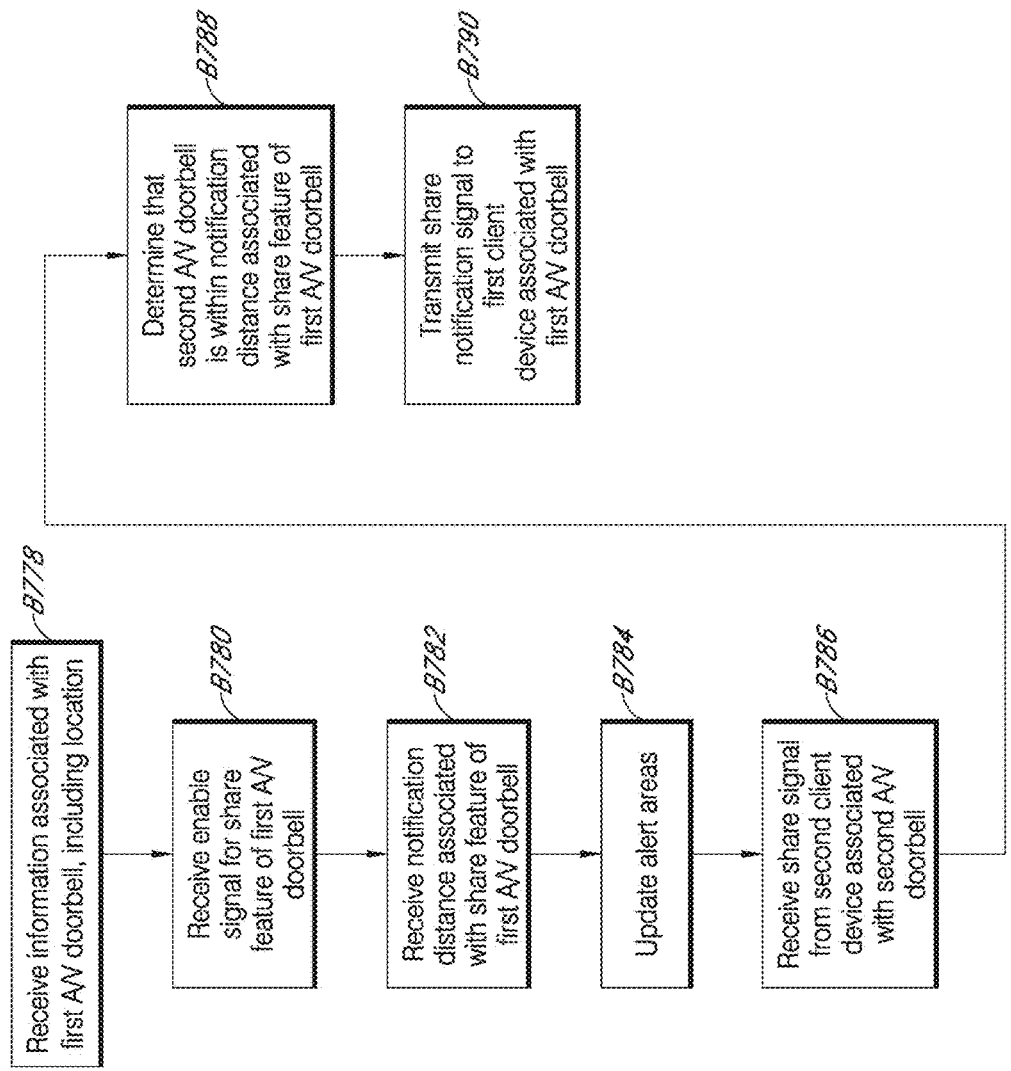
FIG. 35 is a flowchart illustrating another process for sharing video footage from an A/V recording and communication doorbell according to an aspect of the present disclosure.

FIGS. 34 and 35 are flowcharts illustrating other processes for sharing video footage from an A/V recording and communication doorbell according to an aspect of the present disclosure. FIG. 34 is described from the perspective of the user, while FIG. 35 is described from the perspective of the network device(s). Thus, with reference to FIG. 34, at block B770 the user may activate a new A/V recording and communication device and connect it to the network. As described above, some aspects of the activation/setup/connection process may be carried out using an application executing on the user's client device. At block B772, the user may enable the video sharing feature of the user's A/V recording and communication device, and at block B774 the user may set a notification distance (alert radius) associated with the video sharing feature of the user's A/V recording and communication device. As described above, these aspects of the activation/setup/connection process may be automated, such that the user does not have to take any affirmative steps. The alert radius defines an area around the user's A/V recording and communication device that encompasses at least one other A/V recording and communication device, which in this example will be referred to as a second A/V doorbell. The second A/V doorbell may record video footage, and the user associated with the second A/V doorbell may share the recorded video footage according to a process described herein. The client device associated with the second A/V doorbell may send to the network, and the network may receive from the second A/V doorbell, a share signal. The network, after determining that the second A/V doorbell is within the alert area defined around A/V Doorbell #1, may then send a share notification signal to the client device associated with A/V Doorbell #1 (first client device). Thus, at block B776 the first client device may receive the share notification signal, including a link to the video footage recorded by the second A/V doorbell that is within the notification distance (alert radius) of the first A/V doorbell.

With reference to FIG. 35, at block B778 the network may receive from the user's client device information associated with the user's A/V recording and communication device (first A/V doorbell). The information may include, for example, the location of the first A/V doorbell. The location may comprise the street address of a building with which the first A/V doorbell is associated, such as being secured thereto, for example. At block B780, the network may further receive from the user's client device, an enable signal for the video sharing feature of the first A/V doorbell. For example, during the setup process the user may enable (turn on) the video sharing feature using a GUI such as that illustrated in FIG. 31. In some embodiments, the video sharing feature may be enabled by default, such that the user does not have to take any affirmative steps to enable the video sharing feature.

With further reference to FIG. 35, at block B782 the network may further receive from the user's client device a notification distance (alert radius) associated with the video sharing feature of the first A/V doorbell. For example, during the setup process the user may select an alert radius using a GUI such as that illustrated in FIG. 31. In some embodiments, the alert radius may be set automatically to a default value, or may be set automatically according to the criteria described above, such that the user does not have to take any affirmative steps to set the alert radius. At block B784, the network may update one or more data structures (alert areas) with the information received about the first A/V doorbell, including its location and/or its alert radius.

The alert radius defines an area around the first A/V doorbell that encompasses at least one other A/V recording and communication device, which in this example will be referred to as second A/V doorbell. The second A/V doorbell may record video footage, and the user associated with the second A/V doorbell may share the recorded video footage according to a process described herein. Thus, with further reference to FIG. 35, at block B786 the network may receive from the second client device a share signal. The network, after determining, at block B788, that the second A/V doorbell is within the alert area defined around the first A/V doorbell, may then send a share notification signal to the client device associated with the first A/V doorbell at block B790.

FIG. 36 is a sequence diagram illustrating another process for sharing video footage from an A/V recording and communication doorbell according to an aspect of the present disclosure. The process of FIG. 36 includes aspects of the process of FIG. 33, including the user's client device 754 (User's Client Device #1) sending to the network 756 (and the network 756 receiving from the user's client device 754, information 758 associated with the user's A/V recording and communication device (A/V Doorbell #1), the user's client device 754 further sending to the network 756 (and the network 756 further receiving from the user's client device 754) an enable signal 760 for the video sharing feature of the user's A/V recording and communication device, the user's client device 754 further sending to the network 756 (and the network 756 further receiving from the user's client device 754) a notification distance (alert radius) 762 associated with the video sharing feature of the user's A/V recording and communication device, the second client device 764 (User's Client Device #2) sending a share signal 766 to the network 756 (and the network 756 receiving the share signal 766 from the second client device 764), and the network device(s) 756 transmitting a share notification signal 768 to the user's client device 754.

The process of FIG. 36 further comprises the user's client device 754 sending a playback request signal 792 to the network 756 (and the network 756 receiving the playback request signal from the user's client device 754), and the network device(s) 756, in response to receiving the playback request signal 792 from the user's client device 754, transmitting a video signal 794 to the user's client device 754, the video signal 794 including the shared video footage recorded by A/V Doorbell #2. For example, User's Client Device #1 754 may receive the share notification signal 768, which may be, for example, a push notification. The user associated with User's Client Device #1 754 may then choose to view the shared video footage, such as by selecting a "VIEW NOW" button (or an "OK" button, etc.) in the push notification. Alternatively, the user may ignore the share notification signal 768, but may subsequently request to view the shared video footage through one or more screens/menus within an application executing on User's Client Device #1 754, as described above. The playback request signal 768 is then sent to the network 756, and the shared video footage is sent to User's Client Device #1 754 in the video signal 794.

Figure 37:
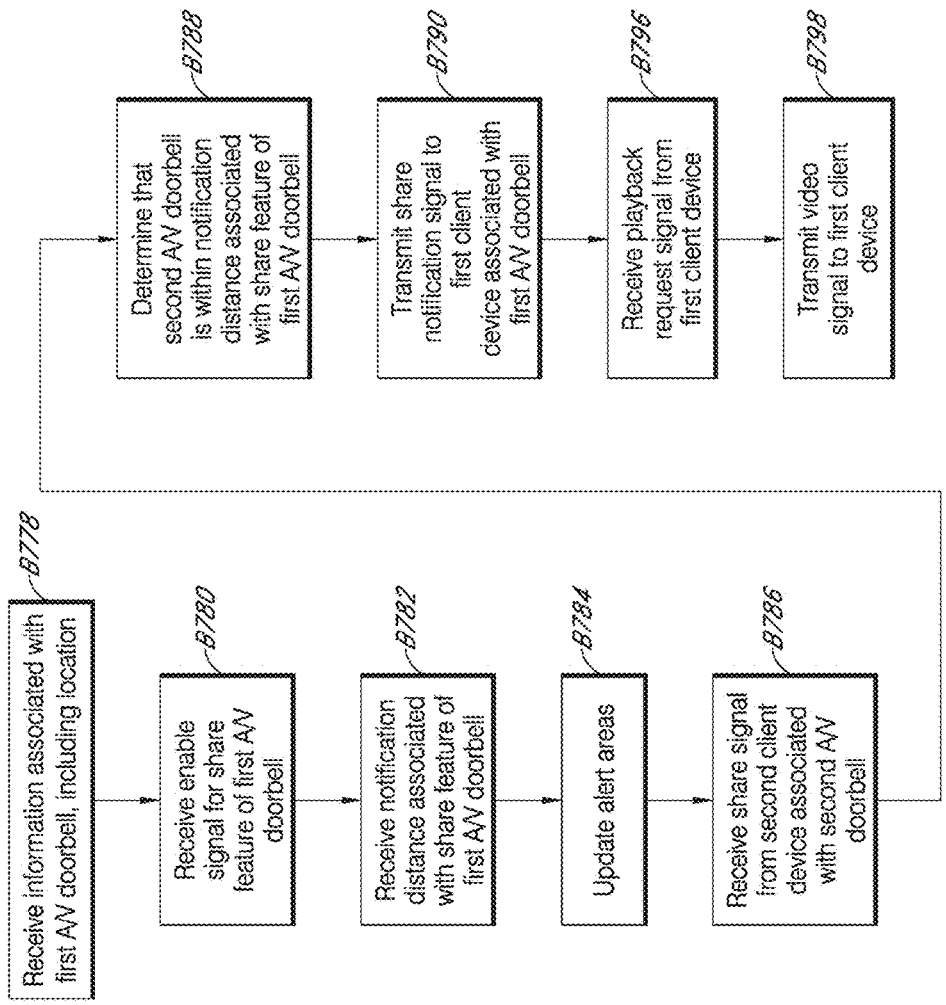
FIG. 37 is a flowchart illustrating another process for sharing video footage from an A/V recording and communication doorbell according to an aspect of the present disclosure.

FIG. 37 is a flowchart illustrating another process for sharing video footage from an A/V recording and communication doorbell according to an aspect of the present disclosure. The process of FIG. 37 is described from the perspective of the network device(s). Thus, at block B778 the network receives from the user's client device information associated with the user's A/V recording and communication device (first A/V doorbell). The information may include, for example, the location of the first A/V doorbell. The location may comprise the street address of a building with which the first A/V doorbell is associated, such as being secured thereto, for example. At block B780, the network may further receive from the user's client device, an enable signal for the video sharing feature of the first A/V doorbell. For example, during the setup process the user may enable (turn on) the video sharing feature using a GUI such as that illustrated in FIG. 31. In some embodiments, the video sharing feature may be enabled by default, such that the user does not have to take any affirmative steps to enable the video sharing feature.

With further reference to FIG. 37, at block B782 the network may further receive from the user's client device a notification distance (alert radius) associated with the video sharing feature of the first A/V doorbell. For example, during the setup process the user may select an alert radius using a GUI such as that illustrated in FIG. 31. In some embodiments, the alert radius may be set automatically to a default value, or may be set automatically according to the criteria described above, such that the user does not have to take any affirmative steps to set the alert radius. At block B784, the network may update one or more data structures (alert areas) with the information received about the first A/V doorbell, including its location and/or its alert radius.

The alert radius defines an area around the first A/V doorbell that encompasses at least one other A/V recording and communication device, which in this example will be referred to as second A/V doorbell. The second A/V doorbell may record video footage, and the user associated with the second A/V doorbell may share the recorded video footage according to a process described herein. Thus, with further reference to FIG. 35, at block B786 the network may receive from the second client device a share signal. The network, after determining, at block B788, that the second A/V doorbell is within the alert area defined around the first A/V doorbell, may then send a share notification signal to the client device associated with the first A/V doorbell at block B790. At block B796, the network receives a playback request signal from the first client device. At block B798, the network transmits a video signal to the first client device.

Figure 38:
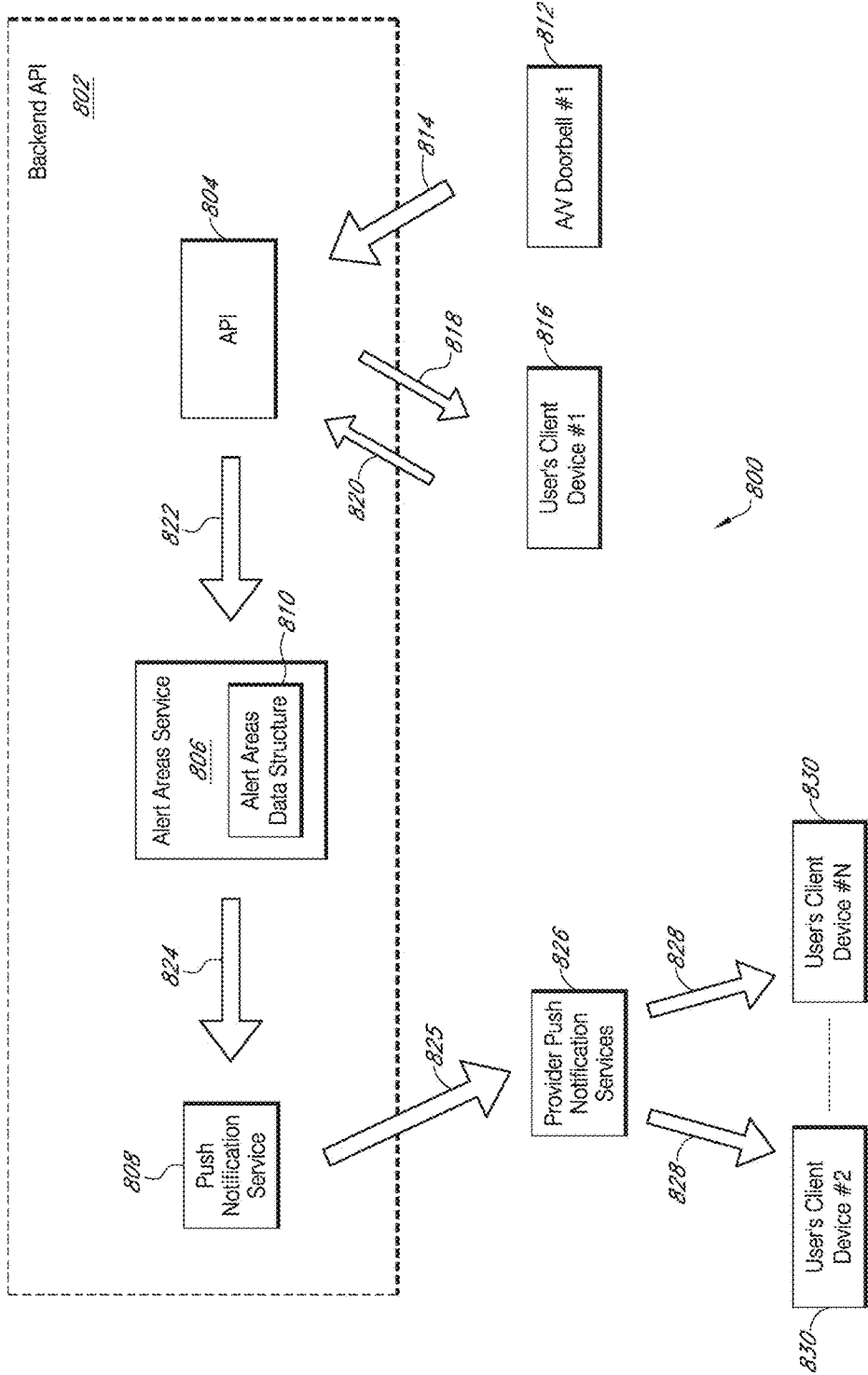
FIG. 38 is a functional block diagram illustrating a system for sharing video footage from A/V recording and communication devices according to the present embodiments.

FIG. 38 is a functional block diagram illustrating a system 800 for sharing video footage from audio/video recording and communication devices according to the present embodiments. The system 800 may comprise a backend API 802 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 802 illustrated FIG. 38 may include one or more APIs 804. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 802 illustrated in FIG. 38 may further include one or more services 806, 808 (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

The backend API 802 illustrated in FIG. 38 includes an alert areas service 806. The alert areas service 806 may comprise one or more data structures 810 storing information about a plurality of A/V recording and communication devices. For example, the information may include the location of each device (such as the street address of each device), and the size of the alert radius around each device. The alert areas service 806 may access the information in the data structure(s) 810 when needed to determine which users will receive a share notification when a first user shares recorded video footage, as further described below. The alert areas service 806 may also maintain the information in the data structure(s) 810 and update the information in the data structure(s) 810 when new A/V recording and communication devices are activated, when existing A/V recording and communication devices are deactivated, and/or when the alert radii around existing A/V recording and communication devices are changed.

In the system 800 of FIG. 38, a first A/V recording and communication device 812 (A/V Doorbell 812 #1) may record video footage, which may also include audio. The doorbell 812 sends a first alert signal and a first video signal 814 to the API 804, and the API 804 receives the first alert signal and the first video signal 814. The first video signal includes images (the video footage) captured by a camera of the doorbell 812. The API 804 transmits to a first client device 816 (User's Client Device #1), in response to receiving the first alert signal and the first video signal 814, a second alert signal and a second video signal 818. The second alert signal may be, for example, a push notification. The second video signal includes the images captured by the camera of the doorbell 812. The user associated with the first client device 816 may be the owner/user of the doorbell 812 (A/V Doorbell #1). The user, upon receiving the second alert signal, may choose to answer the second alert signal, which may, for example, open a live call between the user and the visitor at the doorbell 812. Alternatively, the user may ignore the second alert signal (e.g. choose not to answer the call). If the user ignores the second alert signal, he or she may still view the video footage of the second video signal at a later time. After viewing (or while viewing) the video footage on the display of his or her client device 816, the user may decide to share the video footage with other users. For example, the user may tap a "share" button from within an application executing on his or her client device 816. The first client device 816 then sends a share signal 820 to the API 804, and the API 804 receives the share signal 820 from the first client device 816. The share signal 820 may include text describing the images captured by the camera of the doorbell 812 (A/V Doorbell #1). In response to receiving the share signal 820 from the first client device 816, the API 804 sends identifying information 822 to the alert areas service 806. For example, the identifying information 822 may include an identifier for the user associated with A/V Doorbell #1 and an identifier for the video footage that is to be shared with other users. Alternatively, the identifying information 822 may include an identifier for A/V Doorbell #1 (rather than an identifier for the user associated with A/V Doorbell #1) and an identifier for the video footage that is to be shared with other users. The alert areas service 806 accesses the alert areas data structure(s) 810 and determines, based on the identifying information 822, the other users who are to receive a notification of the shared video footage. For example, the alert areas service 806, using the information stored in the alert areas data structure(s) 810 may determine that A/V Doorbell #1 812 is within the alert radius defined around at least one other A/V recording and communication device. Once the other device(s) has/have been identified, the alert areas service 806 may transmit a share notification signal 824 to a push notification service 808. The share notification signal 824 may include the text describing the images captured by the camera of the doorbell 812 (A/V Doorbell #1). The push notification service 808 may then forward one or more push notifications 825 to a plurality of provider push notification services 826. The provider push notification services 826 are configured to send push notifications to client devices that run different operating systems. For example, Android devices may receive push notifications from an Android push notification service 826, while iOS devices may receive push notifications from an iOS push notification service 826. Android is a mobile operating system (OS) developed by Google, based on the Linux kernel. iOS, by contrast, is a mobile operating system created and developed by Apple Inc. and distributed exclusively for Apple hardware. The provider push notification services 826 then send push notifications 828 to the client devices 830 associated with the other doorbell(s) identified by the alert areas service 806. The other user(s), upon receiving the push notifications 828, may choose to view the shared video footage. Alternatively, the other user(s) may ignore the push notifications 828. If the other user(s) ignores the push notifications 828, he or she may still view the shared video footage at a later time. In either event (viewing the shared video footage right away or viewing the shared video footage at a later time), one or more of the client devices 830 sends a playback request signal (not shown) to the backend API 802 (and the backend API 802 receives the playback request signal from the one or more of the client devices 830). In response to receiving the playback request signal from the one or more of the client devices 830, the backend API 802 transmits a video signal (not shown) to the one or more of the client devices 830. The video signal includes the shared video footage. In certain embodiments, the alert areas service 806 may receive the playback request signal from the one or more of the client devices 830 and transmit the video signal to the one or more of the client devices 830. If the other user(s) opens the push notification, which may contain a reference to the shared video footage, the other user(s) client device(s) 830 may use the API 804 to get the URL (Uniform Resource Locator) of the shared video footage and any other metadata (if any) about the shared video footage so that the shared video footage can be played back. If the other user(s) opens the shared video footage from the NEIGHBORHOOD ACTIVITY screen 716 (FIG. 29), a similar process may occur, but the reference to the shared video footage may be in the activity feed item.

In some embodiments, an A/V recording and communication device may begin recording video footage not in response to a visitor being detected, but rather when a user accesses the camera of the device to view live video footage using his or her client device (e.g. "on-demand" viewing). In such embodiments, a process for sharing a video may include a step of the user accessing the camera of the device to view live video footage using his or her client device (e.g. "on-demand" viewing), followed by the user sharing the live video footage. For example, the user may select a share button from within an application executing on the user's client device (similar to the share button 584 described above with respect to FIGS. 15 and 16), and a share signal may then be sent from the user's client device and received by the network device(s) (similar to step 548 described above with respect to FIG. 13), and a share notification signal may then be sent from the network device(s) and received by another client device(s) (similar to step 550 described above with respect to FIG. 13). Example embodiments of video-on-demand are described in U.S. patent application Ser. Nos. 62/267,762 and 62/289,114, both of which are incorporated herein by reference in their entireties as if fully set forth.

As described above, the present embodiments advantageously enable users of A/V recording and communication devices to share video footage with one another. This feature can help reduce crime by increasing public awareness of suspicious activity. Users can tailor the number and frequency of alerts (notifications of shared videos) they receive by increasing and decreasing the size of the alert radius around their own A/V recording and communication device(s). Users will only receive alerts that result from videos recorded by other A/V recording and communication devices that are located within the alert area that the user has set. Users may share videos as frequently or as infrequently as desired, and users may view shared videos from other users as frequently or as infrequently as desired. When a user receives an alert, he or she can choose to view the accompanying video immediately, or to ignore the alert. If the user ignores the alert, he or she can still view the video at a later time using one or more menu screens within an application executing on the user's client device. The present embodiments thus advantageously provide a tool that can be used to reduce crime rates and that can be tailored by each user to meet his or her personal preferences.

The present embodiments describe numerous ways for sharing videos, including via social media and/or social network(s). A social network may comprise a third-party network, such as NEXTDOOR®, FACEBOOK®, INSTAGRAM®, TWITTER®, etc. A social network may also comprise a network made up of users of A/V recording and communication devices, such as video doorbells and security cameras. For example, when a user shares a video via the neighborhood share button 584 described above with respect to FIGS. 15, 16, 20, and 21, the video is shared with a social network in which the members of the social network are users who have A/V recording and communication devices, such as video doorbells and security cameras. The present embodiments are not limited to any particular kind or type of social network. Further, participants in the social network are not limited to users of A/V recording and communication devices of any particular kind or type.

In the present embodiments, some steps shown in one or more of the sequence diagrams and/or flowcharts may be omitted. For example, in the process for sharing video footage from a first A/V recording and communication device, such as shown in FIGS. 13 and 14, for example, the steps of transmitting/receiving the first alert signal and the first video signal and transmitting/receiving the second alert signal and the second video signal may be omitted. Such an embodiment might comprise, therefore, just the steps of transmitting/receiving the share signal transmitting/receiving the share notification signal.

Figure 39:
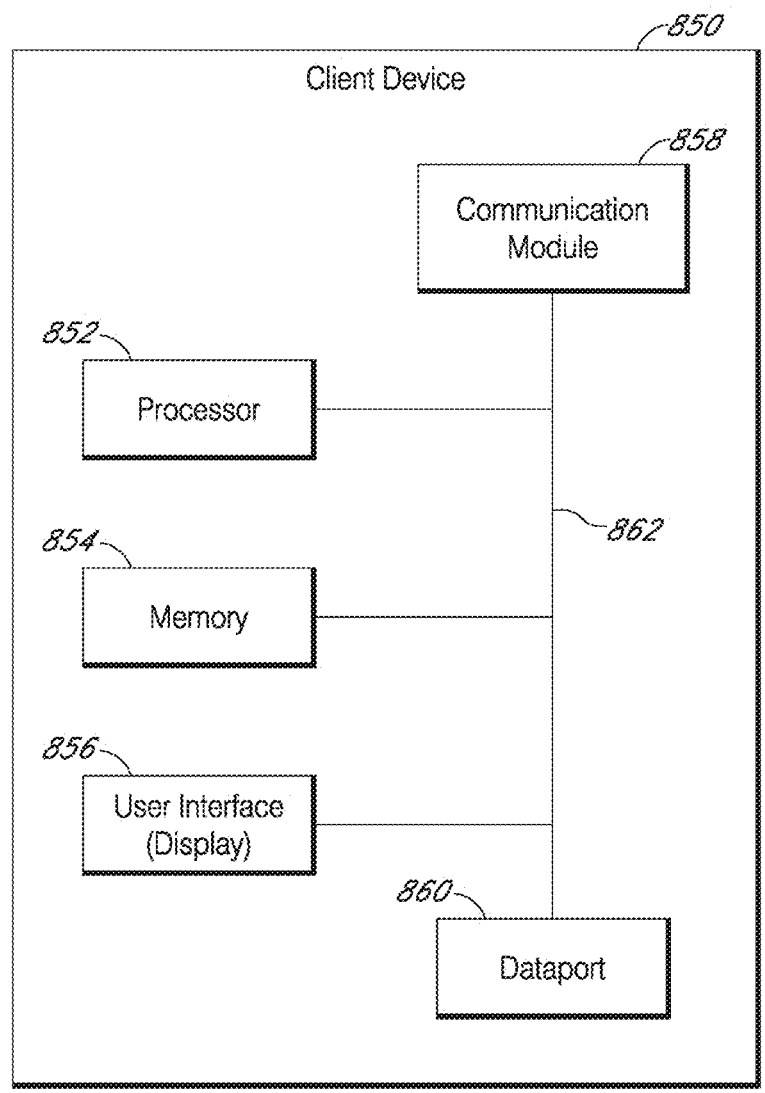
FIG. 39 is a functional block diagram of a client device on which the present embodiments may be implemented according to various aspects of the present disclosure.

FIG. 39 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a mobile phone such as a smartphone, or a computing device such as a tablet computer, a laptop computer, a desktop computer, etc.

With reference to FIG. 39, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM).). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 854 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 858 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 40:
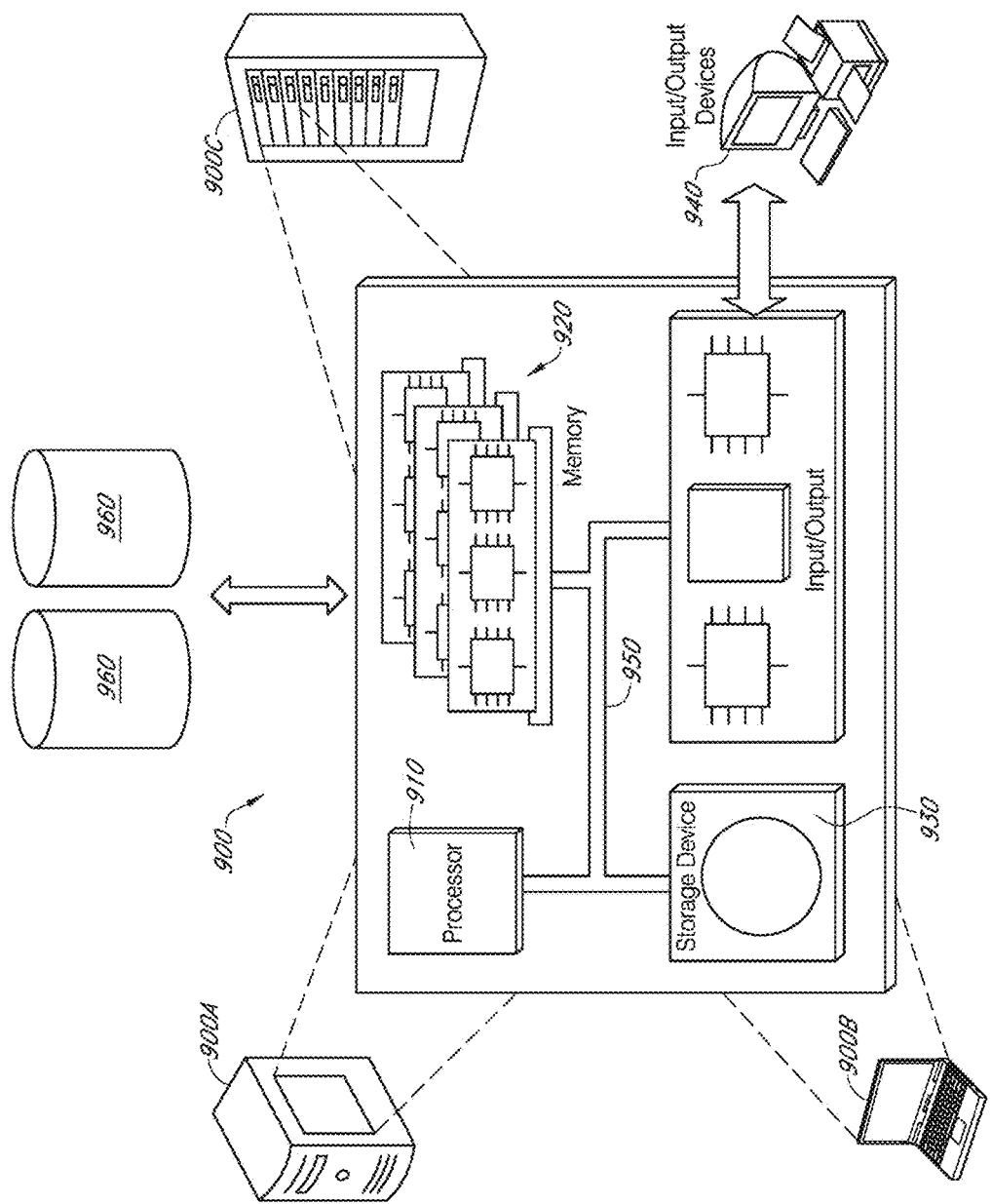
FIG. 40 is a functional block diagram of a general-purpose computing system on which the present embodiments may be implemented according to various aspects of present disclosure.

FIG. 40 is a functional block diagram of a general-purpose computing system on which the present embodiments may be implemented according to various aspects of the present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

Figure 41:
FIG. 41 is a screenshot of a graphical user interface (GUI) illustrating aspects of another process for sharing video footage from an A/V recording and communication device according to an aspect of the present disclosure.

In some embodiments, users may tag or categorize their videos when sharing them with other users, and users may set one or more preferences for the type(s) of videos for which they want to receive share notifications. For example, FIG. 41 illustrates an embodiment of a graphical user interface (GUI) 970 for setting one or more user preferences for the type(s) of videos for which the user wants to receive share notifications. The Neighborhood Alert Settings screen 970 includes a list 972 having a plurality of categories, including, for example, SUSPICIOUS ACTIVITY 974, BURGLARY 976, ATTEMPTED BURGLARY 978, VANDALISM 980, THEFT 982, and OTHER 984. By selecting one or more of the listed categories, a user may limit the type(s) of videos that will be shared with that user. For example, the user may only receive share notifications for shared videos that fall within one or more of the categories that the user has selected. A GUI (not shown) similar to that shown in FIG. 41 may be provided to users during the video sharing process, so that the shared videos can be tagged or categorized. In some embodiments, a user may choose not to categorize a shared video. In some embodiments, a user who has set preferences for the types of videos he or she wants to be notified about may receive share notifications for uncategorized shared videos. In alternative embodiments, a user who has set preferences for the types of videos he or she wants to be notified about may not receive share notifications for uncategorized shared videos.

In some embodiments, users may be able to view shared videos regardless of where their own A/V recording and communication devices are located. In still further embodiments, even users who do not even own any A/V recording and communication devices may be able to view shared videos. For example, shared videos may be available through a publicly accessible forum, such as a website. In another example, shared videos may be accessed by users running an application on their client devices. A user sharing a video may have the option to make the shared video available to the public, or to restrict the shared video to only those users identified through the processes described above, such as the processes of FIGS. 11-14. In still further embodiments, a user may be able to view shared videos from any area the user specifies by selecting a location on a map and specifying an alert radius around the location. In still further embodiments, a user may enable "alerts around me." This feature may work in real-time to provide the user with alerts from within a given radius of the user's current location. The user's current location may be determined, for example, using GPS technology and the user's mobile client device, such as a smartphone.

In some embodiments, shared videos may be accessed by law enforcement agencies. For example, a user sharing a video may have the option to make the shared video available to law enforcement through a web portal. Law enforcement may be able to log in through the web portal to view the shared videos. For example, the web portal may include a map view indicating the locations of all of the shared videos. The map view may include selectable markers or icons corresponding to the locations of the shared videos. Selecting one of the icons may open a video player and begin playback of the shared video corresponding to the selected icon. Different law enforcement agencies, departments, or groups may have different logins that grant access to specific zones, such as geographic locations that are within the jurisdiction of each agency, department, or group.

In some embodiments, users may be able to block videos from certain other users and/or from certain locations.

In some embodiments, when a user attempts to share a video, the video may undergo a review before being shared with other users. For example, with reference to FIG. 18, when the network 542 receives the share signal 548, an administrator may subsequently review the video before the share notification signal 550 may be sent to any client devices of other users. If the video violates any policies, the administrator may prevent the share notification signal 550 from being sent to any client devices of other users. A notification, such as an e-mail, may be sent to the user who shared the video explaining that the video did not comply with one or more policies or guidelines. The requirement for administrator review may apply to all users, or selectively to only some users, such as users who have attempted to share one or more inappropriate videos. In further embodiments, an administrator may ban a user from sharing videos, such as for repeated policy violations (such as attempting to share one or more inappropriate videos).

As described above, another aspect of the present embodiments includes the realization that a person and/or an object of interest is typically not stationary. For example, when an A/V recording and communication device records video footage of suspicious and/or criminal activity, the suspect in the video footage is likely to be moving. The sharing of such video footage may alert neighbors to the potential dangers, particularly because the suspect may still be in the vicinity (e.g., the neighborhood). It would be advantageous then to enhance the functionality of A/V recording and communication devices by using shared video footage to identify one or more cameras to power up and record additional video footage. For example, a neighborhood may include multiple camera devices such as (but not limited to) first cameras and second cameras of various A/V recording and communication devices, and one or more of the second cameras may be configured to power up and capture additional image (and, in some embodiments, audio data) based on shared video footage from a first camera. Further, the functionality of A/V recording and communication devices may be enhanced by using any report of a crime from any source to power up one or more cameras to capture image and/or audio data. Moreover, the present embodiments improve upon and solve the problem of resource management by using a power-up command signal to configure the one or more cameras to switch from a low-power state to a powered-on state, thereby, conserving power. The present embodiments provide these advantages, as described below.

In one example use case, a camera of an A/V recording and communication device or a client device may record video footage of a criminal act, or another type of event that may be of interest to one or more users. The video footage may include audio recorded contemporaneously with the video by a microphone of the A/V recording and communication device or the client device, although in some embodiments the video footage may not include audio. A first user, using an application executing on a client device, may share the video footage (with the audio, if available) to a network of users. For example, the network of users may comprise users who own at least one A/V recording and communication device, such as a video doorbell. In another example, the network of users may comprise some users who own at least one A/V recording and communication device, such as a video doorbell, and some users who do not own such a device. In another example, the network of users may comprise users who do not own any A/V recording and communication devices, including video doorbells. In some embodiments, the first user may provide textual information about the shared video footage, such as a description of the person(s) and/or event(s) depicted in the shared video footage. The first user may, for example, enter the textual information about the shared video footage using a keyboard or other input device (e.g., speech-to-text processing) of the client device. This text data, if provided, may also be shared with the network of users in connection with the shared video footage. The shared video footage (and audio and/or text data, if provided) may be received by one or more backend devices in the network, such as one or more servers, APIs, databases, etc. Upon receiving the shared video footage, the one or more backend devices may identify second cameras and/or cameras of other A/V recording and communication devices to power up and capture additional image and/or audio data. Further, the one or more backend devices may be configured to receive a report of a crime (may also be referred to as a crime report signal) from any device in network communication with the one or more backend devices and, in response to receiving the crime report signal, identify second cameras and/or cameras of A/V recording and communication devices to power up and capture image and/or audio data.

The shared video footage and/or the crime report signal may include location information that may be used by the backend devices to identify the one or more cameras to power up. For example, the first user may include a geographic location where the video footage shared by the first user was recorded. In another example, the shared video footage may include metadata that provides a geographic location where the video footage shared by the first user was recorded. In a further example, the shared video footage may be analyzed using a computer vision (or the like) process for street signage, landmarks, and/or any other identifier of a geographic location. Using the geographic location, the backend devices may identify second camera(s) and/or A/V recording and communication devices within a predetermined distance from the geographic location. The backend devices may generate and transmit a power-up command signal to the additional cameras to power up and capture video and/or audio data. The additional video and/or audio might capture (record) the suspect, which may be useful to law enforcement in apprehending the suspect.

In any of the present embodiments, the shared video footage may be recorded by any type of device having a camera, including, but not limited to, an A/V recording and communication device such as a video doorbell, or a client device such as a smartphone. Further, in some embodiments, the shared video footage may comprise only a single frame of video or a still image. In embodiments in which the shared video footage is recorded by a client device, the client device may be associated with an A/V recording and communication device such as a video doorbell. For example, the client device may receive alerts from the A/V recording and communication device in a similar manner as described above with respect to FIG. 1. In other embodiments, however, in which the shared video footage is recorded by a client device, the client device may not be associated with any A/V recording and communication devices. The present embodiments are thus not limited to networks that include A/V recording and communication devices, nor are the present embodiments limited to use by users who own A/V recording and communication devices. That is, any user who has a device with a camera may join and participate in the network. Further, even users with non-camera devices may join and participate in the network. For example, a user may join and participate in the network by providing information that may be included in a crime report signal. Still further, users with camera devices may participate in the network in one or more ways that do not include the camera. For example, for non-camera devices, as well as for camera devices, the type of content/data/information shared with the network may comprise only audio data, or only text data, or audio data combined with text data.

Figure 42:
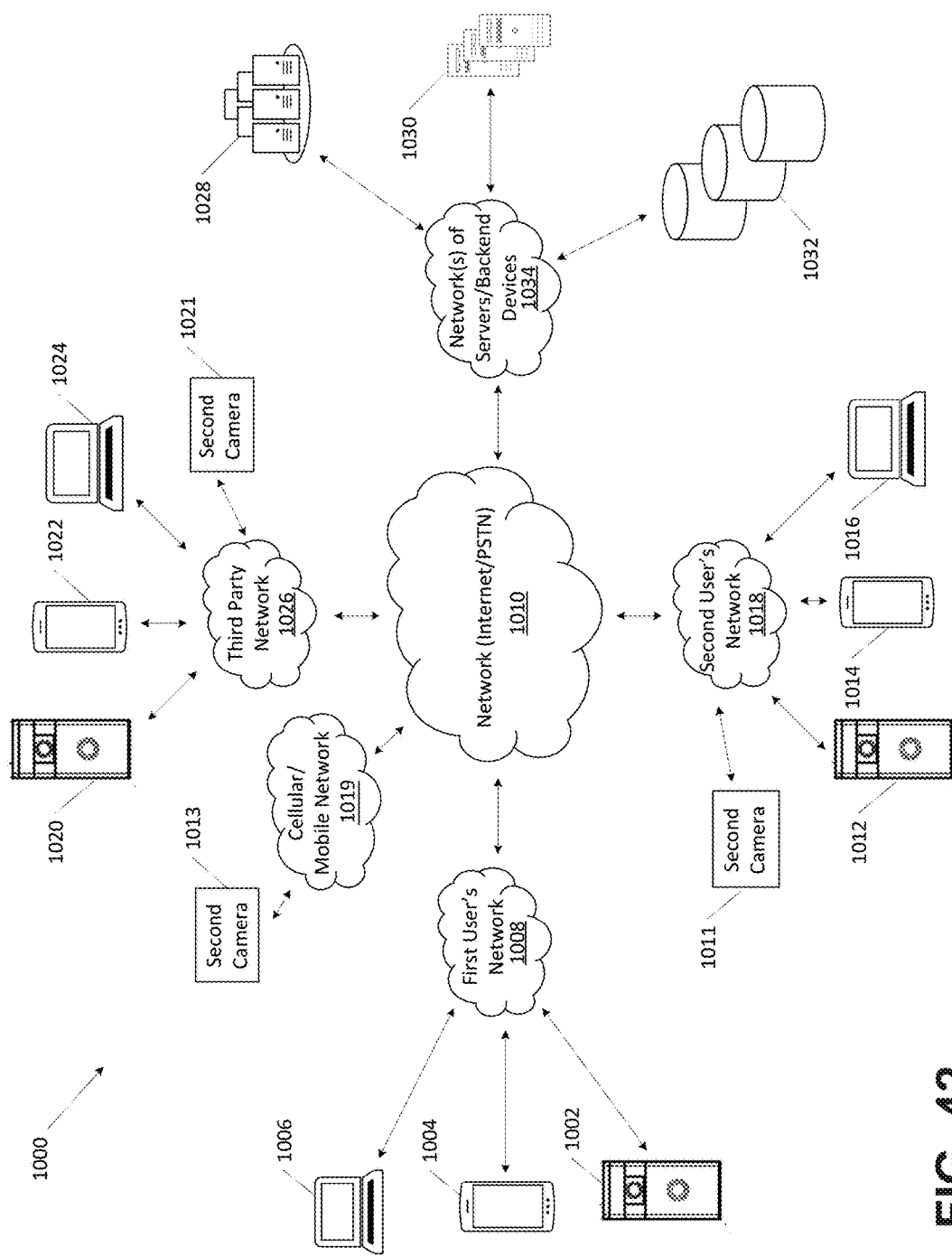
FIG. 42 is a functional block diagram illustrating a system for communicating in a network according to various aspects of the present disclosure.

FIG. 42 is a functional block diagram illustrating a system 1000 for communicating in a network using a share signal. As described above, a first client device may share a video, audio, and/or text using a share signal, and the network may receive the share signal. As further described below, the network may include one or more backend devices such as (but not limited to) a backend server that may be configured to receive the share signal and identify one or more second cameras to power up and capture second image data. In other embodiments, the backend server may be configured to receive the share signal and identify a first camera of a second A/V recording and communication device to power up and capture first image data. In many embodiments, the backend server may also be configured to receive a crime report signal from any device in network communication with the backend server such as (but not limited to) law enforcement devices, third-party devices, and/or various user devices. Upon receiving the crime report signal, the backend server may be configured to identify one or more second cameras to power up and capture second image data, as further described below. In other embodiments, the backend server may also be configured to receive the crime report signal and identify a first camera of an A/V recording and communication device to power up and capture first image data.

In various embodiments, a crime report signal may include any video, audio, and/or text data that provides information regarding a possible crime, suspect, and/or location. Further, a crime report signal may be shared by a user or a non-user of an A/V recording and communication device. For example, a witness may capture video and/or audio of a crime in progress and share such information with a network of users using a crime report signal. In another example, the witness may not have video or audio of the crime to share, but may share text data, such as a description of the perpetrator, the crime, and/or the location. In other examples, a law enforcement agency may send out a crime report signal to a network of users based on information that the law enforcement agency has gathered regarding a possible crime and/or a suspect. In some embodiments, the crime report signal may include information regarding a crime and/or suspect shared via social media and/or social network(s). For example, the backend devices such as the backend server may receive the crime report signal from third-party social networks that may include any social media service or platform that uses computer-mediated tools that allow participants to create, share, and/or exchange information in virtual communities and/or networks, such as (but not limited to) social networking websites and/or applications running on participant devices. Non-limiting examples of social networks include NEXTDOOR®, FACEBOOK®, INSTAGRAM®, SNAPCHAT®, TWITTER®, etc. In some embodiments, the backend devices such as the backend server may receive the crime report signals from third parties, such as the general public, where a member of the public may transmit a signal that includes information about an event that the member of the public witnessed, such as (but not limited to) a possible crime using their third-party device, such as, but not limited to, a smartphone, where the signal transmitted by the member of the public may include image data, audio data, and/or text data.

In reference to FIG. 42, the system 1000 may include one or more first audio/video (A/V) recording and communication devices 1002 configured to access a first user's network 1008 to connect to a network (Internet/PSTN) 1010. The system 1000 may also include one or more first client devices 1004, 1006, which in various embodiments may be configured to be in network communication with the first A/V recording and communication device 1002. The first client devices 1004, 1006 may comprise, for example, a mobile phone such as a smartphone, or a computing device such as a tablet computer, a laptop computer, a desktop computer, etc. The first client devices 1004, 1006 may include any or all of the components and/or functionality of the client device 114 and/or the client device 850 described herein. In some embodiments, the first client devices 1004, 1006 may not be associated with a first A/V recording and communication device, as described above.

In various embodiments, the system 1000 may also include one or more second A/V recording and communication devices 1012 connected to the network (Internet/PSTN) 1010 using a second user's network 1018. The system 1000 may further include one or more second client devices 1014, 1016, which in various embodiments may be configured to be in network communication with the second A/V recording and communication device 1012. The second client devices 1014, 1016 may comprise, for example, a mobile phone such as a smartphone, or a computing device such as a tablet computer, a laptop computer, a desktop computer, etc. The second client devices 1014, 1016 may include any or all of the components and/or functionality of the client device 114 and/or the client device 850 described herein. In some embodiments, the second client devices 1014, 1016 may not be associated with a second A/V recording and communication device, as described above. The system 1000 may also include one or more second cameras 1011 connected to the network (Internet/PTSN) 1010 using the second user's network 1018. The one or more second cameras 1011 may also be configured to be in network communication with the second client devices 1014, 1016 and/or the second A/V recording and communication device 1012. In some embodiments, the one or more second cameras 1011 and a first camera of the second A/V recording and communication device 1012 may be configured to power up and capture image data based on a shared signal, as further described below. In other embodiments, the second camera 1011 and/or the first camera of the second A/V recording and communication device 1012 may be configured to power up and capture image data based on a crime report signal from any device in network communication with a backend server 1032 such as (but not limited to) third-party client devices 1022, 1024 and/or various other devices, as further described below.

In some embodiments, the system 1000 may also include one or more third-party A/V recording and communication devices 1020 connected to the network (Internet/PSTN) 1010 using various third-party networks 1026 such as a local network, a wireless network such as a cellular/mobile network and/or a Wi-Fi network, a wired network such as an Ethernet network, a public network, a low-bandwidth network, and/or any other appropriate network to access the network (Internet/PSTN) 1010. The system 1000 may further include one or more third-party client devices 1022, 1024, which in various embodiments may be configured to be in network communication with the third-party A/V recording and communication device 1020. The third-party client devices 1022, 1024 may comprise, for example, a mobile phone such as a smartphone, or a computing device such as a tablet computer, a laptop computer, a desktop computer, etc. The third-party client devices 1022, 1024 may include any or all of the components and/or functionality of the client device 114 and/or the client device 850 described herein. In some embodiments, the third-party client devices 1022, 1024 may not be associated with a third-party A/V recording and communication device, as described above. The system 1000 may also include one or more second cameras 1021 connected to the network (Internet/PSTN) 1010 using the various third-party networks 1026. The one or more second cameras 1021 may also be configured to be in network communication with the third client devices 1022, 1024 and/or the third A/V recording and communication device 1020. In many embodiments, the one or more second cameras 1021 and/or a first camera of the third-party A/V recording and communication 1020 may be configured to power up and capture image data based on the share signal from the first client device(s) 1004, 1006, as further described below. In other embodiments, the one or more second cameras 1021 and the first camera of the third-party A/V recording and communication device(s) 1020 may be configured to power up and capture image data based on the crime report signal from any device in network communication with a backend server 1032 such as (but not limited to) law enforcement devices and/or various user devices, as further described below.

In some embodiments, the system 1000 may also include one or more second cameras 1013 connected to the network (Internet/PSTN) 1010 using various access points such as (but not limited to) a cellular/mobile network 1019, a local network, a wireless network such as a Wi-Fi network, a public network, a low-bandwidth network, and/or any other appropriate network to access the network (Internet/PSTN) 1010. In some embodiments, the one or more second cameras 1013 may be configured to be part of a local network and associated with one or more client devices and/or one or more A/V recording and communication devices. In many embodiments, the one or more second cameras 1013, associated devices, and A/V recording and communication devices may be controlled by an administrator.

With further reference to FIG. 42, the system 1000 may also include various backend devices such as (but not limited to) storage devices 1032, backend servers 1030, and backend APIs 1028 in network communication with the first, second, and third-party A/V communication devices 1002, 1012, 1020, their respective client devices 1004, 1006, 1014, 1016, 1022, 1024, and the one or more second cameras 1011, 1013, 1021. The backend servers 1030 may be configured to receive a share signal from the first client device(s) 1002, 1004, as described above. In many embodiments, the backend servers 1030 may be configured to identify second camera(s) 1011, 1013, 1021 and/or first cameras of A/V recording and communication devices 1012, 1020 to power up and capture image data based on the share signal. In some embodiments, the backend servers 1030 may be configured to receive a crime report signal from any device in network communication such as (but not limited to) third-party devices 1022, 2024, law enforcement devices, and/or various users' devices 1004, 1006, 1014, 1016. In many embodiments, the backend servers 1030 may be configured to identify second camera(s) 1011, 1013, 1021 and/or first cameras of A/V recording and communication devices 1002, 1012, 1020 to power up and capture image data based on the crime report signal.

In some embodiments, the storage devices 1032 may be a separate device from the backend servers 1030 (as illustrated) or may be an integral component of the backend servers 1030. In addition, the first user's network 1008 and the network 1010 may be similar in structure and/or function to the user's network 110 and the network (Internet/PSTN) 112 (FIG. 1), respectively. In some embodiments, the first and second A/V recording and communication devices 1002, 1012 may be similar in structure and/or function to the A/V doorbell 100 (FIG. 1) and/or the A/V recording and communication doorbell 130 (FIG. 3) and/or the A/V recording and communication floodlight controller 100, (FIG. 9). In some embodiments, the first user's client devices 1004, 1006 may be similar in structure and/or function to the user's client device 114 (FIG. 1) and/or the user's client device 850 (FIG. 39). The second user's client devices 1014, 1016 may also be similar in structure and/or function to the user's client device 114 (FIG. 1) and/or the user's client device 850 (FIG. 39). Also, the storage devices 1032 may be similar in structure and/or function to the storage device 116 (FIG. 1). In addition, in some embodiments, the backend servers 1030 and backend APIs 1028 may be similar in structure and/or function to the server 118 and the backend API 120 (FIG. 1), respectively.

Figure 43:
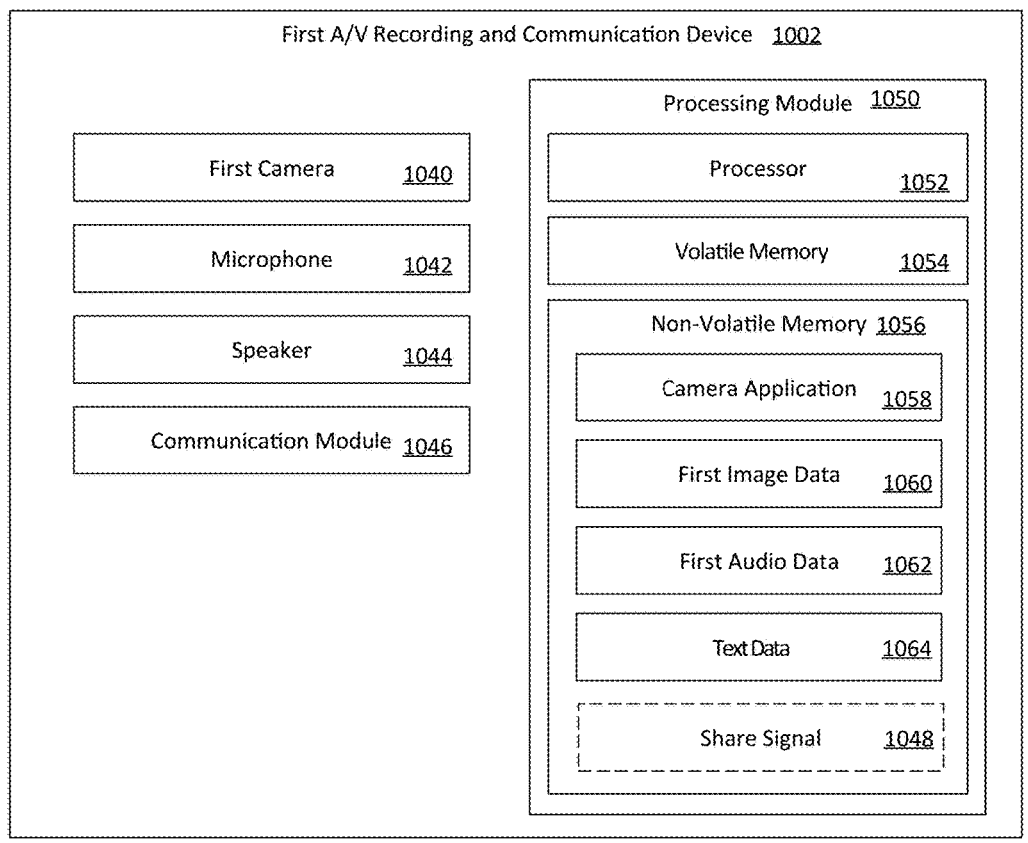
FIG. 43 is a functional block diagram illustrating one embodiment of a first A/V recording and communication device according to various aspects of the present disclosure.

FIG. 43 is a functional block diagram illustrating an embodiment of the first A/V recording and communication device 1002 according to various aspects of the present disclosure. The first A/V recording and communication device 1002 may comprise a processing module 1050 that is operatively connected to a first camera 1040, a microphone 1042, a speaker 1044, and a communication module 1046. The processing module 1050 may comprise a processor 1052, volatile memory 1054, and non-volatile memory 1056 that includes a camera application 1058. In various embodiments, the camera application 1058 may configure the processor 1052 to capture first image data 1060 using the first camera 1040 and first audio data 1062 using the microphone 1042. In various embodiments, the first camera 1040 may be configured to capture the first image data 1060 at a first resolution. In some embodiments, the camera application 1058 may also configure the processor 1052 to generate text data 1064 describing the first image data 1060. In other embodiments, the text data 1064 describing the first image data 1060 may be generated by a user using the first client device 1004, 1006 associated with the first A/V recording and communication device 1002, as described above. In addition, the camera application 1058 may configure the processor 1052 to transmit the first image data 1060, the first audio data 1062, and/or the text data 1064 to the first client device 1004, 1006 using the communication module 1046. In some embodiments, the first client device 1004, 1006 may generate and transmit a share signal 1048 using the first image data 1060, the first audio data 1062, and/or the text data 1064 to the backend server 1030, as described above. In other embodiments, the camera application 1058 may configure the processor 1052 to directly generate and transmit a share signal 1048 using the first image data 1060, the first audio data 1062, and/or the text data 1064 to the backend server 1030 using the communication module 1046. As further described below, the share signal 1048 may be received by the backend server 1030 for powering up second camera(s) 1011, 1013, 1021 and/or first cameras of other A/V recording and communication devices 1012, 1020 in network communication with the backend server 1030.

Figure 44:
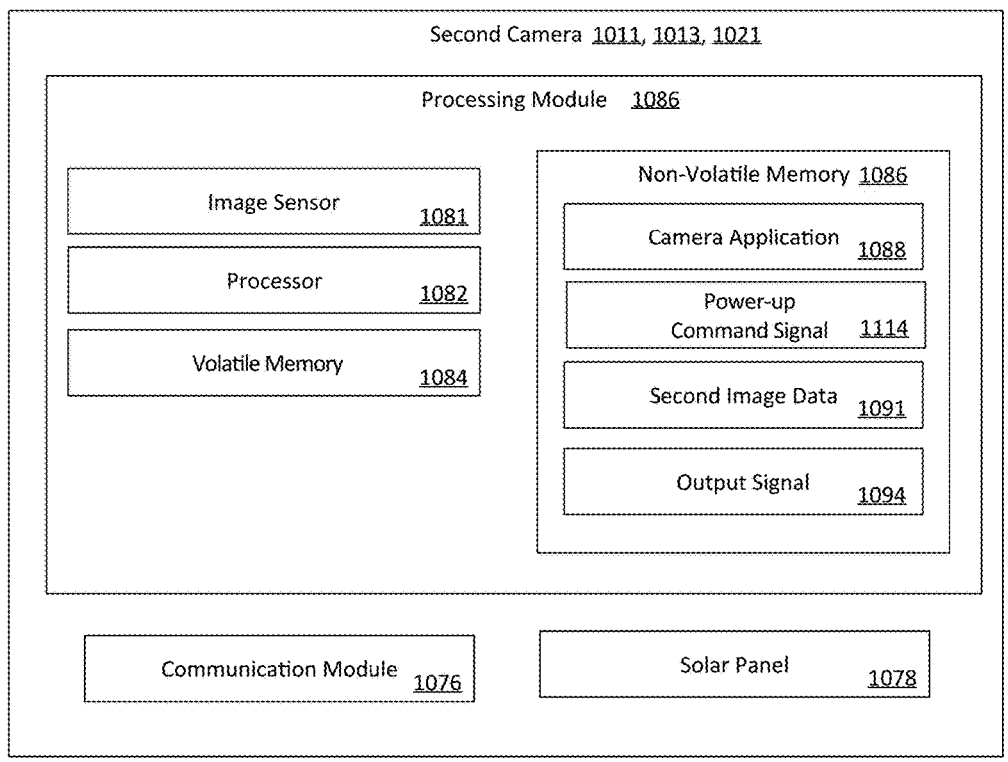
FIG. 44 is a functional block diagram illustrating one embodiment of a second camera according to various aspects of the present disclosure.

FIG. 44 is a functional block diagram illustrating an embodiment of the second camera 1011, 1013, 1021 according to various aspects of the present disclosure. In some embodiments, the second camera(s) 1011, 1013, 1021 may be a standalone unit (as illustrated) or an integral part of another device, such as an A/V recording and communication device or A/V recording and communication doorbell. Further, the second camera(s) 1011, 1013, 1021 may have its own processing capabilities (as illustrated) or may be controlled and configured by a separate processing module (not illustrated). In addition, the one or more second camera(s) 1011, 1021 may be part of a user's network in network communication with associated client devices and/or A/V recording and communication devices. In other embodiments, the second camera(s) 1013 may not be in network communication with a user's client devices or A/V recording and communication devices. As described above, the second camera(s) 1013 may be in network communication with and configured by an administrator's client device and/or the backend server 1030.

In further reference to FIG. 44, the one or more second camera(s) 1011, 1013, 1021 may include a communication module 1076 for network communication with the backend server 1030. In some embodiments, the second camera(s) 1011, 1013, 1021 may include a processing module 1080 comprising an image sensor 1081, a processor 1082, volatile memory 1084, and non-volatile memory 1086. The non-volatile memory 1086 may comprise a camera application 1088 that configures the processor 1082 to receive a power-up command signal 1114 from the backend server 1030 using the communication module 1076, and power up to capture second image data 1090 using the image sensor 1081, as further described below. In some embodiments, the camera application 1088 may configure the processor to 1082 to generate an output signal 1094 using the second image data 1090 and transmit the output signal 1094 to the backend server 1030, as further described below. In some embodiments, the received power-up command signal 1114, second image data 1090 and/or the output signal 1094 may be stored in the non-volatile memory 1080. In various embodiments, the second camera(s) 1011, 1013, 1021 may be configured to capture the second image data 1090 at a second resolution. In addition, the second camera(s) 1011, 1013, 1021 may also include at least one solar panel 1078 as a power source.

As described above, in reference to FIGS. 43 and 44, the first camera 1040 of the first A/V recording and communication device 1002 may be configured to capture first image data 1060 at a first resolution. Further, the second camera(s) 1011, 1013, 1021 may be configured to capture second image data 1090 at a second resolution. In many embodiments, the first resolution and the second resolution may be different. In some embodiments, the first resolution may be higher than the second resolution, or vice versa. The different resolutions of the first camera 1040 and the second camera(s) 1011, 1013, 1021 may result in the lower resolution camera also consuming less power than the higher resolution camera. In alternative embodiments, the first camera 1040 may consume less power than the second camera(s) 1011, 1013, 1021 even if the difference in power consumption is unrelated to the resolution(s) of the two cameras. For example, in some embodiments the first camera 1040 and the second camera(s) 1011, 1013, 1021 may have similar (or the same) resolution, but one of the cameras may consume less power than the other camera.

Figure 45:
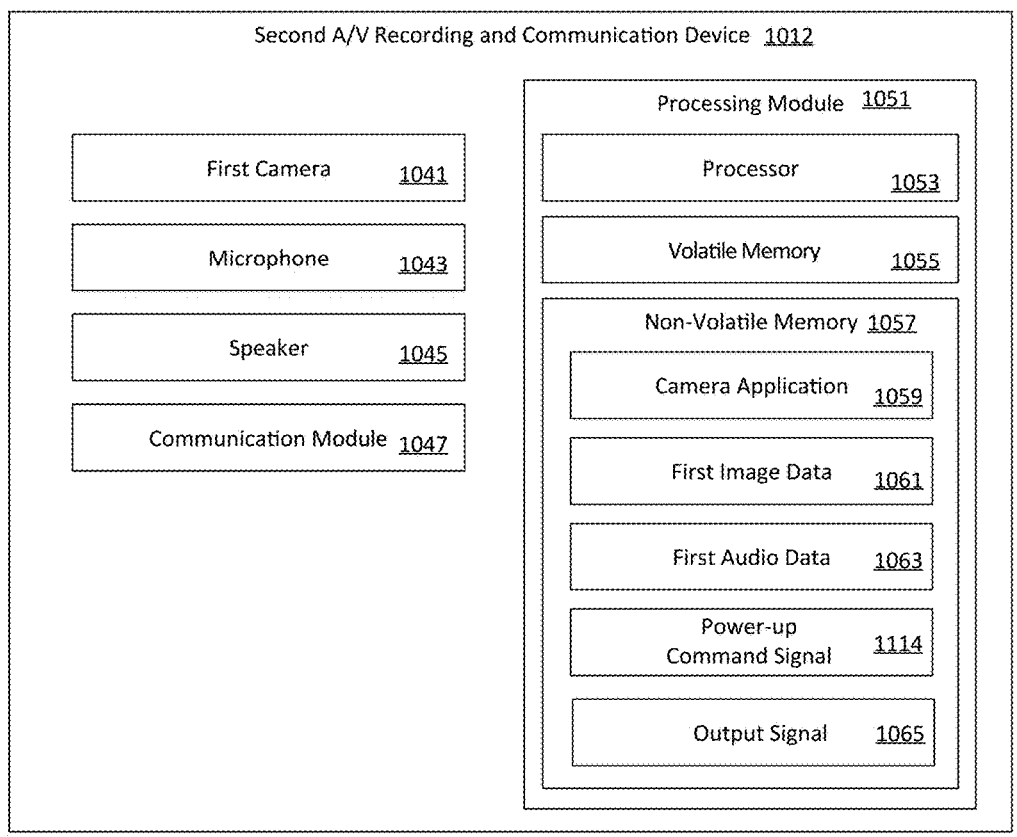
FIG. 45 is a functional block diagram illustrating one embodiment of a second A/V recording and communication device according to various aspects of the present disclosure.

FIG. 45 is a functional block diagram illustrating an embodiment of the second A/V recording and communication device 1012 according to various aspects of the present disclosure. The second A/V recording and communication device 1012 may comprise a processing module 1051 that is operatively connected to a first camera 1041, a microphone 1043, a speaker 1045, and a communication module 1047. The processing module 1051 may comprise a processor 1053, volatile memory 1055, and non-volatile memory 1057 that includes a camera application 1059. In various embodiments, the camera application 1059 may configure the processor 1053 to maintain the first camera 1041 in a low-power state and power-up upon receiving a power-up command signal 1114, as further described below. In various embodiments, the first camera 1041 may power up and capture first image data 1061 using the first camera 1041 and first audio data 1063 using the microphone 1043. In some embodiments, the first camera 1041 may be configured to capture the first image data 1061 at a first resolution. In addition, the camera application 1059 may configure the processor 1053 to transmit the first image data 1061 and/or the first audio data 1063 to the backend server 1030 using the communication module 1047. In some embodiments, the camera application 1059 may configure the processor 1053 to generate and transmit an output signal 1065 using the first image data 1061 and/or the first audio data 1063 to the backend server 1030.

In reference to FIGS. 43, 44, and 45, the image data 1060, 1061, 1090 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments. In addition, a communication module, such as the communication modules 1046, 1047, 1076 may comprise (but is not limited to) one or more transceivers and/or wireless antennas (not shown) configured to transmit and receive wireless signals. In further embodiments, the communication modules 1046, 1047, 1076 may comprise (but are not limited to) one or more transceivers configured to transmit and receive wired and/or wireless signals.

Figure 46:
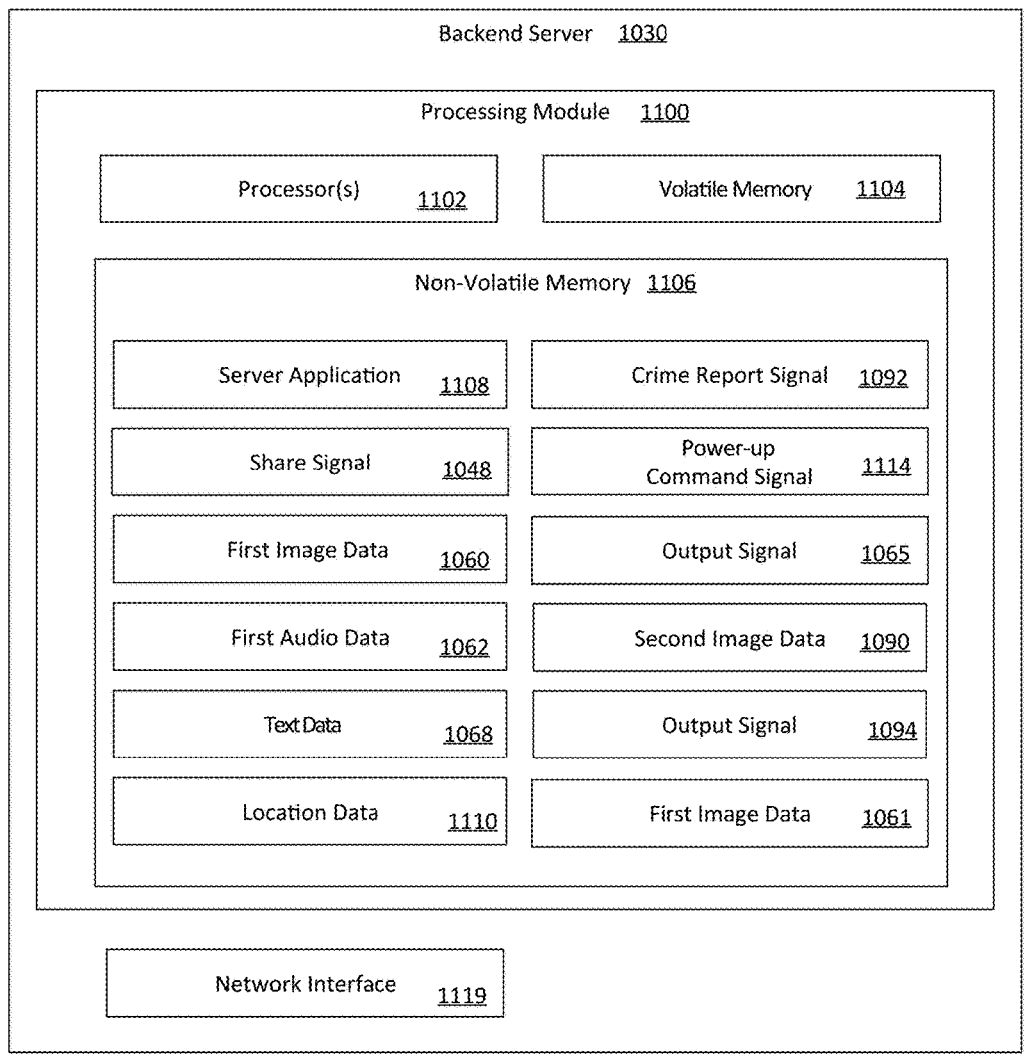
FIG. 46 is a functional block diagram illustrating one embodiment of a backend device according to various aspects of the present disclosure.

FIG. 46 is a functional block diagram illustrating one embodiment of a backend server 1030 according to various aspects of the present disclosure. The backend server 1030 may comprise a processing module 1100 comprising a processor 1102, volatile memory 1104, network interface 1119, and non-volatile memory 1106. The network interface 1119 may allow the backend server 1030 to access and communicate with devices connected to the network (Internet/PSTN) 1010 (FIG. 42). The non-volatile memory 1106 may include a server application 1108 that configures the processor 1102 to receive the share signal 1048 and generate a power-up command signal 1114. The server application 1108 may also configure the processor 1102 to identify second camera(s) 1011, 1013, 1021 and/or a first camera of a second A/V recording and communication devices 1012 to power up and capture image data, as further described below. In various embodiments, the share signal 1048 may include first image data 1060, first audio data 1062, and/or text data 1068 received from the first client device 1004, 1006 and/or the first A/V recording and communication device 1002. Further, the non-volatile memory 1106 may include an output signal 1094 that includes the second image data 1090 received from the second camera(s) 1011, 1013, 1021. In addition, the non-volatile memory 1106 may include an output signal 1065 that includes the first image data 1061 received from the second A/V recording and communication device 1012. In some embodiments, the server application 1108 may also configure the processor 1102 to receive a crime report signal 1092 and generate the power-up command signal 1114. The server application 1108 may further configure the processor 1102 to identify the first camera of second A/V recording and communication devices 1012 and/or second camera(s) 1011, 1013, 1021 to power up and capture first data 1060 and/or second image data 1090, respectively, as further described below. In some embodiments, the crime report signal 1092 may configure the processor 1102 to power up additional first cameras of other A/V recording and communication devices such as (but not limited to) the first A/V recording and communication device 1002 and/or the third-party A/V recording and communication device 1020 to power up and capture image data.

In further reference to FIG. 46, the non-volatile memory 1106 may also include location data 1110 that may be used to determine locations of the first A/V recording and communication device 1002, the second A/V recording and communication device 1012, the second camera(s) 1011, 1013, 1021, and/or the third-party A/V recording and communication device 1020. In addition, the location data 1110 may be used to determine locations of the first client devices 1004, 1006, the second client devices 1014, 1016, and/or the third-party devices 1022, 1024. In some embodiments, the share signal 1048 may include the location data 1110 and a command to share the first image data 1060 with a network of users. In other embodiments, the crime report signal 1092 may include the location data 1110 and a command to share the crime report signal 1092 and/or information obtained from the crime report signal 1092 with a network of users.

In the illustrated embodiment of FIGS. 43-46, the various components including (but not limited to) the processing modules 1050, 1051, 1080, 1100, the communication modules 1046, 1047, 1076, and the network interface 1119 are represented by separate boxes. The graphical representations depicted in each of FIGS. 43-46 are, however, merely examples, and are not intended to indicate that any of the various components of the first A/V recording and communication device 1002, the second camera(s) 1011, 1013, 1021, the second A/V recording and communication device 1012, or the backend server 1030 are necessarily physically separate from one another, although in some embodiments they might be. In other embodiments, however, the structure and/or functionality of any or all of the components of first A/V recording and communication device 1002 may be combined. In addition, in some embodiments the communication module 1046 may include its own processor, volatile memory, and/or non-volatile memory. Likewise, the structure and/or functionality of any or all of the components of the second camera(s) 1011, 1013, 1021 may be combined. In addition, in some embodiments the communication module 1076 may include its own processor, volatile memory, and/or non-volatile memory. Further, in some embodiments the structure and/or functionality of any or all of the components of second A/V recording and communication device 1012 may be combined. In addition, in some embodiments the communication module 1047 may include its own processor, volatile memory, and/or non-volatile memory. Further, the structure and/or functionality of any or all of the components of the backend server 1030 may be combined. In addition, in some embodiments the network interface 1119 may include its own processor, volatile memory, and/or non-volatile memory.

Figure 47:
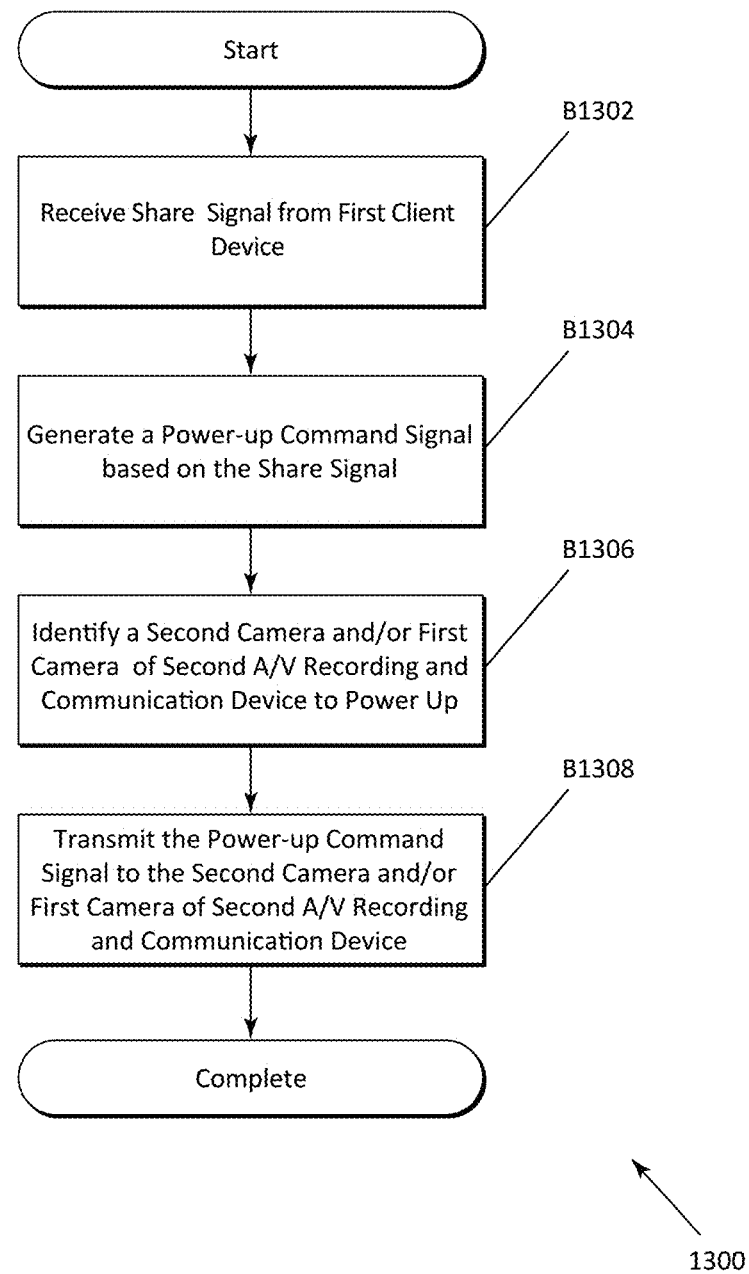
FIG. 47 is a flowchart illustrating an embodiment of a process for powering up one or more cameras according to various aspects of the present disclosure.

FIG. 47 is a flowchart illustrating one embodiment of a process 1300 for powering up second camera(s) 1011, 1013, 1021 and/or a first camera 1041 of a second A/V recording and communication device 1012 according to various aspects of the present disclosure. In some embodiments, the backend server 1030 may receive a share signal 1048 from a first client device 1004, 1006 that is associated with the first A/V recording and communication device 1002, as described above. In other embodiments, the backend server 1030 may receive a crime report signal 1092 from various devices such as (but not limited to) a third-party device 1022, 1024, as described above. As further described below, the backend server 1030 may identify and power up the second camera(s) 1011, 1013, 1021 and/or the first camera 1041 of second A/V recording and communication device 1012 using a power-up command signal 1114. The process 1300 may include the backend server 1030 receiving (block B1302) a share signal 1048 and/or a crime report signal 1092 using the network interface 1119. In some embodiments, the share signal 1048 may include first image data 1060 captured using a first camera 1040 of a first A/V recording and communication device 1002, and/or first audio data 1062 captured by a microphone 1042 of the first A/V recording and communication device 1002. Further, the share signal 1048 may also include text data 1064 that describes the first image data 1060. In other embodiments, the crime report signal 1092 may include image data, audio data, and/or text data captured using a variety of devices such as (but not limited to) the third-party A/V recording and communication device 1020 and/or third-party client devices 1022, 1024. Further, in some embodiments, the share signal 1048 may include the first audio data 1062 and/or the text data 1064 without the first image data 1060. Likewise, the crime report signal may include audio data and/or text data without image data. In addition, the share signal 1048 may also include a command to share the first image data 1060 (and/or the first audio data 1062 and/or the text data 1064) with a network of users. Further, the crime report signal 1092 may also include a command to share the crime report signal with a network of users. In various embodiments, the share signal 1048 and/or the crime report signal 1092 may include location data 1110 that may be used to determine a geographic location, as further described below.

In further reference to FIG. 47, upon receiving the share signal 1048 (block B1302), the process 1300 may also include generating (block B1304) a power-up command signal 1114 based on the share signal 1048 received from the first client device(s) 1004, 1006. In other embodiments, upon receiving the crime report signal 1092, the server 1030 may generate (block B1304) the power-up command signal 1114 based on the crime report signal 1092. The process 1300 may further include identifying (block B1306) the second camera(s) 1011, 1013, 1021 and/or the first camera 1041 of the second A/V recording and communication device 1012 to power up, as further described below. In some embodiments, the backend server 1030 may identify the second camera(s) 1011, 1013, 1021 and or the first camera 1041 of the second A/V recording and communication device 1012 to receive the power-up command signal 1114 based on the location of the first A/V recording and communication device 1002 associated with the first client device 1004, 1006 and the defined areas, as described above (see FIG. 12). In other embodiments, the backend server 1030 may identify the second camera(s) 1011, 1013, 1021 and/or the first camera 1041 of the second A/V recording and communication device 1012 to receive the power-up command signal 1114 using location data 1110, as further described below in FIG. 48. In reference to FIG. 47, the process 1300 may also include transmitting (block B1308) the power-up command signal 1114 using the network interface 1119 to the second camera(s) 1011, 1013, 1021 and/or the first camera 1041 of the second A/V recording and communication device 1012. In various embodiments, the power-up command signal 1114 may configure second camera(s) 1011, 1013, 1021 to power up from a low-power state and capture second image data 1090, as further described below. In some embodiments, the second camera(s) 1011, 1013, 1021 may capture second image data 1090 for a predetermined length of time. In further embodiments, the second camera(s) 1011, 1013, 1021 may power down after capturing the second image data 1090 for the predetermined length of time. As described above, the second image data 1090 may be captured at a second resolution and the first image data 1060 may be captured at a first resolution, where the first resolution is higher than the second resolution. In some embodiments, the power-up command signal 1114 may configure the first camera 1041 of the second A/V recording and communication device 1012 to power up from a low-power state and capture first image data 1061, as further described below. In some embodiments, the first camera 1041 may capture first image data 1061 for a predetermined length of time. In further embodiments, the first camera 1041 may power down after capturing the first image data 1061 for the predetermined length of time. In some embodiments, the first image data 1061 may be captured at a first resolution that is equal to the first resolution of the first image data 1061. In other embodiments, the first image data 1061 may be captured at a second resolution that is equal to the second resolution of the second image data 1090. However, in other embodiments, the first image data 1061 may be captured at a resolution that is different from the first resolution of the first image data 1060 and the second resolution of the second image data 1090.

Figure 48:
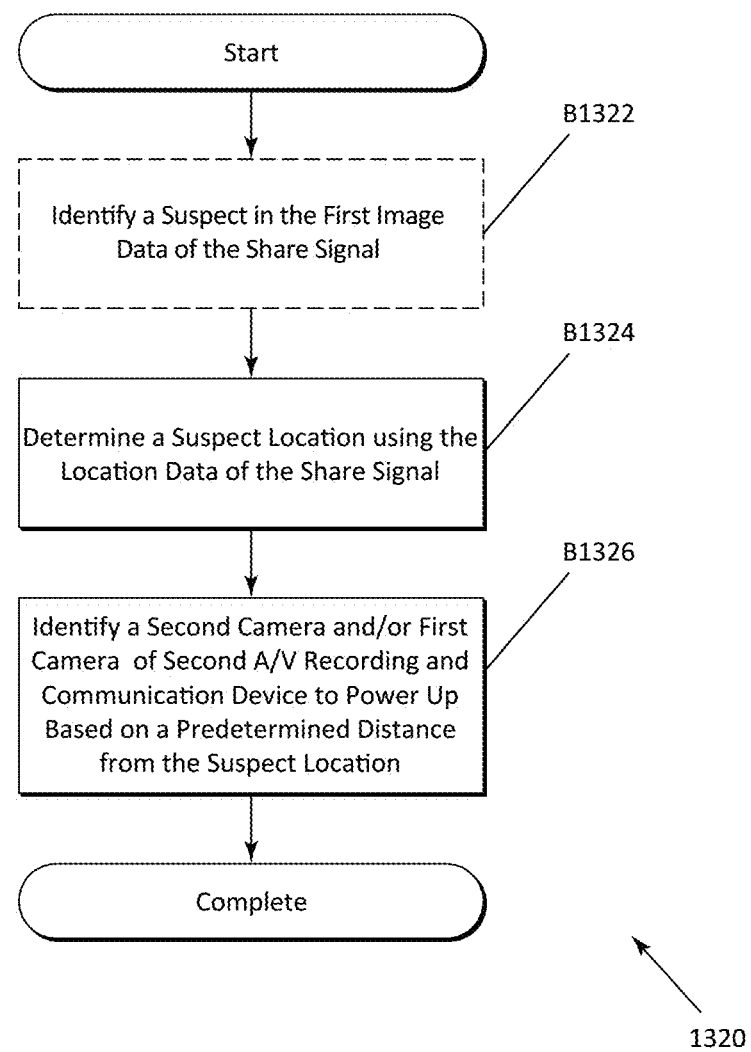
FIG. 48 is a flowchart illustrating an embodiment of a process for identifying one or more cameras to power up according to various aspects of the present disclosure.

FIG. 48 is a flowchart illustrating one embodiment of a process 1320 for identifying (block B1306) the second camera(s) 1011, 1013, 1021 and/or the first camera 1041 of the second A/V recording and communication device 1012 according to various aspects of the present disclosure. In some embodiments, the process 1320 may include identifying (block B1322) a suspect in the first image data 1060 of the share signal 1048 and/or identifying any person, object, and/or criminal act depicted in the first image data 1060. The process 1320 may also include determining (block B1324) a suspect location using the location data 1110 of the share signal 1048. In alternative embodiments, the process 1320 may include identifying (block B1322) any person, object, and/or criminal act depicted in the image, audio, and/or text data of the crime report signal 1092. Further, in alternative embodiments, the process 1320 may include determining (block B1324) a crime location using the location data 1110 of the crime report signal 1092.

In reference to FIG. 48, the location data 1110 may provide a geographic location of the first A/V recording and communication device 1002 and/or the first client devices 1004, 1006 associated with the share signal 1048. In other embodiments, the location data 1110 may provide a geographic location of any device including (but not limited to) the third-party A/V recording device 1020 and/or the third-party devices 1022, 1024 associated with the crime report signal 1092. In some embodiments, the location data 1110 may be a geographic location that a person may have indicated when transmitting the share signal 1048 and/or the crime report signal 1092. For example, a user may input a geographic location using an input device such as (but not limited to) text and/or voice inputs on a cellphone. In other embodiments, the location data 1110 may include various metadata associated with the shared signal 1048 and/or the crime report signal 1092 that allows the backend server 1030 to determine a geographic location associated with the share signal 1048 and/or the crime report signal 1092, respectively. In some embodiments, the backend server 1030 may analyze the image data of the shared signal 1048 (block B1322) and/or the crime report signal 1092 to determine the suspect location and/or crime location. For example, the backend server 1030 may perform a computer vision (or similar) process to detect street signs, addresses, landmarks, and/or any other identifying data to determine (block B1324) the suspect location and/or the crime location associated with the share signal 1048 and/or the crime report signal 1092, respectively.

In further reference to FIG. 48, the process 1320 may further include identifying (block B1326) the second camera(s) 1011, 1013, 1021 and/or first camera 1041 of the second A/V recording and communication device 1012 to power up based on a predetermined distance from the suspect and/or crime location determined (block B1324) based on the share signal 1048 and/or the crime report signal 1092, respectively. For example, once a suspect and/or crime location has been determined (block B1324), second camera(s) 1011, 1013, 1021 that are located within a predetermined radius of the suspect and/or crime location may be identified (block B1326) to receive the power-up command signal 1114 from the backend server 1030. In some embodiments, once a suspect and/or crime location has been determined (block B1324), A/V recording and communication devices such as (but not limited to) the second A/V recording and communication camera 1012 that are located with a predetermined radius of the suspect and/or crime location may be identified (block B1326) to receive the power-up command signal 1114 from the backend server 1030. As described further below, the second camera(s) 1011, 1013, 1021 and/or the first camera 1041 of the second A/V recording and communication device 1012 may be configured by the power-up command signal 1114 to power up and capture second image data 1090 and/or first image data 1061, respectively.

Figure 49:
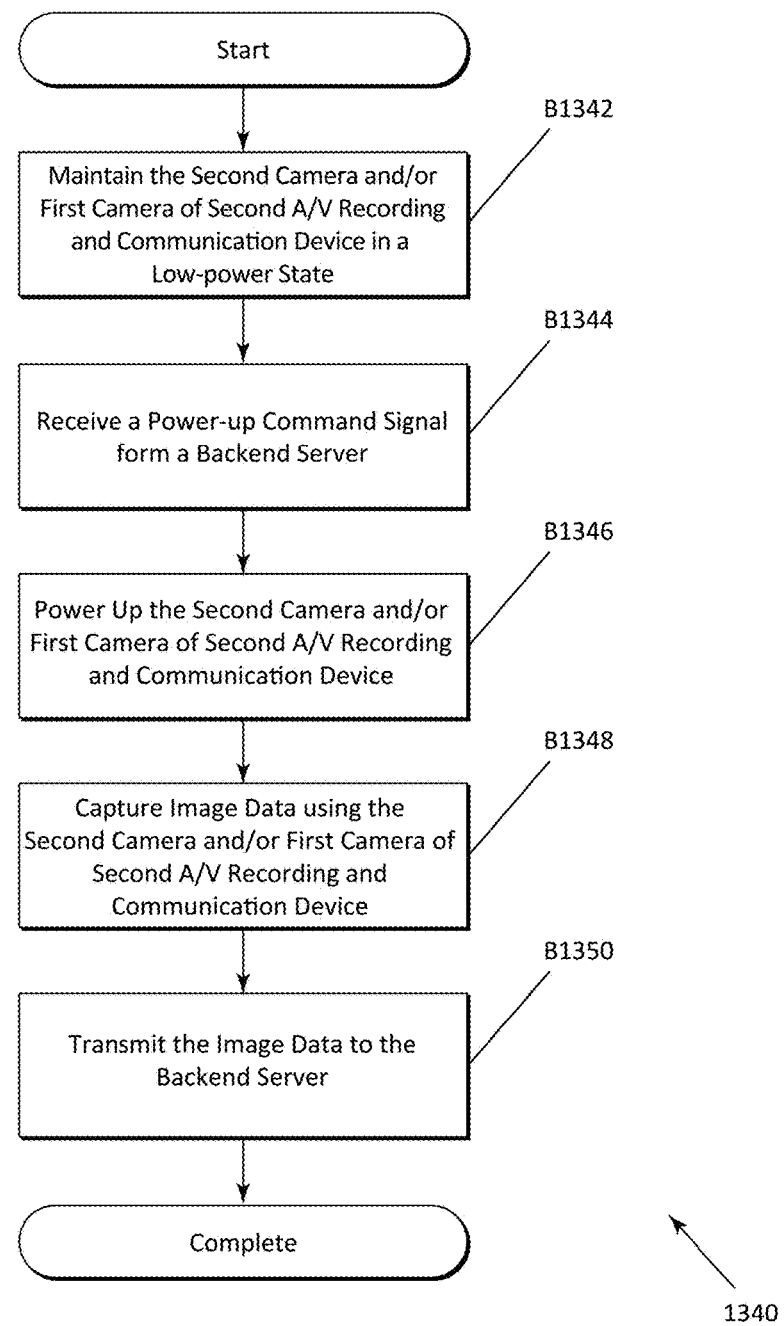
FIG. 49 is a flowchart illustrating an embodiment of a process for powering up one or more cameras using a power-up command signal according to various aspects of the present disclosure.

FIG. 49 is a flowchart illustrating an embodiment of a process 1340 for powering up the second camera(s) 1011, 1013, 1021 and/or the first camera 1041 of the second A/V recording and communication device 1012 according to various aspects of the present disclosure. The process 1340 may include maintaining (block B1342) the second camera(s) 1011, 1013, 1021 and/or the first camera 1041 of the second A/V recording and communication device 1012 in a low-power state. The process 1340 may also include receiving (block B1344) a power-up command signal 1114 from the backend server 1030 at the second camera(s) 1011, 1013, 1021 using the communication module 1076 and/or at the second A/V recording and communication device 1012 using the communication module 1047. In some embodiments, the process 1340 may include powering up (block B1346) the second camera(s) 1011, 1013, 1021 from the low-power state to capture (block B1348) second image data 1090. In other embodiments, the process 1340 may include powering up (block B1346) the first camera 1041 of the second A/V recording and communication device 1012 from the low-power state to capture (block B1348) first image data 1061. In various embodiments, the power-up command signal 1114 may include instructions that configure the processor 1082 to power up (block B1346) the second camera(s) 1011, 1013, 1021 from the low-power state to capture (block B1348) the second image data 1090. Likewise, the power-up command signal 1114 may include instructions that configure the processor 1053 to power up (block B1346) the first camera 1041 from the low-power state to capture (block B1348) the first image data 1061. After capturing the second image data 1090, the process 1340 may also include the second camera(s) 1011, 1013, 1021 transmitting (block B1350) the second image data 1090 to the backend server 1030 using the communication module 1076. In some embodiments, the second camera(s) 1011, 1013, 1021 may generate an output signal 1094 that includes the second image data 1090 and transmit (block B1350) the output signal 1094 to the backend server 1030 using the communication module 1076. In other embodiments, after capturing the first image data 1061, the process 1340 may also include the second A/V recording and communication device 1012 transmitting (block B1350) the first image data 1061 to the backend server 1030 using the communication module 1047. In some embodiments, the second A/V recording and communication device 1012 may generate an output signal 1065 that includes the first image data 1061 and transmit (block B1350) the output signal 1065 to the backend server 1030 using the communication module 1047.

Figure 50:
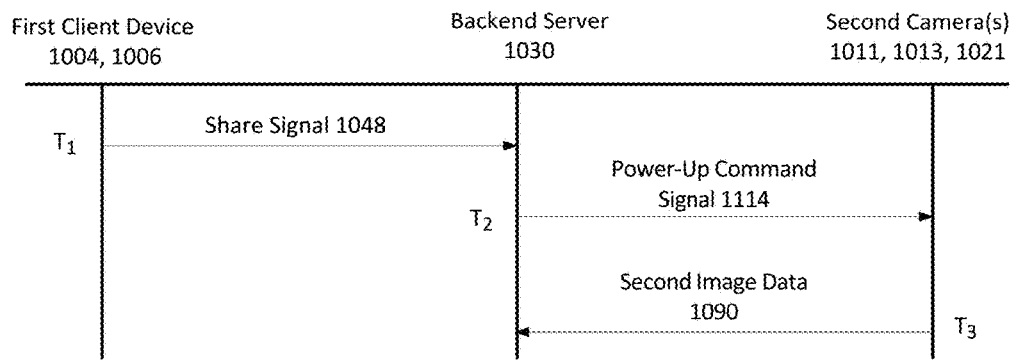
FIGS. 50-51 are sequence diagrams illustrating embodiments of processes for powering up one or more cameras using a share signal according to various aspects of the present disclosure.

FIG. 50 is a sequence diagram illustrating an embodiment of a process for powering up second camera(s) 1011, 1013, 1021 based on a share signal 1048 according to various aspects of the present disclosure. The process may include first client device(s) 1004, 1006, a backend device such as the backend server 1030, and one or more second cameras 1011, 1013, 1021. At a time T1, the first client device(s) 1004, 1006 may transmit a share signal 1048 to the backend server 1030, as described above. In response to receiving the share signal 1048, the backend server 1030 may generate a power-up command signal 1114 and identify the second camera(s) 1011, 1013, 1021 to receive the power-up command signal 1114 using location data 1110 of the share signal 1048, as described above. In various embodiments, the backend server 1030 may transmit the power-up command signal 1114 to the second cameras 1011, 1013, 1021 at a time T2. Upon receiving the power-up command signal, the second camera(s) 1011, 1013, 1021 may power up from a low-power state and capture second image data 1090, as described above. At a time T3, the second camera(s) 1011, 1013, 1021 may transmit the second image data 1090 to the backend server 1030 using the communication module 1076.

Figure 51:
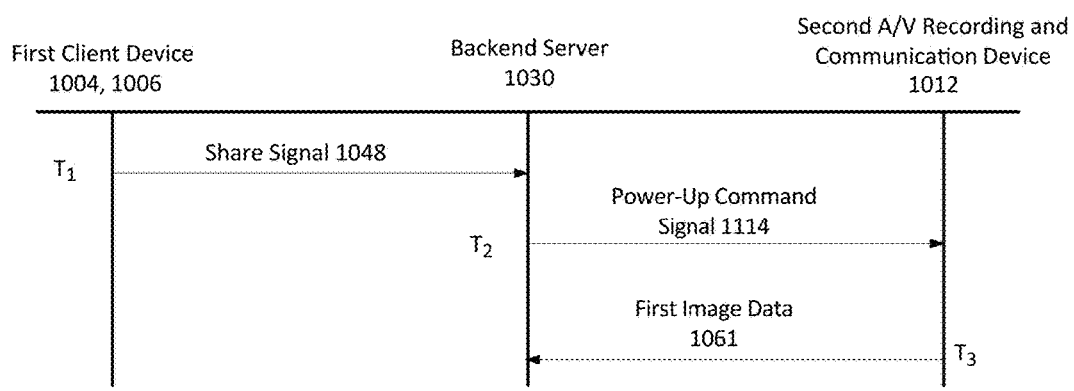

FIG. 51 is a sequence diagram illustrating an embodiment of a process for powering up first cameras of A/V recording and communication devices such as (but not limited to) the first camera 1041 of the second A/V recording and communication device 1012 based on a share signal 1048 according to various aspects of the present disclosure. The process may include first client device(s) 1004, 1006, a backend device such as the backend server 1030, and the second A/V recording and communication device 1012. At a time T1, the first client device(s) 1004, 1006 may transmit a share signal 1048 to the backend server 1030, as described above. In response to receiving the share signal 1048, the backend server 1030 may generate a power-up command signal 1114 and identify the second A/V recording and communication device 1012 to receive the power-up command signal 1114 using location data 1110 of the share signal 1048, as described above. In various embodiments, the backend server 1030 may transmit the power-up command signal 1114 to the second A/V recording and communication device 1012 at a time T2. Upon receiving the power-up command signal, the second A/V recording and communication device 1012 may power up the first camera 1041 from a low-power state and capture first image data 1061, as described above. At a time T3, the second A/V recording and communication device 1012 may transmit the first image data 1061 to the backend server 1030 using the communication module 1047.

Figure 52:
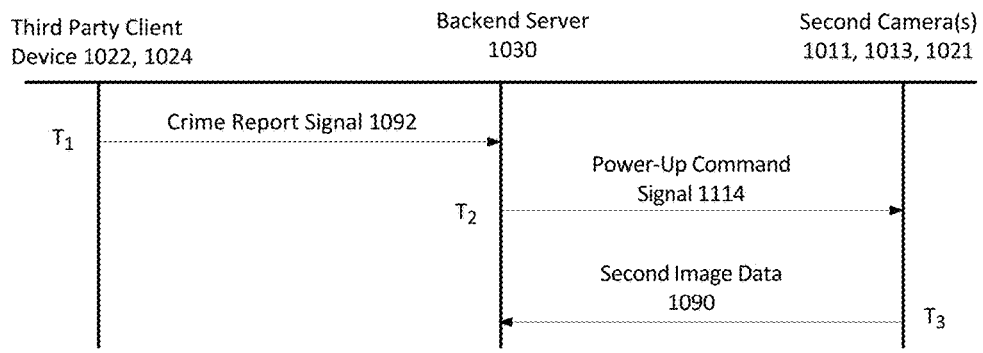
FIGS. 52-53 are sequence diagrams illustrating embodiments of processes for powering up one or more cameras using a crime report signal according to various aspects of the present disclosure.

FIG. 52 is a sequence diagram illustrating an embodiment of a process for powering up second camera(s) 1011, 1013, 1021 based on a crime report signal 1092 according to various aspects of the present disclosure. The process may include third-party client device(s) 1022, 1024, a backend device such as the backend server 1030, and one or more second cameras 1011, 1013, 1021. At a time T1, the third-party client device(s) 1022, 1024 may transmit a share signal 1048 to the backend server 1030, as described above. In response to receiving the share signal 1048, the backend server 1030 may generate a power-up command signal 1114 and identify the second camera(s) 1011, 1013, 1021 to receive the power-up command signal 1114 using location data 1110 of the crime report signal 1092, as described above. In various embodiments, the backend server 1030 may transmit the power-up command signal 1114 to the second cameras 1011, 1013, 1021 at a time T2. Upon receiving the power-up command signal, the second camera(s) 1011, 1013, 1021 may power up from a low-power state and capture second image data 1090, as described above. At a time T3, the second camera(s) 1011, 1013, 1021 may transmit the second image data 1090 to the backend server 1030 using the communication module 1076.

Figure 53:
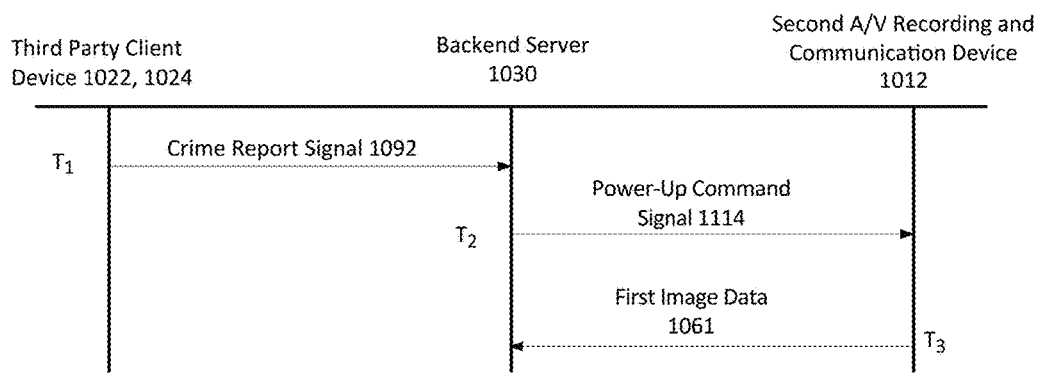

FIG. 53 is a sequence diagram illustrating an embodiment of a process for powering up first cameras 1040, 1041 of various A/V recording and communication devices 1001, 1012 such as (but not limited to) the first camera 1041 of the second A/V recording and communication device 1012 based on a crime report signal 1092 according to various aspects of the present disclosure. The process may include third-party device(s) 1022, 1024, a backend device such as the backend server 1030, and the second A/V recording and communication device 1012. At a time T1, the third-party client device(s) 1022, 1024 may transmit a crime report signal 1092 to the backend server 1030, as described above. In response to receiving the crime report signal 1092, the backend server 1030 may generate a power-up command signal 1114 and identify the second A/V recording and communication device 1012 to receive the power-up command signal 1114 using location data 1110 of the crime report signal 1092, as described above. In various embodiments, the backend server 1030 may transmit the power-up command signal 1114 to the second A/V recording and communication device 1012 at a time T2. Upon receiving the power-up command signal, the second A/V recording and communication device 1012 may power up the first camera 1041 from a low-power state and capture first image data 1061, as described above. At a time T3, the second A/V recording and communication device 1012 may transmit the first image data 1061 to the backend server 1030 using the communication module 1047.

Figure 54:
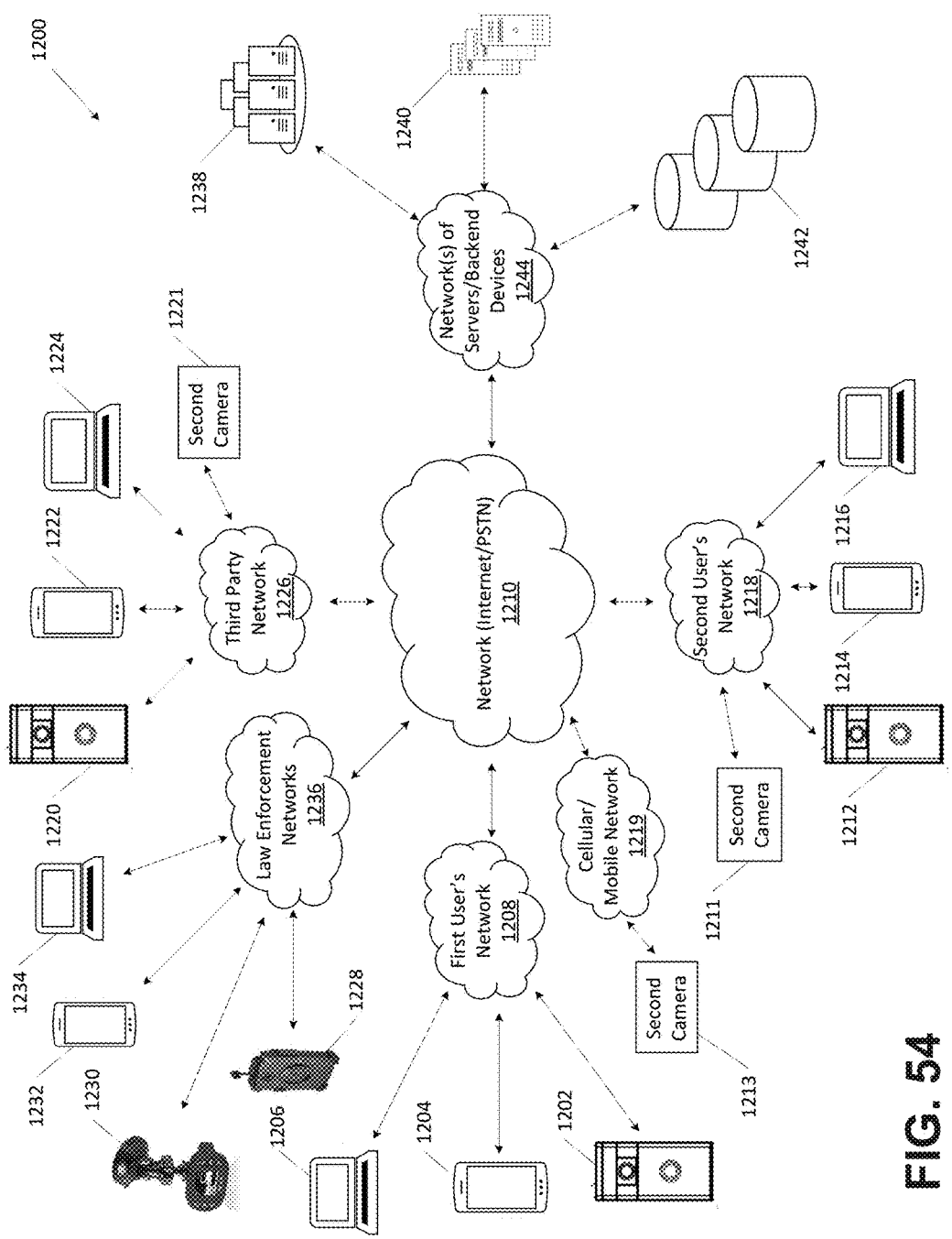
FIG. 54 is a functional block diagram illustrating a system for communicating in a network using various devices according to various aspects of the present disclosure.

FIG. 54 is a functional block diagram illustrating a system for communicating in a network using various signals. In some embodiments, share signals and/or crime report signals may be used to power up various cameras in network communication with backend devices according to various aspects of the present disclosure, as described below. In some embodiments, first client device(s) 1202, 1204 may transmit a share signal 1048 to backend devices for powering up second camera(s) 1211, 1213, 1221, and/or a first camera of a second A/V recording and communication device 1212, as described above. In other embodiments, any device such as (but not limited to) law enforcement device(s) 1232, 1234 and/or third-party client device(s) 1222, 1224 may transmit a crime report signal 1092 to the backend devices for powering up the second camera(s) 1211, 1213, 1221, and/or the first camera of the second A/V recording and communication device 1212, as described above. Further, in some embodiments, any device, may transmit various signals that may include various data including (but not limited to) image data, audio data, and/or text data to the backend devices that may power up one or more cameras within a network of users.

In reference to FIG. 54, the system 1200 may include one or more first audio/video (A/V) recording and communication devices 1202 configured to access a user's network 1208 to connect to a network (Internet/PSTN) 1210. The system 1200 may also include one or more first client devices 1204, 1206, which in various embodiments may be configured to be in network communication with the first A/V recording and communication device 1202. The first client devices 1204, 1206 may comprise, for example, a mobile phone such as a smartphone, or a computing device such as a tablet computer, a laptop computer, a desktop computer, etc. The first client devices 1204, 1206 may include any or all of the components and/or functionality of the client device 114 and/or the client device 850 described herein. In some embodiments, the first client devices 1204, 1206 may not be associated with a first A/V recording and communication device, as described below.

In various embodiments, the system 1200 may also include one or more second A/V recording and communication devices 1212 connected to the network (Internet/PSTN) 1210 using various networks such as a cellular/mobile network 1218, a local network, a wireless network such as a Wi-Fi network, a public network, a low-bandwidth network, and/or any other appropriate network to access the network (Internet/PSTN) 1210. The system 1200 may further include one or more second client devices 1214, 1216, which in various embodiments may be configured to be in network communication with the second A/V recording and communication device 1212. The second client devices 1214, 1216 may comprise, for example, a mobile phone such as a smartphone, or a computing device such as a tablet computer, a laptop computer, a desktop computer, etc. The second client devices 1214, 1216 may include any or all of the components and/or functionality of the client device 114 and/or the client device 850 described herein. In some embodiments, the second client devices 1214, 1216 may not be associated with a second A/V recording and communication device, as described below. The system 1200 may also include one or more second cameras 1211 connected to the network (Internet/PTSN) 1210 using the second user's network 1218. The one or more second cameras 1211 may also be configured to be in network communication with the second client devices 1214, 1216 and/or the second A/V recording and communication device 1212. In some embodiments, the one or more second cameras 1211 and a first camera of the second A/V recording and communication device 1212 may be configured to power up and capture image data based on a shared signal, as further described above. In other embodiments, the second camera 1211 and/or the first camera of the second A/V recording and communication device 1212 may be configured to power up and capture image data based on a crime report signal from any device in network communication with a backend server 1240 such as (but not limited to) third-party client devices 1222, 1224, and/or various other devices, as further described above.

In some embodiments, the system 1200 may also include one or more third-party A/V recording and communication devices 1220 connected to the network (Internet/PSTN) 1210 using various third-party networks 1226 such as a local network, a wireless network such as a cellular/mobile network and/or a Wi-Fi network, a wired network such as an Ethernet network, a public network, a low-bandwidth network, and/or any other appropriate network to access the network (Internet/PSTN) 1210. The system 1200 may further include one or more third-party client devices 1222, 1226, which in various embodiments may be configured to be in network communication with the third-party A/V recording and communication device 1220. The third-party client devices 1222, 1226 may comprise, for example, a mobile phone such as a smartphone, or a computing device such as a tablet computer, a laptop computer, a desktop computer, etc. The third-party client devices 1222, 1226 may include any or all of the components and/or functionality of the client device 114 and/or the client device 850 described herein. In some embodiments, the third-party client devices 1222, 1226 may not be associated with a third-party A/V recording and communication device, as described below. The system 1200 may also include one or more second cameras 1221 connected to the network (Internet/PSTN) 1210 using the various third-party networks 1226. The one or more second cameras 1221 may also be configured to be in network communication with the third client devices 1222, 1224 and/or the third A/V recording and communication device 1220. In many embodiments, the one or more second cameras 1221 and/or a first camera of the third-party A/V recording and communication 1220 may be configured to power up and capture image data based on the share signal from the first client device(s) 1204, 1206, as further described above In other embodiments, the one or more second cameras 1221 and the first camera of the third-party A/V recording and communication device 1220 may be configured to power up and capture image data based on the crime report signal from any device in network communication with a backend server 1240 such as (but not limited to) law enforcement client devices 1232, 1234, and/or various user devices, as further described below.

In some embodiments, the system 1200 may also include one or more second cameras 1213 connected to the network (Internet/PSTN) 1210 using various access points such as (but not limited to) a cellular/mobile network 1219, a local network, a wireless network such as a Wi-Fi network, a public network, a low-bandwidth network, and/or any other appropriate network to access the network (Internet/PSTN) 1210. In some embodiments, the one or more second cameras 1213 may be configured to be part of a local network and associated with one or more client devices and/or one or more A/V recording and communication devices. In many embodiments, the one or more second cameras 1213, associated devices, and A/V recording and communication devices may be controlled by an administrator.

With further reference to FIG. 54, the system 1200 may also include law enforcement A/V recording and communication devices 1228, 1230 connected to the network (Internet/PSTN) 1210 using a law enforcement network 1236 such as a local network, a wireless network such as a cellular/mobile network and/or a Wi-Fi network, a wired network such as an Ethernet network, a public network, a low-bandwidth network, and/or any other appropriate network to access the network (Internet/PSTN) 1210. In addition, the law enforcement A/V recording and communication devices 1228, 1230 may be configured to capture image data, audio data, and/or text data and be associated with law enforcement client devices 1232, 1234. In the illustrated embodiment, the law enforcement A/V recording and communication devices include a body camera 1228 and a dashboard camera 1230, but the illustrated devices are only examples and are not limiting.

In further reference to FIG. 54, the system 1200 may also include various backend devices such as (but not limited to) storage devices 1242, backend servers 1240, and backend APIs 1238 in network communication with the law enforcement A/V recording and communication devices 1228, 1230, the first and second A/V recording and communication devices 1202, 1212, the third-party A/V recording and communication devices 1220, and the one or more second cameras 1211, 1213, 1221. Further, the various backend devices 1238, 1240, 1242 may be in network communication with the law enforcement client devices 1232, 1234, the first client devices 1204, 1206, the second client devices 1214, 1216, and the third-party client devices 1222, 1224. In some embodiments, the storage devices 1242 may be a separate device from the backend servers 1240 (as illustrated) or may be an integral component of the backend servers 1240. In addition, the user's network 1208 and the network 1210 may be similar in structure and/or function to the user's network 1008 and the network 1010 (FIG. 47), respectively. As described above, the backend devices such as the backend servers 1240 may be configured to receive a share signal from the first client devices 1204, 1206 to power up the second camera(s) 1211, 1213, 1221 and/or a first camera of the second A/V recording and communication device 1212. Further, the backend devices such as the backend servers 1240 may be configured to receive a crime report signal from the any device including (but not limited to) the third-party client devices 1222, 1224 and/or the law enforcement client devices 1232, 1234 to power up the second camera(s) 1211, 1213, 1221 and/or a first camera of the second A/V recording and communication device 1212, as described above. Further, the backend devices such as the backend servers 1240 may also be configured to receive various signals from any A/V recording and communication device, such as the third-party A/V recording and communication device 1220 and/or the law enforcement A/V recording and communication devices 1228, 1230, for power up cameras using the processes described above. In addition, the backend devices such as the backend server 1240 may receive the various signals from third-party client devices 1222, 1224, and law enforcement client devices 1232, 1234 for power up cameras using the processes described above. In some embodiments, the backend devices such as the backend server 1240 may receive the various signals from third-party social networks that may include any social media service or platform that uses computer-mediated tools that allow participants to create, share, and/or exchange information in virtual communities and/or networks, such as (but not limited to) social networking websites and/or applications running on participant devices. Non-limiting examples of social networks include NEXT-DOOR®, FACEBOOK®, INSTAGRAM®, SNAPCHAT®, TWITTER®, etc. In some embodiments, the backend devices such as the backend server 1240 may receive the various signals from third parties, such as the general public, where a member of the public may transmit a signal that includes information about an event that the member of the public witnessed, such as (but not limited to) a possible crime using their third-party device 1222, such as, but not limited to, a smartphone, where the signal transmitted by the member of the public may include image data, audio data, and/or text data.

As described above, one aspect of the present embodiments includes the realization that a person and/or an object of interest is typically not stationary. For example, when an A/V recording and communication device records video footage of suspicious and/or criminal activity, the suspect in the video footage is likely to be moving. The sharing of such video footage may alert neighbors to the potential dangers, particularly because the suspect may still be in the vicinity (e.g., the neighborhood). It would be advantageous then to enhance the functionality of A/V recording and communication devices by using shared video footage to identify one or more cameras to power up and record additional video footage. For example, a neighborhood may include multiple camera devices such as (but not limited to) first cameras and second cameras of various A/V recording and communication devices, and one or more of the second cameras may be configured to power up and capture additional image data (and, in some embodiments, audio data) based on shared video footage from a first camera. Further, the functionality of A/V recording and communication devices may be enhanced by using any report of a crime from any source to power up one or more cameras to capture image and/or audio data. Still further, the functionality of the A/V recording and communication devices can be enhanced so that, upon receipt of a "neighborhood alert" signal, the cameras of all such devices within a neighborhood (or another determined area) are powered up to capture additional image data (and in some embodiments, audio data) that may be useful for tracking a suspect's movements, recording the actions or presence of accomplices, and/or recording other images that might warn residents or help to solve a crime being perpetrated. Moreover, the present embodiments improve upon and solve the problem of resource management by using a power-up command signal to configure the one or more cameras to switch from a low-power state to a powered-on state, thereby conserving power. The present embodiments provide these advantages, as described below.

Figure 55:
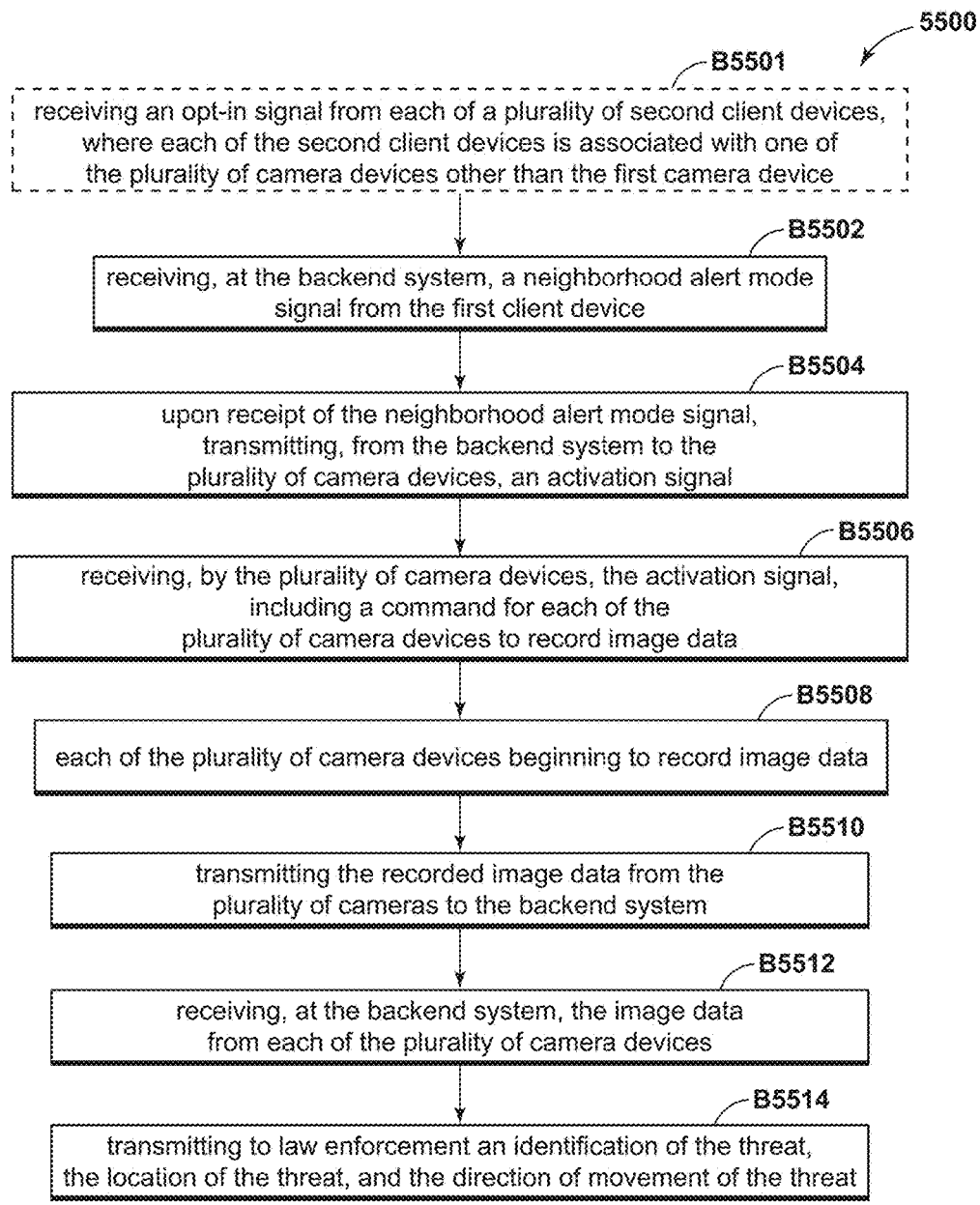
FIG. 55 is a flowchart illustrating a method for a neighborhood security system in which all cameras within a neighborhood are activated upon receipt of a neighborhood alert mode signal, in accordance with certain aspects of the present embodiments.

FIG. 55 illustrates a method 5500 for a neighborhood security system in which all cameras within a neighborhood are activated upon receipt of a neighborhood alert mode signal, in accordance with certain aspects of the present embodiments. Such a signal might be sent, for example, when a threat to the neighborhood has been identified, such as when an escaped prisoner is at large in the area or when a criminal suspect is fleeing. In other examples, such a signal might be sent during a wide-scale emergency impacting an entire neighborhood, such as a riot, a wildfire, an earthquake, a flood, etc. In one embodiment, the neighborhood security system includes a plurality of camera devices located within a neighborhood such as those illustrated in FIG. 12, and a backend processing system in network communication with the plurality of camera devices. In turn, the backend processing system is in network communication with at least a first client device, and the first client device is associated with a first one of the plurality of camera devices.

At block B5502, the method 5500 includes receiving, at the backend system, a neighborhood alert mode signal from the first client device. At block B5504, upon receipt of the neighborhood alert mode, the method 5500 includes, transmitting, from the backend system to the plurality of camera devices, an activation signal. At block B5506, the activation signal is received by the plurality of camera devices, and the activation signal includes a command for each of the plurality of camera devices to record image data. At block B5508, each of the plurality of camera devices begins recording image data. In certain embodiments, this recording occurs for a predetermined amount of time. At block B5510, the method 5500 further includes transmitting the recorded image data from the plurality of cameras to the backend system. At block B5512, the method 5500 further includes receiving, at the backend system, the image data from each of the plurality of camera devices. In this way, if a first user sees or is alerted to behavior that is suspicious or an outright emergency, the user may not only send an alert to all of the other users in the neighborhood, the first user may actually cause all of the other A/V recording and communication devices in the neighborhood to activate their cameras and begin recording image and/or audio data for the benefit of all of the users in the neighborhood, or perhaps, for later analysis by law enforcement.

In some embodiments of the method 5500, the neighborhood comprises a circular area defined by a predetermined radius extending outwardly from the first camera device. Alternatively, the neighborhood may be defined by various other methods, such as by a particular city block, a similar street address, an entire suburban subdivision, an apartment complex, a neighborhood watch patrol area, a defined law-enforcement patrol area, a high school campus, a college campus, a zip code, some other pre-selected area or map coordinates, or a user-defined area created by the user's selection of an area on a map using a pointing device or touchscreen.

In some embodiments, at least some of the plurality of camera devices are owned by individual users. However, in other embodiments, at least some of the plurality of camera devices are owned by a group of users, such as a neighborhood watch association. Cameras may be located on either public or private property.

In certain embodiments of the process, as shown in FIG. 55, the method 5500 further includes, at block B5501, prior to receiving the neighborhood alert mode signal from the first client device, receiving an opt-in signal from each of a plurality of second client devices, where each of the second client devices is associated with one of the plurality of camera devices other than the first camera device. In such embodiments, the cameras that are subject to being turned on during a neighborhood alert are only those cameras that have been specifically opted-in to the neighborhood security system.

In certain other embodiments, the backend system may be used to analyze the image data and then to report on and attempt to ameliorate any threats posed to the neighborhood. This analysis may include using computer vision analysis to identify and assess threats in the image data. Such methods may include, or be similar to, the various methods of threat analysis using computer vision described and claimed in U.S. Provisional Patent Applications 62/464,342, filed on Feb. 27, 2017; 62/517,416, filed on Jun. 9, 2017; and 62/563,915, filed on Sep. 27, 2017, which are all incorporated by reference herein in their entireties as if set forth. Such backend computer vision analysis may include determining whether any identified threats are moving within the neighborhood, determining a location of the threat, and/or determining a direction of movement for the threat. The method may further include, at block B5514, transmitting to law enforcement an identification of the threat, the location of the threat, and/or the direction of movement of the threat.

As described above, another aspect of the present embodiments includes the realization that, when users install multiple A/V recording and communication devices at a single property, and such devices each record image data of a source of motion moving around the property, e.g., moving from the field of view of a first camera and into the field of view of a second camera, the user may desire to view such image data as a linked or unified whole, rather than as separate images or separate image files or video clips. The present embodiments provide for "camera event stitching" to create either a continuous video, or a series of "storyboard" images, for activity taking place across the fields of view of multiple cameras, within a predetermined time period. This aspect of the present embodiments provides the advantages of user convenience in viewing recorded image data, as well as coherence in understanding the timing and sequence of the recorded images.

Figure 56:
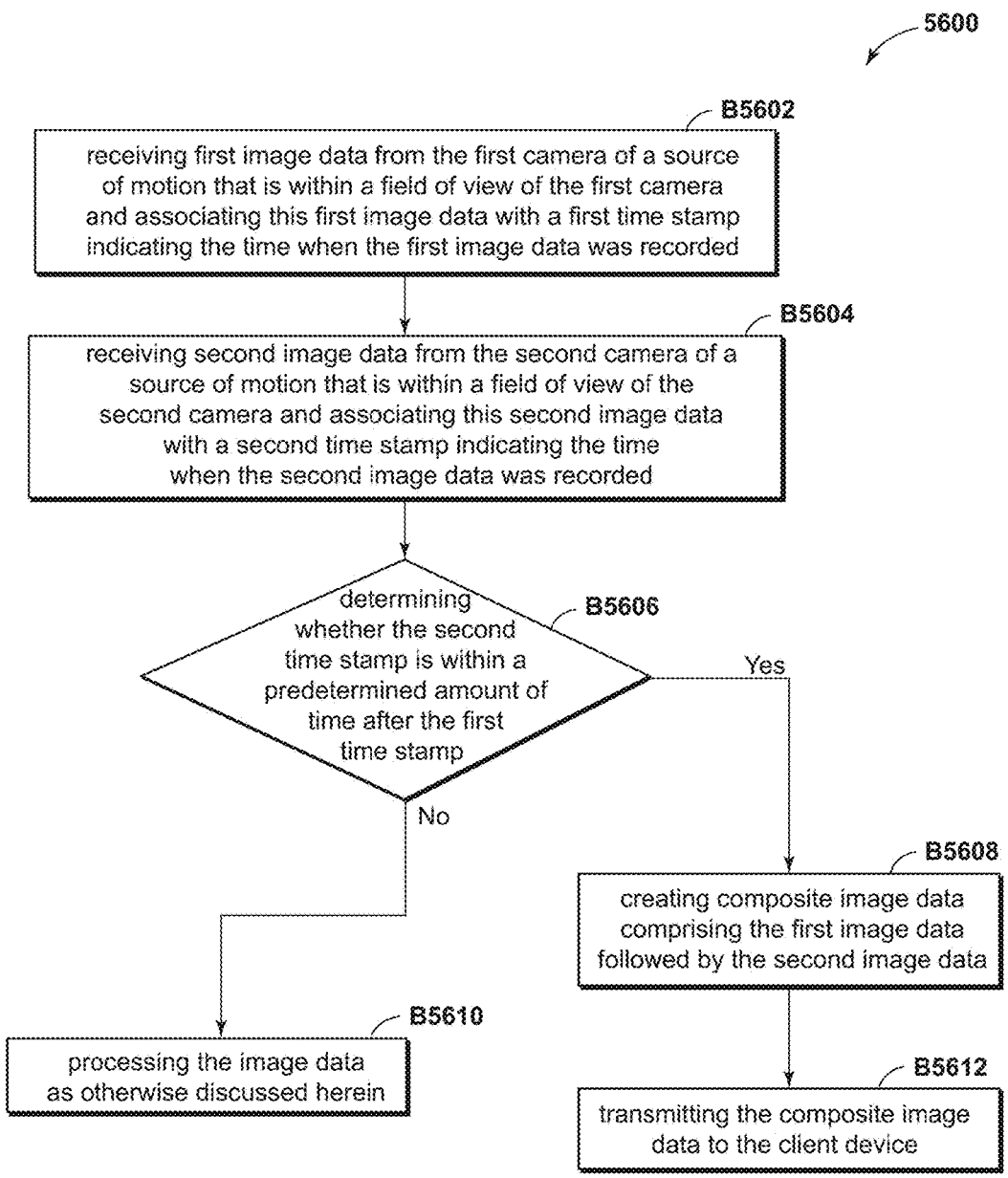
FIG. 56 is a flowchart illustrating a method for a multi-camera video security system installed at a property, by which recorded image data from multiple cameras is linked or stitched together to provide the user with a chronological and continuous video of activity that occurred across multiple cameras, or a chronological series of images representative of activity that occurred across multiple cameras in a "storyboard" format, in accordance with certain aspects of the present embodiments.

FIG. 56 illustrates a method 5600 for a multi-camera video security system installed at a property, by which recorded image data from multiple cameras is linked or stitched together to provide the user with a chronological and continuous video of activity that occurred across multiple cameras, or a chronological series of images representative of activity that occurred across multiple cameras in a "storyboard" format. For ease of reference, all embodiments of this concept are hereinafter referred to as "camera event stitching." The method 5600 is described below with reference to FIG. 57, which illustrates an overhead view of a property, as shown on a screen of a user's client device, running a software app.

Figure 57:
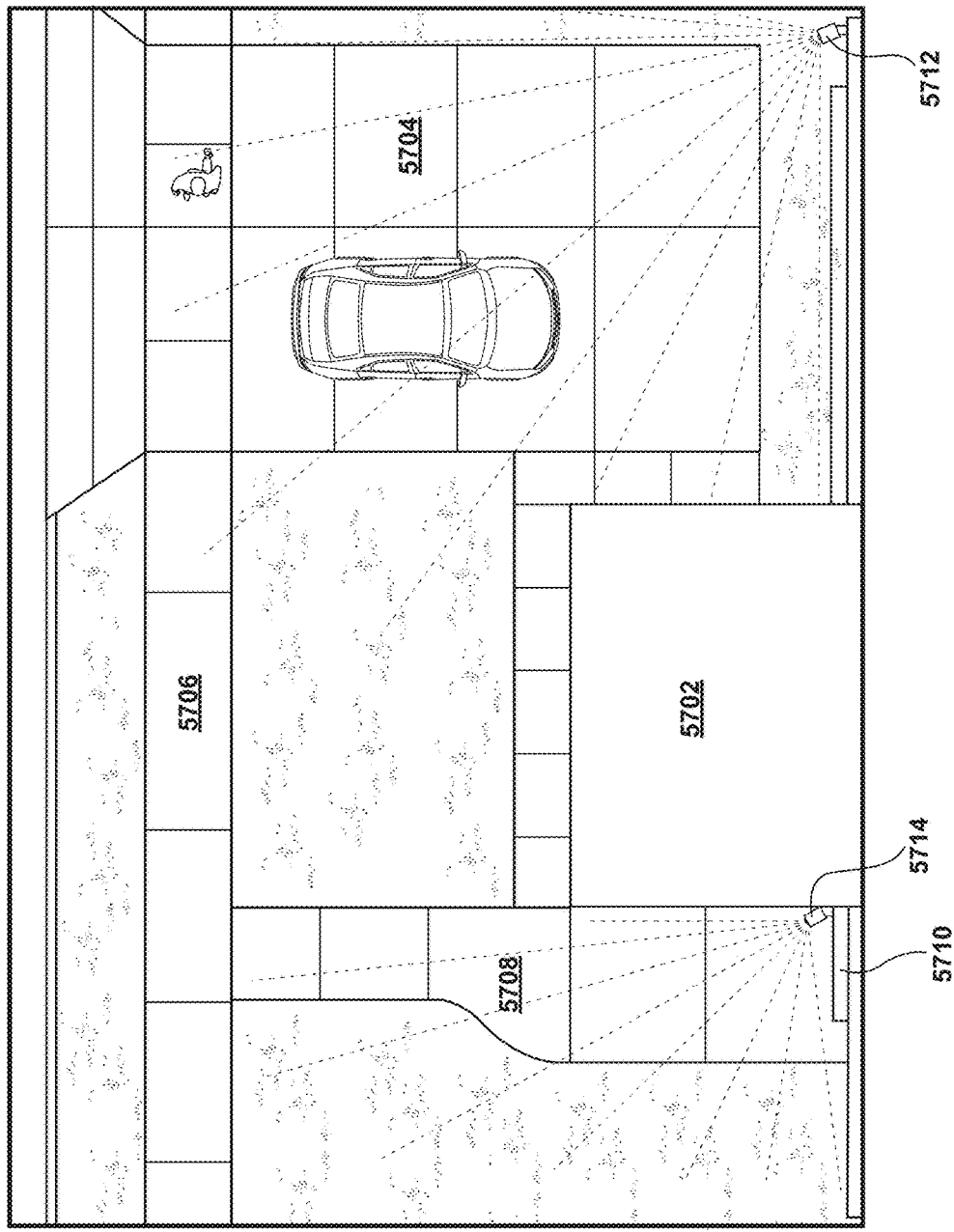
FIG. 57 illustrates an overhead view of a property, as shown on a screen of a user's client device, running a software app, in accordance with certain aspects of the present embodiments.

As shown in FIG. 57, the property 5702 is a residence, and includes a driveway 5704, a front sidewalk 5706, and a walkway 5708 approaching a front door 5710. In an example embodiment, the video security system includes a first camera 5712 installed at a first location at the property and a second camera 5714 installed at a second location at the property, as shown in FIG. 57. The multi-camera video security system is associated with a client device, which is capable of receiving image data from the cameras 5712, 5714. At block B5602, the method 5600 includes receiving first image data from the first camera 5712 of a source of motion that is within a field of view of the first camera 5712, and associating this first image data with a first time stamp indicating the time when the first image data was recorded. At block B5604, the method 5600 includes receiving second image data from the second camera 5714 of a source of motion that is within a field of view of the second camera 5714, and associating this second image data with a second time stamp indicating the time when the second image data was recorded. At block B5606, the method 5600 includes determining whether the second time stamp is within a predetermined amount of time after the first time stamp. At block B5608, when the second time stamp is within the predetermined amount of time after the first time stamp, the method 5600 includes creating composite image data comprising the first image data followed by the second image data. At block B5610, if the second time stamp is not within the predetermined amount of time, the image data is processed as otherwise discussed herein. At block B5612, if a composite image is created, the method 5600 includes transmitting the composite image data to the client device.

Figure 58:
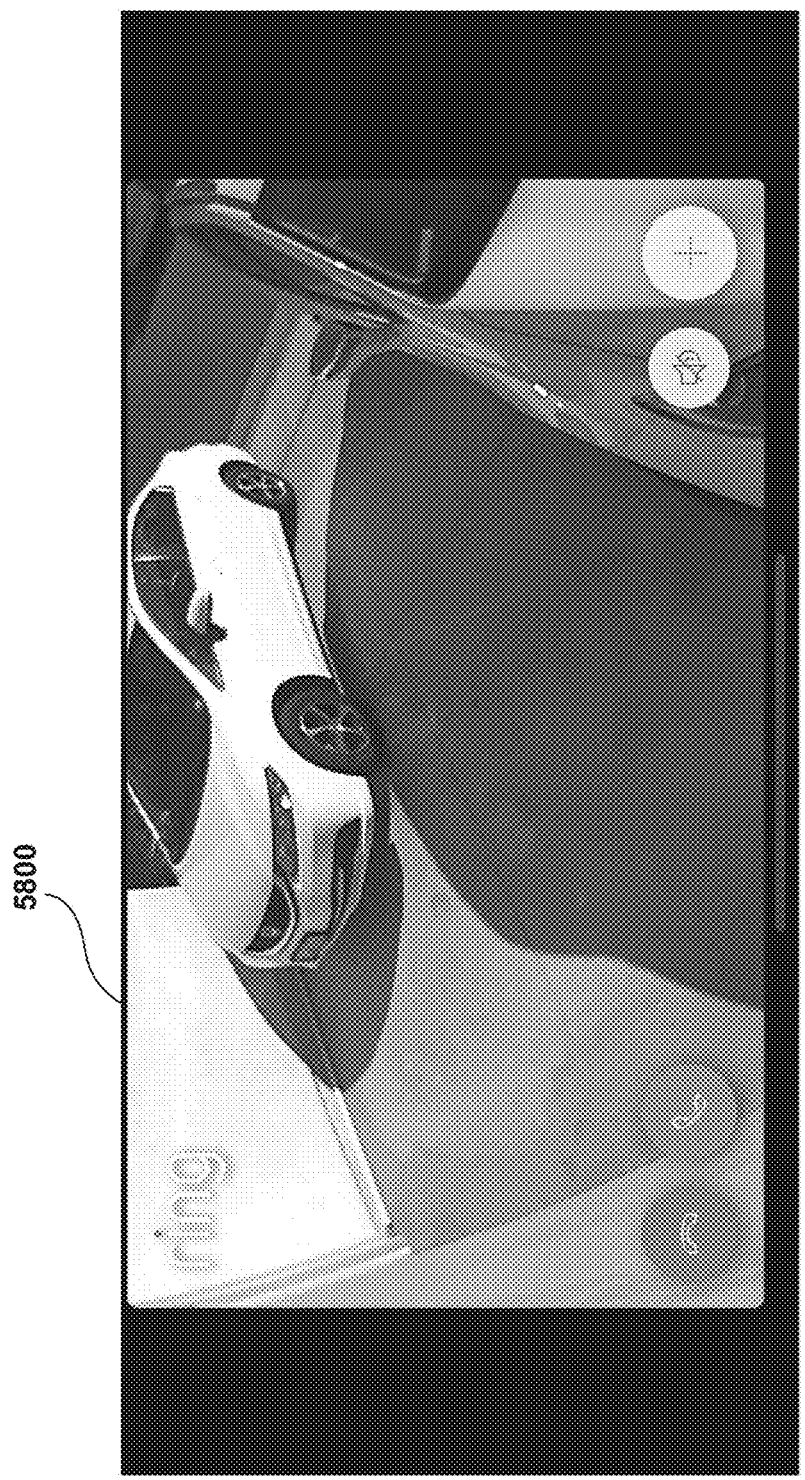
FIGS. 58-65 illustrate example embodiments of the image data and composite image data generated by embodiments of the camera event stitching process, in accordance with certain aspects of the present embodiments.
Figure 59:
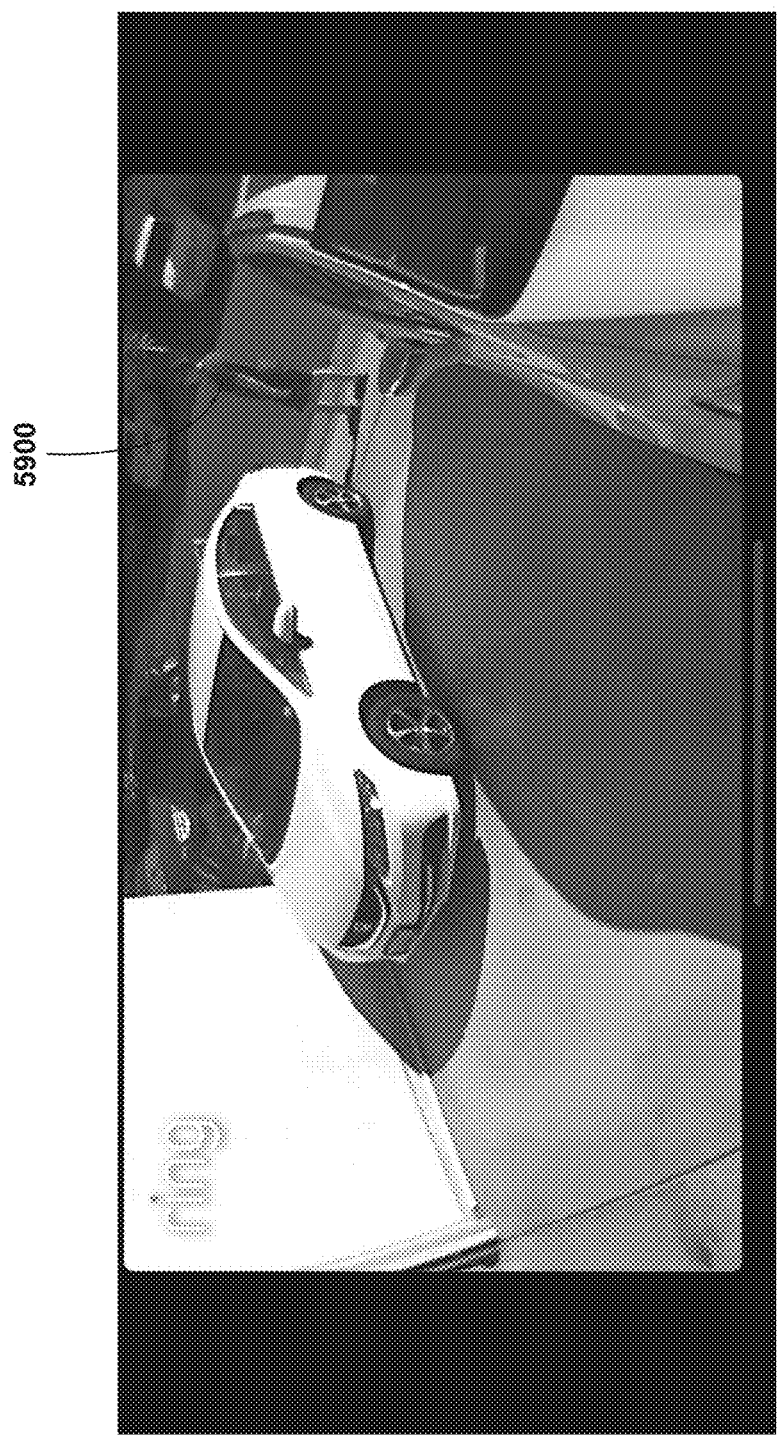
Figure 60:
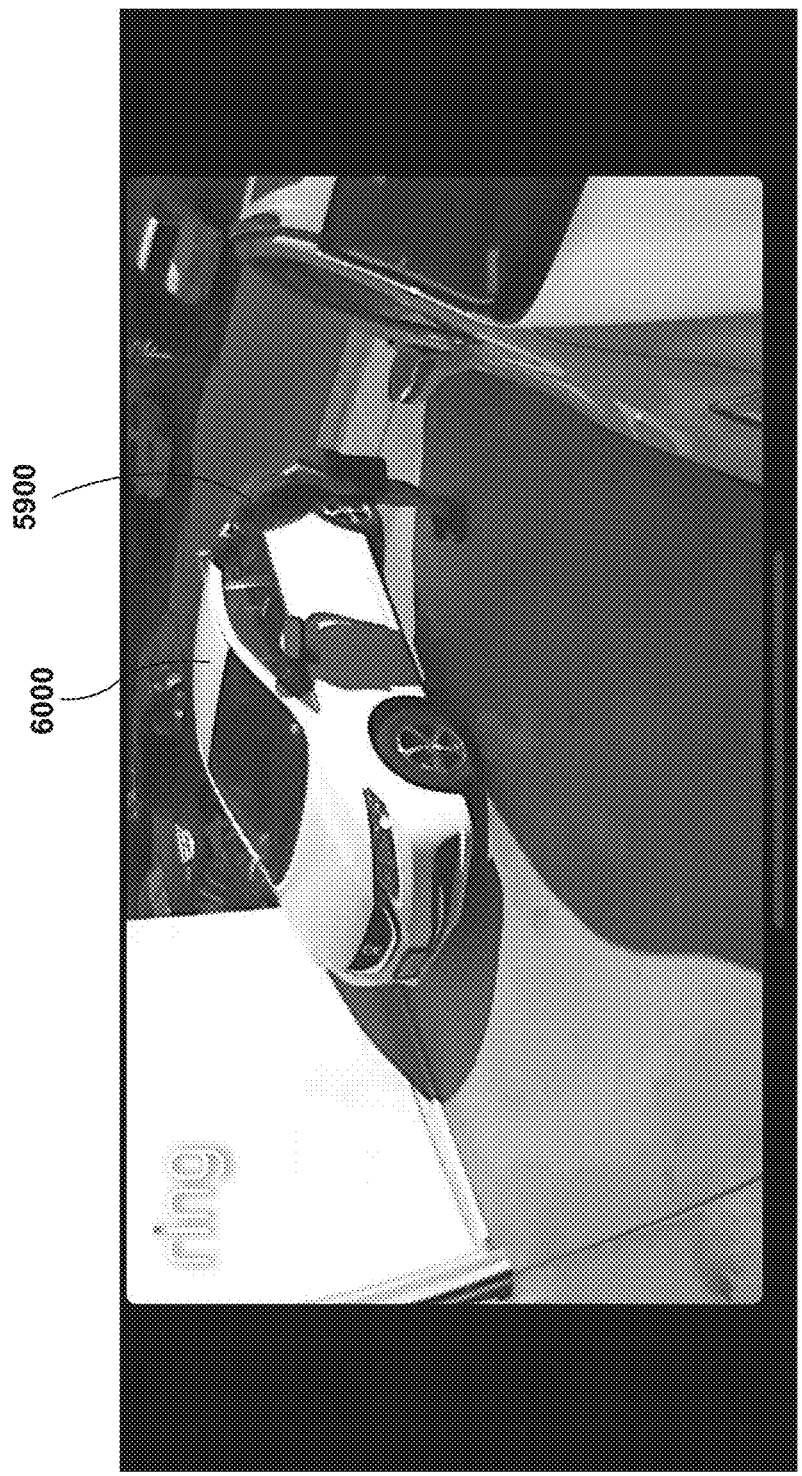
Figure 61:
Figure 62:
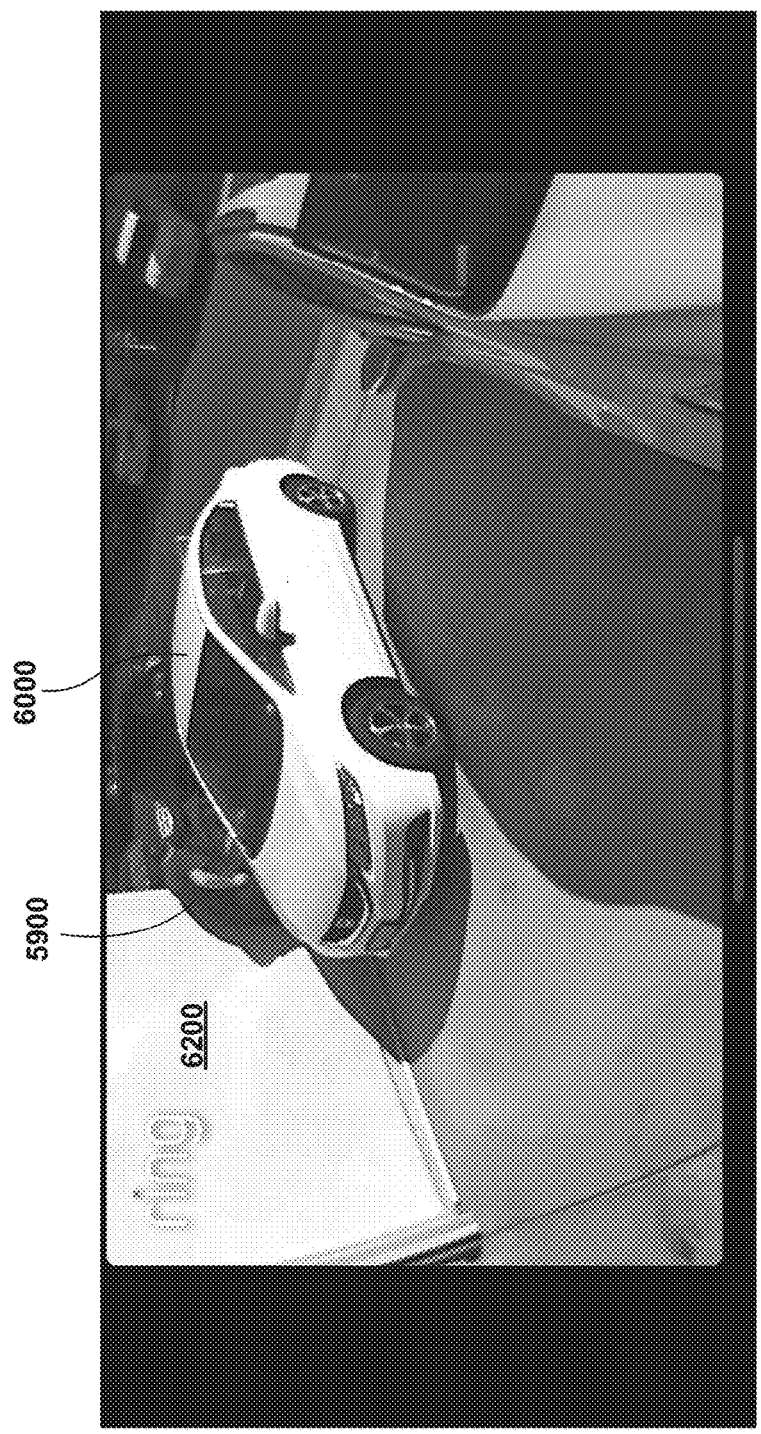
Figure 63:
Figure 64:
Figure 65:

FIGS. 58-65 illustrate example embodiments of the image data and composite image data generated by an embodiment of the camera event stitching process. In FIG. 58, the first camera 5712 records an image 5800 of a residential driveway, but no persons. In FIG. 59, a person 5900 has entered the field of view of the first camera 5712. In FIG. 60, the person 5900 has approached the driver's side window of a car 6000 parked in the driveway. In FIG. 61, the person 5900 has approached the front of the parked car 6000 and appears to be peering into the windshield. In FIG. 62, the person 5900 has moved around the parked car 6000 and is moving around the front of the residence 6200. In certain embodiments, to be further discussed below, elements of the security system anticipate that, from the direction of motion of the person, that the person is moving toward the second camera 5714, and therefore activates recording of the second camera 5714. In FIG. 63, the second camera 5714 records an image of the walkway 6300 to the front door 6302 of the residence 6200, as well as a portion of the side yard 6304 of the residence 6200. In FIG. 64, the person 5900 has entered the field of view of the second camera 5714. In FIG. 65, the person 5900 has continued up the walkway 6300 and appears to be peering at something in the side yard 6304 of the residence, just out of view of the second camera 5714. In certain embodiments of the present method, the images of FIGS. 58-65 (and/or the videos in which the images are contained) are linked together as a single composite image file and/or video file, and transmitted to the user's client device, so that the user may view the composite image/video file as a "storyboard" (or as a single continuous video) showing the person 5900's transit from the field of view of the first camera 5712, to and through the field of view of the second camera 5714. In some embodiments, additional images and/or video footage may be included in the composite image/video file, where the additional images and/or video footage show activity occurring before and/or after the images/video that show the person 5900.

In an embodiment of the camera event stitching process, the predetermined amount of time (block B5606) may be 5 seconds, or 10 seconds, or 15 seconds, or 30 seconds, or one minute, or 90 seconds, or two minutes, or three minutes, or any other length of time. In another embodiment, the predetermined amount of time may depend upon a distance between the first camera 5712 and the second camera 5714, where the amount of time may increase as the distance between the first camera 5712 and the second camera 5714 increases, and vice versa. In various embodiments, the predetermined amount of time may be increased and decreased manually by the user and/or by an automated process. This ability to adjust the predetermined amount of time thereby accounts for the possibility that different user configurations and arrangements of the first and second cameras may have different distances between them, e.g., different distances between a driveway camera and a front door camera.

In another embodiment, the first image data and the second image data may be received at a backend system in network communication with the first camera 5712 and the second camera 5714. In such an embodiment, certain processing, including but not limited to the creation of the composite image data, may be performed by the backend system.

In another embodiment, the first image data and the second image data may be received at a smart home hub located at the property and in network communication with the first camera 5712 and the second camera 5714. In such an embodiment, certain processing, including but not limited to the creation of the composite image data, may be performed by the smart home hub. In various embodiments, the smart home hub may be at least one of a home automation hub and a premises security hub.

As described above, another aspect of the present embodiments includes the realization that, at a single property, a user may install multiple A/V recording and communication devices, and may wish to have them communicatively linked together so that, if one such device senses motion and records image data of a source of motion that is moving toward a second such device, the second device is alerted or activated to "track" the source of the motion from the field of view of the first device to the field of view of the second device. In this way, the security of the property and residents will be enhanced and a better recording of the source of motion may be available for use by the user and/or law enforcement authorities.

Figure 66:
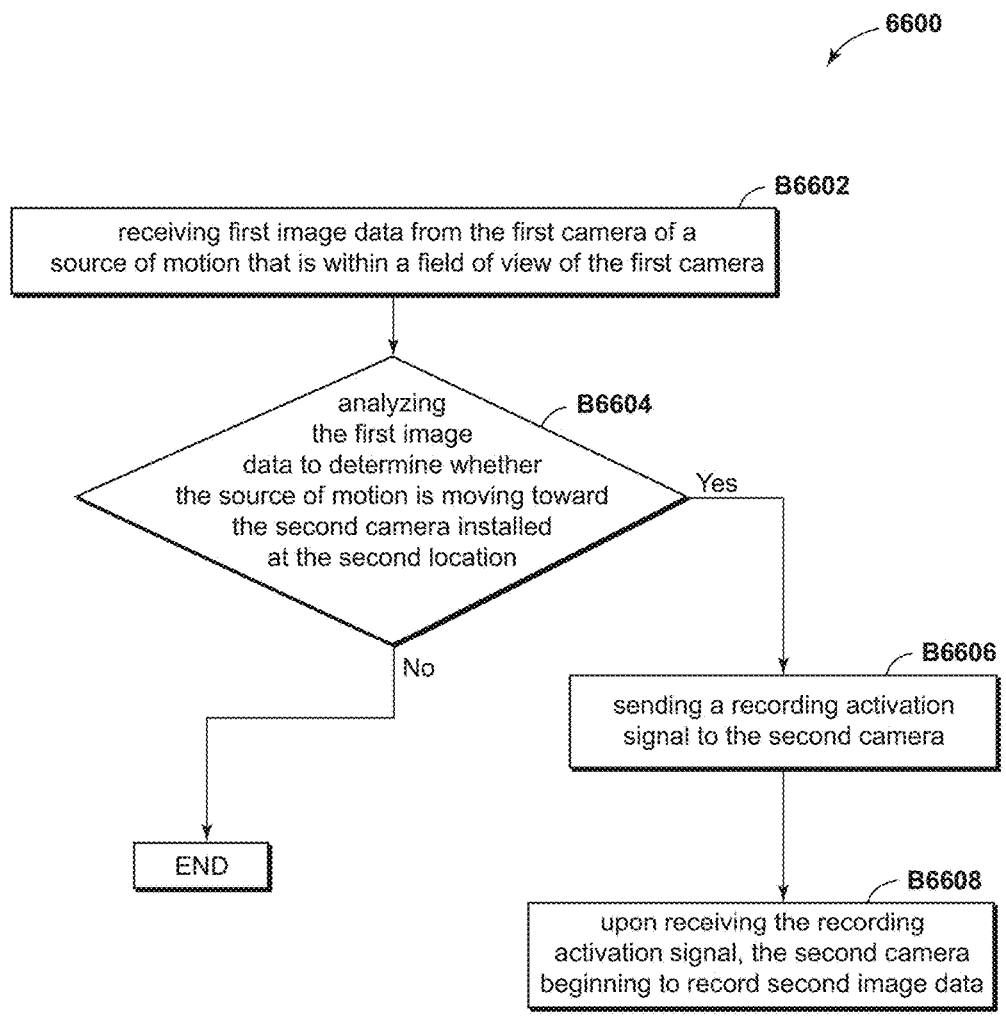
FIG. 66 is a flowchart illustrating a method for a multi-camera video security system installed at a property, by which the system may record images of a source of motion, e.g., a person, and then anticipate the direction of motion of the person, and thereby activate a second camera toward which the person is moving, even before the person enters the field of view of the second camera and/or before the motion of the person is sensed by the motion sensor associated with the second camera, in accordance with certain aspects of the present embodiments.

FIG. 66 illustrates a method 6600 for a multi-camera video security system installed at a property, according to various aspects of the present disclosure. In the method 6600, the multi-camera video security system may record image(s) of a source of motion, e.g., a person or an object moving across the field of view of the first camera, and then anticipate the direction of motion of the source of motion, e.g., the direction in which a suspect person is moving, and thereby activate a second camera toward which the person is moving, even before the person enters the field of view of the second camera and/or before the motion of the person is sensed by a motion sensor of the second camera. Throughout this application, embodiments of such a method are generally referred to as "multi-camera motion tracking."

In an example embodiment, multi-camera motion tracking is accomplished using a video security system installed at a property, the video security system comprising a first security device having a first camera installed at a first location at the property and a second security device having a second camera installed at a second location at the property, such as that shown in FIG. 62. Referring again to FIG. 66, at block B6602, the method 6600 includes receiving first image data from the first camera 5712 of a source of motion that is within a field of view of the first camera 5712. At block B6604, the method 6600 includes analyzing the first image data to determine whether the source of motion is moving toward the second camera 5714 installed at the second location. At block B6606, the method 6600 includes, upon determining that the source of motion is moving toward the second camera 5714 installed at the second location, sending a recording activation signal to the second camera 5714. At block B6608, the method 6600 includes, upon receiving the recording activation signal, the second camera 5714 beginning to record second image data.

In one embodiment, the first image data may be received by a processor of the first security device and processed to determine a direction of motion using computer vision (or similar) analysis. In another embodiment, the first image data may be received by a smart home hub in network communication with the first security device, and the first image data may be processed by the smart home hub to determine the direction of motion. In yet another embodiment, the first image data may be received by a backend server in network communication with the first security device for processing and analysis and determination of the direction of motion. In another embodiment, the first image data may be processed by a combination of two or more of the first security device, the smart home hub, and the backend server. In each embodiment, the video is associated with a user's client device and image data may be transmitted to the user's client device for either contemporaneous or later viewing.

In certain embodiments, prior to execution of the multi-camera motion tracking method 6600 illustrated in FIG. 66, the user may be requested to provide certain inputs to configure the system, including but not limited to identifying the relative locations of various cameras with respect to one another. In one embodiment, the method further comprises receiving an indication from the client device that the first security device has been installed at the first location and then receiving an indication from the client device that the second security device has been installed at a second location.

This configuration process may be accomplished in a number of ways. In one embodiment, a software application ("app") running on the user's client device presents an overhead view, or map view of the property where the first and second security devices will be installed. This view may appear similar to the view provided in FIG. 62. In some embodiments, the map may be obtained from a third-party source (e.g., Google Maps), and in other embodiments the user may be prompted to draw the map. The user may then indicate, using a pointing device, a touchscreen, or other manner, the locations where the user has installed each of the first and second security devices. The user may also be prompted to indicate which direction each security device faces, or to provide other information about the orientation of each device.

In various embodiments, the analysis of the source of motion and its direction may be conducted by the processor of the first security device, the backend system, or a smart home hub. From this analysis, the recording activation signal may be sent to the second security device from the first security device, the backend system, or a smart home hub, respectively.

As described above, the present embodiments advantageously provide for an improved way to record video of events occurring throughout a neighborhood during a neighborhood-wide emergency, provide for an improved approach to motion tracking using multiple cameras located at a residence, and provide an improved way to view images captured by multiple cameras located at a residence when those images are all taken within a predetermined period of time.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specifc integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for a video security system installed at a property, the video security system comprising a first camera installed at a first location at the property and a second camera installed at a second location at the property, wherein the video security system is associated with a client device, the method comprising:
   receiving first image data from the first camera of a first source of motion that is within a field of view of the first camera, wherein the first image data is associated with a first time stamp indicating the time when the first image data was recorded;
   receiving second image data from the second camera of a second source of motion that is within a field of view of the second camera, wherein the second image data is associated with a second time stamp indicating the time when the second image data was recorded;
   determining whether the second time stamp is within a predetermined amount of time after the first time stamp;
   when the second time stamp is within the predetermined amount of time after the first time stamp, creating composite image data comprising the first image data followed by the second image data; and
   transmitting the composite image data to the client device.

2. The method of claim 1, wherein the predetermined amount of time is three minutes.

3. The method of claim 1, wherein the predetermined amount of time depends on a distance between the first camera and the second camera.

4. The method of claim 1, wherein the predetermined amount of time increases when the distance between the first camera and the second camera increases, and wherein the predetermined amount of time decreases when the distance between the first camera and the second camera decreases.

5. The method of claim 1, wherein the first image data and the second image data are received at a backend system in network communication with the first camera and the second camera.

6. The method of claim 1, wherein the first image data and the second image data are received at a smart home hub located at the property and in network communication with the first camera and the second camera.

7. The method of claim 1, wherein the predetermined amount of time can be set by a user.

8. The method of claim 7, wherein the predetermined amount of time can be set by a user by selecting a predetermined amount of time from a plurality of selectable predetermined times presented at a user interface on the client device.

9. An camera event stitched image file created by a video security system installed at a property, the video security system comprising a first camera installed at a first location at the property and a second camera installed at a second location at the property, wherein the video security system is associated with a client device, using a method comprising:
   receiving first image data from the first camera of a first source of motion that is within a field of view of the first camera, wherein the first image data is associated with a first time stamp indicating the time when the first image data was recorded;
   receiving second image data from the second camera of a second source of motion that is within a field of view of the second camera, wherein the second image data is associated with a second time stamp indicating the time when the second image data was recorded;
   determining whether the second time stamp is within a predetermined amount of time after the first time stamp; and
   when the second time stamp is within the predetermined amount of time after the first time stamp, creating composite image data comprising the first image data followed by the second image data.

10. The camera event stitched image file of claim 9, wherein the predetermined amount of time is three minutes.

11. The camera event stitched image file of claim 9, wherein the predetermined amount of time depends on a distance between the first camera and the second camera.

12. The camera event stitched image file of claim 9, wherein the predetermined amount of time increases when the distance between the first camera and the second camera increases, and wherein the predetermined amount of time decreases when the distance between the first camera and the second camera decreases.

13. The camera event stitched image file of claim 9, wherein the first image data and the second image data are received at a backend system in network communication with the first camera and the second camera.

14. The camera event stitched image file of claim 9, wherein the first image data and the second image data are received at a smart home hub located at the property and in network communication with the first camera and the second camera.

15. The camera event stitched image file of claim 9, wherein the predetermined amount of time can be set by a user.

16. The camera event stitched image file of claim 15, wherein the predetermined amount of time can be set by a user by selecting a predetermined amount of time from a plurality of selectable predetermined times presented at a user interface on the client device.

17. The camera event stitched image file of claim 9, wherein the composite image is video.

18. The camera event stitched image file of claim 17, wherein the composite image is at least two video clips configured to run as a single video on the client device.

19. The camera event stitched image file of claim 9, wherein the composite image is a series of still images.

20. The camera stitched image file of claim 19, wherein the composite image is a series of still images configured to be presented as a continuous slide show on the client device.

* * * * *